US006584286B2

(12) United States Patent
Odaka et al.

(10) Patent No.: US 6,584,286 B2
(45) Date of Patent: Jun. 24, 2003

(54) ELECTRONIC FLASH DEVICE

(75) Inventors: Yukio Odaka, Kanagawa (JP); Shoji Ichimasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/876,460

(22) Filed: Jun. 7, 2001

(65) Prior Publication Data

US 2002/0071670 A1 Jun. 13, 2002

(30) Foreign Application Priority Data

| | | |
|---|---|---|
| Jun. 9, 2000 | (JP) | 2000-173405 |
| Jun. 30, 2000 | (JP) | 2000-199697 |
| Jul. 6, 2000 | (JP) | 2000-205628 |
| Jul. 25, 2000 | (JP) | 2000-223758 |
| Jul. 25, 2000 | (JP) | 2000-223759 |

(51) Int. Cl.[7] ........ G03B 15/05

(52) U.S. Cl. ........ 396/206

(58) Field of Search ........ 396/205, 206, 396/221, 278, 279, 303; 315/209 R, 241 P

(56) References Cited

U.S. PATENT DOCUMENTS 6,005,352 A * 12/1999 Odaka ........ 315/209 R
6,219,493 B1 * 4/2001 Aoki et al. ........ 396/206

* cited by examiner

*Primary Examiner*—Russell Adams
*Assistant Examiner*—Arthur A Smith
(74) *Attorney, Agent, or Firm*—Robin, Blecker & Daley

(57) ABSTRACT

The present invention provides an electronic flash device, and in particular, an electronic flash device including forward and flyback type booster circuits. The two booster circuits are appropriately switched depending on the charged state of a capacitor of the electronic flash device or the operative state of the camera, thereby achieving proper charging time and charging efficiency.

31 Claims, 37 Drawing Sheets

ELECTRONIC FLASH DEVICE

BACKGROUND OF THE INVENTION

1. Field of the Invention

The present invention relates to an electronic flash apparatus and a camera having this electronic flash device.

2. Description of the Related Art

Many recent cameras have an electronic flash device. There are various types of cameras ranging from conventional fixed focus cameras to zoom cameras including a zoom lens. With the lenses of the recent cameras in the tele-side (long focus side of the lens), a distant object can be enlarged for photographing. Further, since the cameras having an electronic flash device have been reduced in size, users can carry these cameras with themselves more easily.

On the other hand, the electronic flash device requires a larger amount of charging energy to provide a proper quantity of light to a more distant object. Moreover, attempts are being made to reduce the size of the cameras and increase zoom magnification. As a result, the F No., which is indicative of the brightness of the lens on the tele-side, has increased (that is, the lens has become darker). This further increases the required amount of charging energy of the electronic flash device.

However, the reduced size of the cameras with the electronic flash device has led to several disadvantages such as a decrease in the total number of batteries (for example, lithium batteries) used as a power supply from two to one, thus reducing the power supply voltage. Further, such batteries have a high internal resistance. As a result, the amount of time required to charge the electronic flash disadvantageously increases.

Thus, there has been a demand for an electronic flash device which can reduce the charging time and a camera having such an electronic flash device.

SUMMARY OF THE INVENTION

It is an object of the invention to provide an electronic flash device which reduces the charging time.

It is another object of the invention to provide an electronic flash device which is capable of performing charging operations suitable for manipulating and operating conditions of a camera.

It is a further object of the invention to provide an electronic flash device having a forward type booster circuit and a flyback type booster circuit and being capable of switching these two types of booster circuits to obtain proper charging time and charging efficiency.

To attain the above objects, a first aspect of the present invention provides an electronic flash device comprising a power supply, a main capacitor, a booster circuit for performing a boosting operation for increasing voltage from the power supply to thereby charge the main capacitor, the booster circuit having a forward type boosting section, and a flyback type boosting section, and a switching circuit for switching the boosting operation performed by the booster circuit from one performed by the forward type boosting section to one performed by the flyback type boosting section, during charging of the capacitor.

In a preferred form of the first aspect of the invention, the switching circuit switches the boosting operation performed by the forward type boosting section to the one performed by the flyback type boosting section after a charged voltage of the main capacitor has reached a predetermined value.

Alternatively, the switching circuit switches the boosting operation performed by the forward type boosting section to the one performed by the flyback type boosting section when a predetermined period of time has elapsed since charging of the capacitor was started.

In a preferred form of the first aspect of the invention, the forward type boosting section and the flyback type boosting section share an oscillation transformer connected in parallel to the main capacitor.

In a specific embodiment of the first aspect, the oscillation transformer has a primary coil and a secondary coil, and the forward type boosting section causes a current to flow through the primary coil of the oscillation transformer in a first direction to generate a current flowing from the secondary coil in a predetermined charging direction to thereby charge the main capacitor, and the flyback type boosting section causes a current to flow through the primary coil in a second direction opposite to the first direction to generate a current flowing from the secondary coil in the charging direction to thereby charge the main capacitor.

In a more specific form of this embodiment, the primary coil comprises a first coil, a second coil, and an intermediate terminal connecting between the first and second coils, the power supply having electrodes, the first and second coils being connected to one of the electrodes of the power supply, the intermediate terminal being connected to another one of the electrode of the power supply, and the forward type boosting section causing a current to flow through the first coil in the first direction to generate a current flowing from the secondary coil in the predetermined charging direction to thereby charge the main capacitor, while the flyback type boosting section causing a current to flow through the second coil in the second direction opposite to the first direction to generate a current flowing from the secondary coil in the charging direction to thereby charge the main capacitor.

Alternatively, the forward type boosting section and the flyback type boosting section each have an oscillation transformer connected in parallel to the main capacitor.

To attain the above objects, a second aspect of the present invention provides an electronic flash device incorporated in or mounted on a camera, comprising a power supply, a main capacitor, a booster circuit for performing a boosting operation for increasing voltage from the power supply to thereby charge the main capacitor, the booster circuit having a forward type boosting section, and a flyback type boosting section, and a selecting circuit for selecting the forward type boosting section or the flyback type boosting section depending on an operating status or an operative state of the camera.

In a specific form of the second aspect of the invention, the selecting circuit selects the forward type boosting section when the camera is in an operative state for preparing for photographing, and selects the flyback type boosting section before the camera is set in the operative state for preparing for photographing.

Specifically, for example, the selecting circuit selects the forward type boosting section or the flyback type boosting section depending on an operating state of a release operating member of the camera. For example, the camera is set into the operative state for preparing for photographing by a remote control operation.

To attain the above objects, a third aspect of the present invention provides an electronic flash device incorporated in or mounted on a body of a camera, comprising a main capacitor, a flyback type booster circuit for charging the main capacitor with a driving current which can be variably set, and a control circuit for causing the flyback type booster circuit to charge the main capacitor by setting the driving current from the flyback type booster circuit to a predetermined first value, when the camera is in an operative state for preparing for photographing, and by setting the driving current from the flyback type booster circuit to a predetermined second value which is smaller than the first predetermined value, before the camera is in the operative state for preparing for photographing.

To attain the above objects, a fourth aspect of the present invention provides an electronic flash device incorporated in or mounted on a body of a camera, comprising a main capacitor, a forward type booster circuit for charging the main capacitor, the forward type booster circuit having a first transformer, and a second transformer having a smaller turn ratio than the first transformer, and a control circuit for using the first transformer to charge the main capacitor when the camera is in an operative state for preparing for photographing, and for using the second transformer to charge the main capacitor before the camera is in the operative state for preparing for photographing.

In the third and fourth aspects, the operative state for preparing for photographing is a state in which a release operating member of the camera is operated for a first stroke.

In the third and fourth aspects, the camera may be set into the operative state for preparing for photographing by a remote control operation.

To attain the above objects, a fifth aspect of the present invention provides an electronic flash device comprising a power supply battery, a main capacitor, a booster circuit for performing an oscillating operation for increasing voltage from the power supply battery to thereby charge the main capacitor, the booster circuit having a first boosting section, and a second boosting section using a charging method different from that of the first boosting section, and a control circuit for switching the first boosting section to the second boosting section to charge the main capacitor, the control circuit setting timing for the switching depending on a state of the power supply battery.

To attain the above objects, a sixth aspect of the present invention provides an electronic flash device comprisinga power supply battery, a main capacitor, a booster circuit for performing an oscillating operation for increasing voltage from the power supply to thereby charge the main capacitor, and a control circuit for switching a driving operation of the booster circuit from a first driving operation to a second driving operation which achieves faster charging than the fist driving operation, to charge the main capacitor, the control circuit setting timing for the switching depending on a state of the power supply battery.

In a preferred form of the fifth and sixth aspects, the first boosting section comprises a flyback type boosting section, and the second boosting section comprises a forward type boosting section.

Preferably, the control circuit sets the timing for the switching depending on a state of internal resistance of the power supply battery.

Also preferably, the control circuit sets the timing for the switching based on a time required for charging the main capacitor which is obtained by the state of the power supply battery.

Preferably, the control circuit sets the timing for the switching such that a time required for a charged voltage of the main capacitor to increase up to a predetermined charge completion voltage is substantially constant.

To attain the above objects, a seventh aspect of the present invention provides an electronic flash device incorporated in or mounted on a body of a camera, comprising a main capacitor, a flyback type booster circuit for charging the main capacitor with a driving current which can be variably set, and a control circuit for causing the flyback type booster circuit to charge the main capacitor by setting the driving current from the flyback type booster circuit to a predetermined value when a quick charging mode is set, and by setting the driving current from the flyback type booster circuit to a value smaller than the predetermined value when the quick charging mode is not set.

To attain the above objects, an eighth aspect of the present invention provides an electronic flash device incorporated in or mounted on a body of a camera, comprising a main capacitor, a forward type booster circuit for charging the main capacitor, the forward type booster circuit having a first coil, and a second coil having a smaller turn ratio than the first coil, and a control circuit for causing the forward type booster circuit to charge the main capacitor using the first coil thereof when a quick charging mode is set, and using the second coil thereof when the quick charging mode is not set.

To attain the above objects, a ninth aspect of the present invention provides an electronic flash device incorporated in or mounted on a body of a camera, comprising a main capacitor, a booster circuit having a forward type boosting section, and a flyback type boosting section to be selectively used for charging the main capacitor, and a selecting circuit for selecting the forward type boosting section or the flyback type boosting section depending on a photographing mode of the camera.

To attain the above objects, a tenth aspect of the present invention provides an electronic flash device incorporated in or mounted on a body of a camera, comprising a main capacitor, a flyback type booster circuit for charging the main capacitor with a driving current which can be variably set, and a setting circuit for setting the driving current from the flyback type boosting circuit depending on a photographing mode of the camera.

To attain the above objects, an eleventh aspect of the present invention provides an electronic flash device incorporated in or mounted on a body of a camera, comprising a main capacitor, a forward type booster circuit for charging the main capacitor, the forward type booster circuit having a first coil, and a second coil having a smaller turn ratio than the first coil, and a determining circuit for determining whether to charge the main capacitor using the first coil of the forward type booster circuit or the second coil thereof depending on a photographing mode of the camera.

To attain the above objects, a twelfth aspect of the present invention provides an electronic flash device incorporated in or mounted on a body of a camera having a finder eye contact detecting circuit for detecting an eye contact with a finder, comprising a power supply, a booster circuit for increasing voltage from the power supply to thereby charge the main capacitor, the booster circuit having a first boosting section, and a second boosting section, the second boosting section requiring a shorter charging completion time to complete charging the main capacitor, than sad first boosting section, and the first boosting section having a higher charging efficiency than the second boosting section, and a selecting circuit for selecting the second boosting section when the finder eye contact detecting circuit detects the eye contact with the finder, and selecting the first boosting section when the finder eye contact detecting circuit does not detect the eye contact with the finder.

In a preferred form of the twelfth aspect, the first boosting section comprises a flyback type boosting section, and the second boosting section comprises a forward type boosting section.

Preferably, the finder eye contact detecting circuit detects the eye contact with the finder during charging of the main capacitor using the first boosting section, the selecting circuit switches the first boosting section to the second boosting section.

To attain the above objects, a thirteenth aspect of the present invention provides an electronic flash device incorporated in or mounted on a body of a camera having a finder eye contact detecting circuit for detecting an eye contact with a finder, comprising a power supply, and a control circuit for charging the main capacitor by selecting a first driving operation or a second driving operation, the second driving operation section requiring a shorter charging completion time to complete charging the main capacitor, than the first driving operation; and the first driving operation providing a higher charging efficiency than the second driving operation, the control circuit selecting the second driving operation when the finder eye contact detecting circuit detects athe eye contact with the finder, and selecting the first driving operation when the finder eye contact detecting circuit does not detect the eye contact with the finder.

The above and other objects, features, and advantages of the present invention will be apparent from the following specification and drawings.

DESCRIPTION OF THE PREFERRED EMBODIMENTS (First Embodiment)

The construction of a camera having an electronic flash device according to a first embodiment of the present invention will be described with reference to FIGS. 1 to 4.

Figure 1:
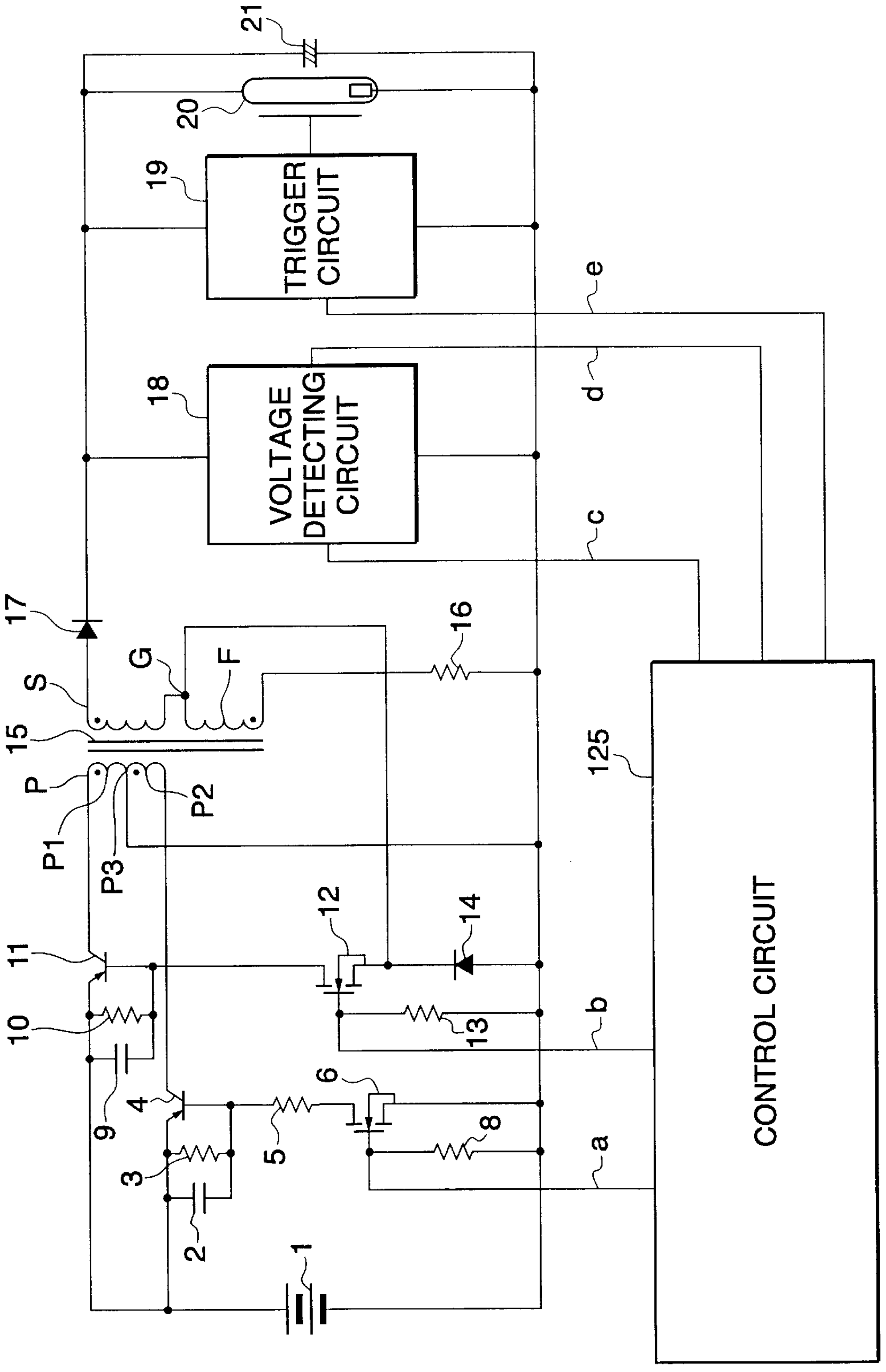
FIG. 1 is a circuit diagram showing the construction of an electronic flash device according to a first embodiment of the present invention.
Figure 2:
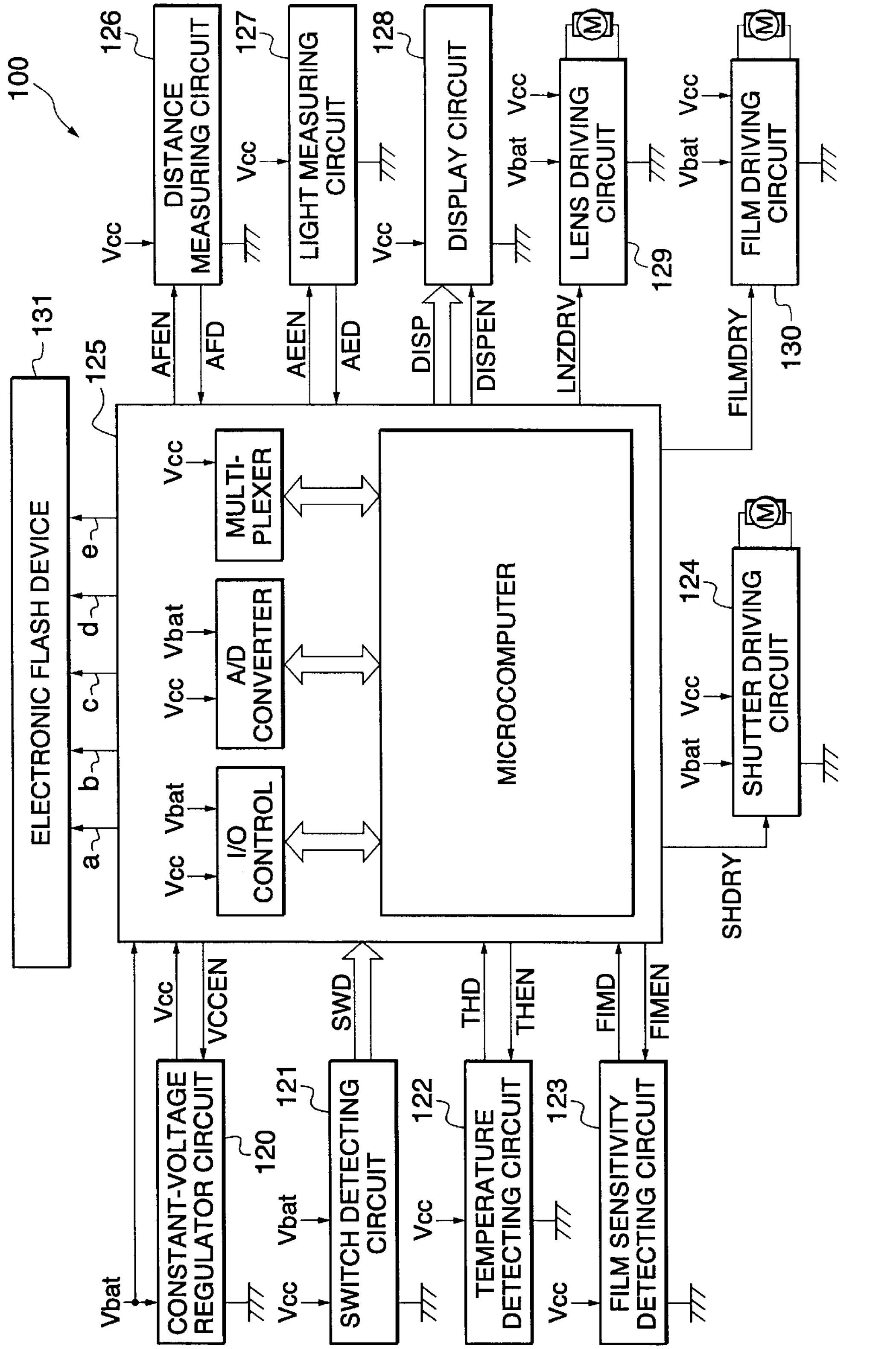
FIG. 2 is a view showing the construction of a camera.
Figure 3A:
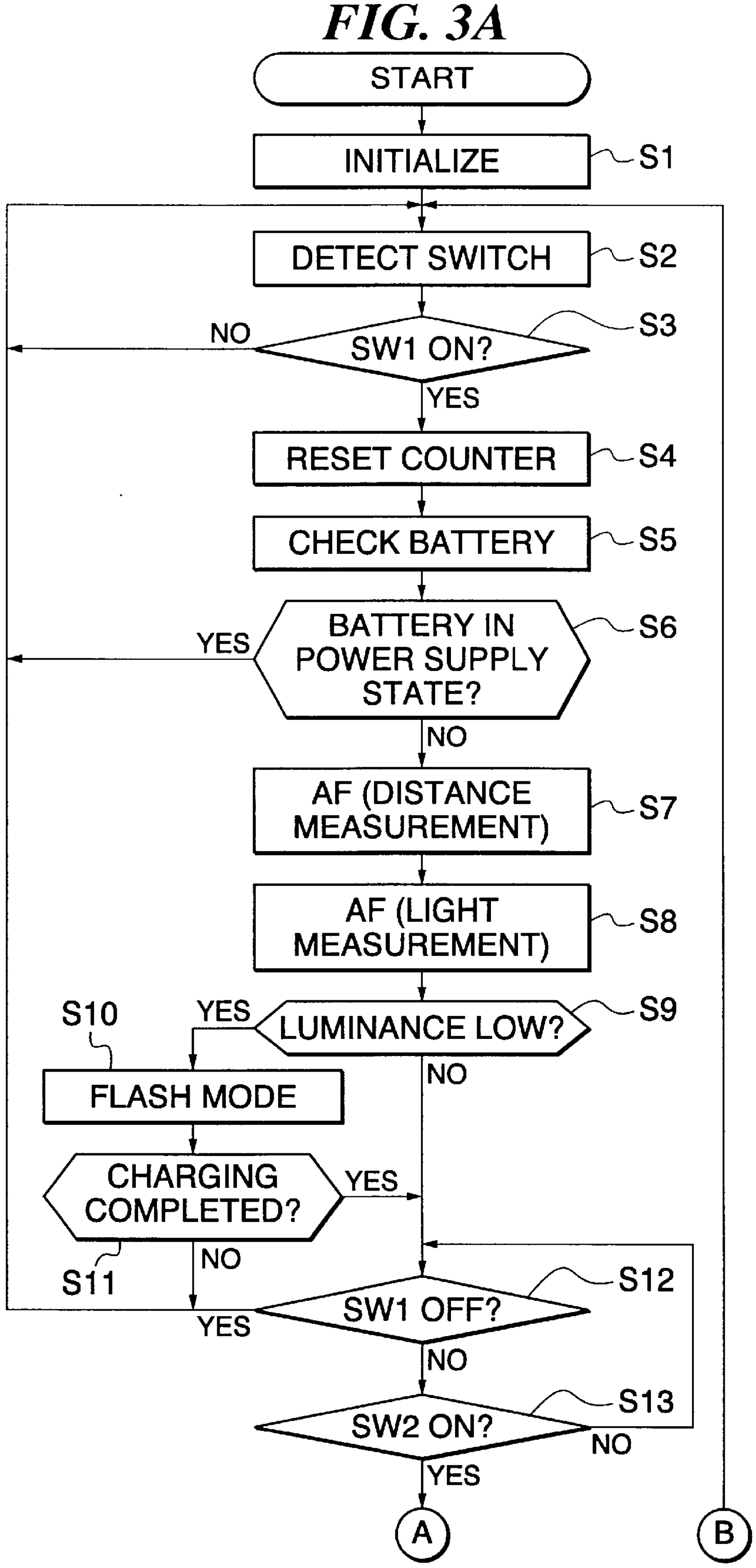
FIGS. 3A and 3B is a flow chart showing the flow of an operation of a camera.
Figure 3B:
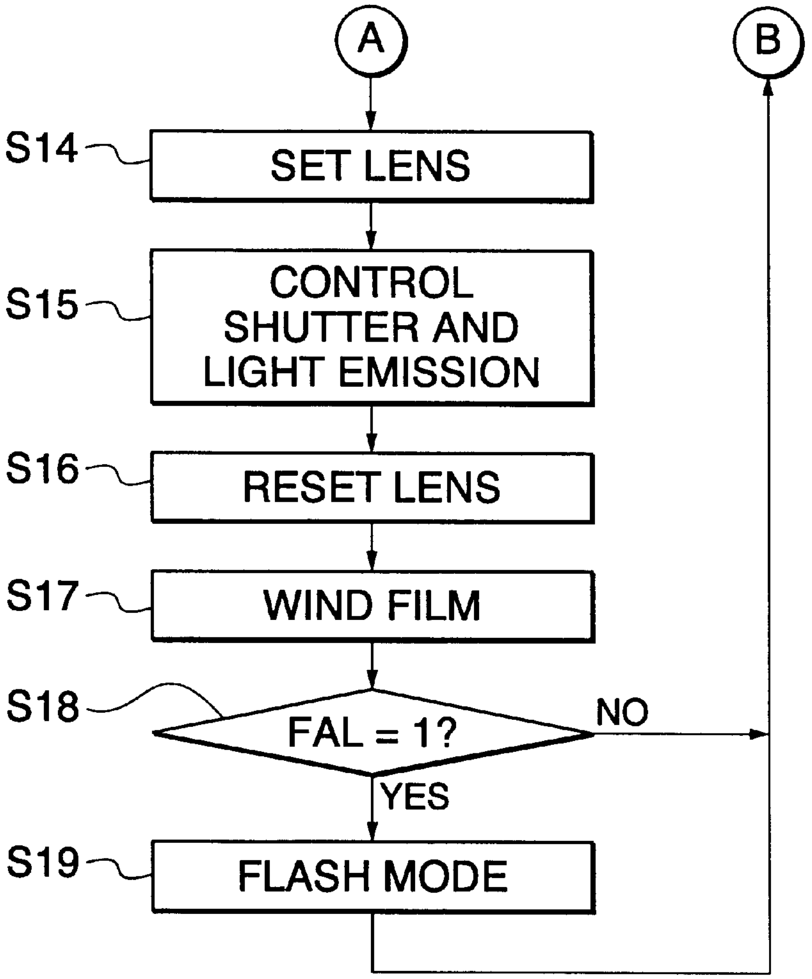
Figure 4:
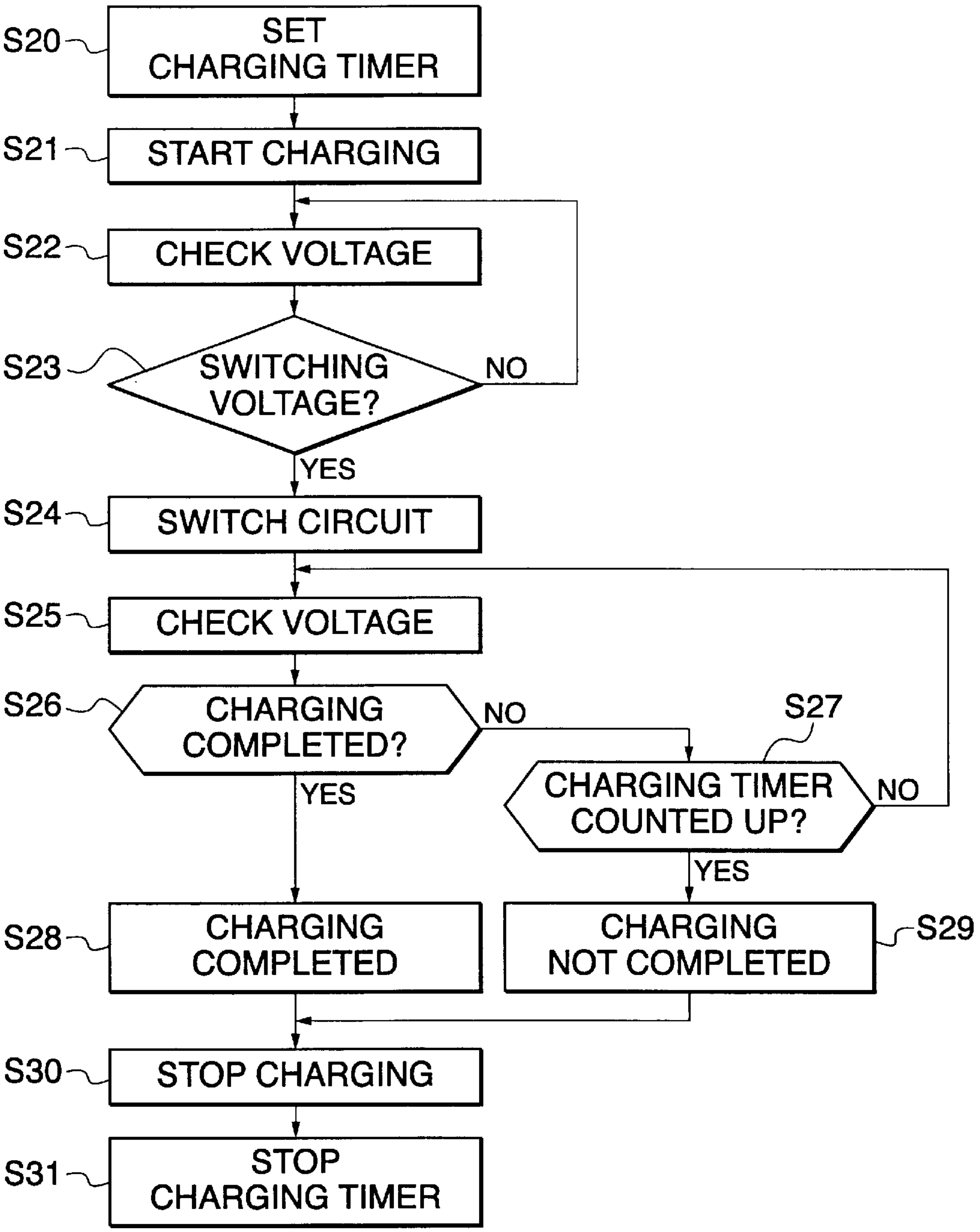
FIG. 4 is a flow chart showing the flow of an operation of the electronic flash device in a flash mode.

FIG. 1 is a circuit diagram showing the construction of the electronic flash device according to the first embodiment. FIG. 2 is a view showing the construction of a camera. FIGS. 3A and 3B is a flow chart showing the flow of an operation of the camera. FIG. 4 is a flow chart showing the flow of an operation of the electronic flash device shown in FIG. 1, in a flash mode.

First, the entire construction of a camera 100 having an electronic flash device 131 will be described with reference to FIG. 2.

Reference numeral 125 denotes a control circuit comprised of a microcomputer, an I/O controller, an A/D converter, and a multiplexer, for controlling various circuits of the camera. Reference numeral 120 denotes a constant-voltage regulator circuit for supplying a power supply voltage Vcc to the various circuits. Reference numeral 121 denotes a switch circuit for obtaining information such as the state of each switch and changes therein. Reference numeral 122 denotes a temperature detecting circuit. Reference numeral 123 denotes a film sensitivity detecting circuit for obtaining information such as film sensitivity and the number of frames.

Reference numeral 126 denotes a distance measuring circuit for measuring the distance to an object. Reference numeral 127 denotes a light measuring circuit for measuring the luminance of the object. Reference numeral 124 denotes a shutter driving circuit for driving a shutter. Reference numeral 129 denotes a lens driving circuit for driving a lens. Reference numeral 130 denotes a film driving circuit for feeding a film. Reference numeral 128 denotes a display circuit for displaying required information on, for example, a LCD. Reference numeral 131 denotes an electronic flash device.

Next, the construction of the electronic flash device 131 will be described with reference to FIG. 1.

Reference numeral 1 denotes a battery (that is, a power supply), 2 a capacitor, 3 a resistor, 4 a first transistor, 5 a resistor, 6 a first switch element, and 8 a resistor. The capacitor 2 and the resistor 3 are connected in parallel between a base and an emitter of the first transistor 4. The resistor 5 connects a base electrode of the first transistor 4 and the first switch element 6 together, to serve as a current limiting resistor for limiting a base current from the first transistor 4. The resistor 8 is a pull-down resistor connected to a control terminal of the first switch element 6.

Reference numeral 9 a capacitor, 10 a resistor, 11 a second transistor, 12 a second switch element, 13 a resistor, and 14 a diode. The capacitor 9 and the resistor 10 are connected in parallel between a base and an emitter of the second transistor 11. The resistor 13 is a pull-down resistor connected to a control terminal of the second switch element 12. The diode 14 connects a negative electrode of the battery 1 and the second switch element 12 together to block a current flowing from the second switch element 12 to the negative electrode of the battery 1.

Reference numeral 15 denotes an oscillation transformer. The oscillation transformer 15 is comprised of a primary coil P, a secondary coil S, a feedback coil F, and a feedback terminal G connecting the secondary coil S and the feedback coil F.

The primary coil P is comprised of a first coil P1, a second coil P2, and an intermediate terminal connecting the first coil P1 and the second coil P2 together. The first coil P1 is connected to a positive electrode of the battery 1 via a collector and an emitter of the second transistor 11. The second coil P2 is connected to the positive electrode of the battery 1 via a collector and an emitter of the first transistor 4. The intermediate terminal P3 is connected to the negative electrode of the battery 1 and one electrode of a main capacitor 21, described later.

The secondary coil S is connected to a positive electrode of the main capacitor 21 via a high-voltage rectifying diode 17, described later. The feedback coil F is connected to the negative electrode of the battery 1 and the main capacitor 21, described later, via a resistor 16 described later. The feedback terminal G is connected between the second switch element 12 and the diode 14.

Reference numeral 16 denotes the resistor, referred to above, and 17 the high-voltage rectifying diode, referred to above. Reference numeral 18 denotes a voltage detecting circuit, 19 a trigger circuit, 20 a discharge tube, and 21 the main capacitor, referred to above. The resistor 16 serves as a current limiting resistor for limiting a current from the feedback coil F. The voltage detecting circuit 18 is connected in parallel to the main capacitor 21 to detect the voltage across the main capacitor 21. The trigger circuit 19 is connected in parallel to the main capacitor 21 and to a trigger electrode of the discharge tube 20.

Characters a, b, c, d and e denote connection terminals connecting between the control circuit 125 and the electronic flash device 131. The connection terminal a connects a connection terminal of the first switch element 6 and the control circuit 125 together. The connection terminal b connects a connection terminal of the second switch element 12 and the control circuit 125 together. The connection terminals c and d connect the voltage detecting circuit 18 and the control circuit 125 together. A manner of using these connection terminals a, b, c, d and e will be described later.

The control circuit 125 is comprised of a detecting circuit, a comparing circuit, and a switching circuit (none of them is shown). The detecting circuit detects a charged voltage of the main capacitor 21. The comparing circuit compares the charged voltage of the main capacitor 21 with a predetermined intermediate voltage in terms of the magnitude thereof. The switching circuit causes a forward type booster circuit (forward type charging circuit) to charge the main capacitor when the charged voltage of the main capacitor 21 is less than the intermediate voltage. When the charged voltage of the main capacitor 21 reaches the intermediate voltage, the switching circuit switches the forward type booster circuit to a flyback type booster circuit (flyback type charging circuit) to cause the flyback type booster circuit to charge the main capacitor 21. In the following description of the present embodiment, the operation of the switching circuit will be sometimes described as that of the control circuit 125.

Once the charged voltage of the main capacitor 21 reaches the intermediate voltage, the forward type booster circuit is switched to the flyback type booster circuit. In this case, when the first switch element 6 is electrically conductive, the electronic flash device 131 acts as the flyback type booster circuit. When the second switch element 12 is electrically conductive, the electronic flash device 131 acts as the forward type booster circuit.

Next, the operation of the camera 100 will be described with reference to FIGS. 3A and 3B.

Here, it is assumed that the power supply to the control circuit 125 has already been turned on. In this state, the microcomputer of the control circuit 125 is in a low consumption mode and is inoperative.

First, a member of the camera 100 such as a barrier is moved to turn on a power supply switch in the switch detecting circuit 121. This causes the control circuit 125 to start operation. Next, the control circuit 125 applies a signal to the constant-voltage regulator circuit 120 via a VCCEN terminal. The constant-voltage regulator circuit 120 thus provides a power supply Vcc to each circuit.

Next, the control circuit 125 initializes the microcomputer (step S1). Then, when supplied with the power supply Vcc from the constant-voltage regulator circuit 120, the switch detecting circuit 121 detects the state of each switch (step S2). The switch detecting circuit 121 then detects from a release button that a first stroke operation (SW1) has been switched on (step S3). The first stroke operation comprises getting ready for photographing by half-depressing the release button.

Next, the control circuit 125 initializes a predetermined counter into an initial state (step S4). The control circuit 125 then checks the battery (step S5). Then, the control circuit 125 determines whether or not the battery is in a state for power supply required to allow the camera 100 to execute photographing (step S6). If the control circuit 125 determines that the power supply is insufficient, the procedure returns to the step S2. If the control circuit 125 determines that the power supply is sufficient, it applies a signal to a terminal AFEN. Thus, the distance measuring circuit 126 measures the distance to the object and provides the obtained distance measurement information to the control circuit 125 via an AFD terminal (step S7).

Next, the control circuit 125 applies a signal to the light measuring circuit 127 via a terminal AEEN. This causes the light measuring circuit 127 to measure the luminance of the object and provide the obtained light measurement information to the control circuit 125 via an AED terminal (step S8). Then, the control circuit 125 determines whether or not the object has a luminance higher than a predetermined value, based on this luminance information (step S9). If the object has a higher luminance, the procedure proceeds to a step S12, described later. If the object has a lower luminance, the electronic flash device 131 is switched into a flash mode (step S10).

Then, the operation of the electronic flash device 131 in the flash mode (step S10) will be described with reference to FIG. 4.

First, the control circuit 125 sets a charging timer to about 10 to 15 seconds, for example (step S20). The control circuit 125 applies a high level signal to the control electrode of the second switch element 12 via the connection terminal b. This signal turns on the second switch element 12. This causes the forward type booster circuit to start charging the main capacitor 21 (step S21).

When the second switch element 12 is turned on, a part (base current) of a current from the battery 1 flows between the emitter and base of the second transistor 11 and then through the second switch element 12, the feedback element G, the feedback coil F, and the resistor 16 to the battery 1 in the form of a loop. Thus, a part (collector current) of a current from the positive electrode of the battery 1 flows between the emitter and collector of the second transistor 11 and then through the first coil P1 and the intermediate terminal P3 to the battery 1 in the form of a loop. The direction of the current flowing through the first coil P1 at this time is defined as the first direction.

Thus, an induced electromotive force is generated in the secondary coil S. Accordingly, a current flows through the secondary coil S, the high-voltage rectifying diode 17, the main capacitor 21, and the battery 1, then between the emitter and base of the second transistor 11, and finally to the feedback terminal G via the second switch element 12. Consequently, the charging of the main capacitor 21 progresses. The direction of the current flowing through the first coil P1 at this time is called "the first direction Q1". The direction of the current flowing through the secondary coil S at this time is defined as the charging direction.

The charging current for the main capacitor 21 also acts as a base current for the second transistor 11 to increase the amount of the base current. Accordingly, a positive feedback is applied to the second transistor 11 and the voltage between the collector and emitter of the second transistor 11 is instantaneously set into a saturated state. When the current flows for a certain period of time in the above manner, the core of the oscillation transformer 15 becomes saturated with magnetic flux.

As a result, a counter-electromotive force is generated in the oscillation transformer 15. The counter-electromotive force generated in the secondary coil S applies a reverse bias to the base of the second transistor 11 through a loop running through the feedback terminal G and the second switch element 12, between the base and emitter of the second transistor 11, and then through the battery 1, the main capacitor 21, and the high-voltage rectifying diode 17.

At the same time, the counter-electromotive force in the feedback coil F applies a reverse bias to the base of the second transistor 11 through a loop running through the switch element 12, between the base and emitter of the second transistor 11, and then through the battery 1 and the resistor 16. Thus, the second transistor 11 rapidly becomes electrically non-conductive.

Next, once the core of the oscillation transformer 15 is relieved from saturation with magnetic flux, the base current flows to the second transistor 11 again. By thus repeatedly making the second transistor 11 alternately conductive and non-conductive, the main capacitor 21 is intermittently charged.

During the above described operation, the detecting circuit outputs a voltage detection driving signal to the voltage detecting circuit 18 via the connection terminal c. This causes the voltage detecting circuit 18 to detect the charged voltage of the main capacitor 21 and output it to the detecting circuit via the connection terminal d. In this manner, the detecting circuit detects the charged voltage of the main capacitor 21 (step S22).

Next, the detecting circuit outputs the value of the charged voltage of the main capacitor 21 to the comparing circuit. The comparing circuit compares the charged voltage of the main capacitor 21 with a predetermined intermediate voltage in terms of the magnitude thereof. If the charged voltage of the main capacitor 21 has not reached the intermediate voltage, the procedure returns to the step 12. If the charged voltage of the main capacitor 21 has reached the intermediate voltage (step S23), the comparing circuit outputs a switching command signal to the switching circuit.

Upon receiving the switching command signal, the switching circuit switches the forward type booster circuit to the flyback type booster circuit (step S24). Here, the control circuit 125 sets the voltage of the signal applied to the second switch element 12 via the connection terminal b, to a low level. This turns off the second switch element 12.

Next, the control circuit 125 applies a predetermined oscillation signal to the control electrode of the first switch element 6 via the connection terminal a (step S24). Here, the oscillation signal alternates between a high level and the low level. When the oscillation signal is at the high level, the first switch element 4 is turned on. This causes a part (base current) of the current from the battery 1 to flow between the emitter and base of the first transistor 4 and then through the resistor 15 and the first switch element 6 to the negative electrode 1 of the battery 1 in the form of a loop.

At the same time, a part (collector current) of the current from the battery 1 flows between the emitter and collector of the first transistor 4 and then through the second coil P2 and the intermediate terminal P3 to the negative electrode of the battery 1 in the form of a loop. The direction of the current flowing through the second coil P2 at this time is defined as a second direction. The second direction is opposite to the above-mentioned first direction in terms of magnetic flux. That is, in the flyback type booster circuit, the current flows through the primary coil P in the direction opposite to that in the forward type booster circuit.

Thus, an induced electromotive force is generated in the secondary coil S of the oscillation transformer 15. The resulting current, however, has such a polarity that it is blocked by the high-voltage rectifying diode 17, so that no exciting current flows from the oscillation transformer 15. Consequently, energy is accumulated in the oscillation transformer 15.

Next, when the oscillation signal is at the low level, the first switch element 6 is turned off. Thus, a counter-electromotive force is generated in the secondary coil S. Accordingly, the energy accumulated in the oscillation transformer 15 is released, and a current flows through the loop of the rectifying diode 17, the main capacitor 21, the diode 14, the feedback terminal G, and the secondary coil S.

The direction of a current flowing from the secondary coil S to the main capacitor 21 is the same as that in the forward type booster circuit (the above described charging method). As a result, the main capacitor 21 is charged. As the oscillation signal repeatedly alternates between the high and low levels, the main capacitor 21 is intermittently charged. Consequently, the voltage across the main capacitor 21 increases.

During the above described operation, the detecting circuit outputs the voltage detection driving signal to the voltage detecting circuit 18 via the connection terminal c. This causes the voltage detecting circuit 18 to detect the charged voltage of the main capacitor 21 and output it to the detecting circuit via the connection terminal d. In this manner, the detecting circuit detects the charged voltage of the main capacitor 21 (step S25).

Next, the control circuit 125 checks whether or not the charged voltage of the main capacitor 21 has reached a predetermined charging completion voltage (step S26).

When the charged voltage has not reached the charging completion voltage, the control circuit 125 determines whether or not the charging timer has counted up a predetermined amount of time (step S27). When the charging timer has not counted up the predetermined amount of time, the procedure returns to the step S25. When the charging timer has counted up the predetermined amount of time, the control circuit 125 sets an NG flag indicating that the main capacitor is not completely charged and the procedure proceeds to a step S30, described later. When the charged voltage has reached the predetermined charging completion voltage, the control circuit 125 sets an OK flag indicating that the main capacitor is completely charged and the procedure proceeds to the step S30, described later (step S28).

Next, the control circuit 125 switches the connection terminal a from the high level to the low level. This stops the charging of the main capacitor 21 (step S30). The control circuit 125 then stops the charging timer (step S31). This terminates the flash mode.

Then, the procedure returns to the sequence in FIGS. 3A and 3B.

By checking the charging completion flag at the above described steps S28 and S29, the control circuit 125 determines whether or not the main capacitor 21 ha been completely charged (step S11). In the case of the NG flag being set (indicating that the main capacitor is not completely charged), the procedure returns to the above described step S2. In the case of the OK flag being set (indicating that the main capacitor is completely charged), the control circuit waits for input of a second stroke (full-depressing operation) (step S13). When the first stroke is cleared, the procedure returns to the step S2. When the second stroke SW2 is input, the procedure proceeds to lens setting at a step S14, described below.

Next, the control circuit 125 uses the measured distance information obtained at the step S7 to control the lens driving circuit 129 to execute focusing (step S14). The control circuit 125 then uses the luminance information on the object obtained at the step S8 and film sensitivity information obtained by the film sensitivity detecting circuit 123, to control the opening of the shutter via the shutter driving circuit 124. At the same time, if the luminance is so low that the electronic flash device 131 is required to operate, the control circuit 125 controls the shutter based on the measured distance data and the film sensitivity so as to cause the electronic flash device 131 to emit light with a proper aperture value.

Next, the control circuit 125 causes the electronic flash device 131 to emit light by providing a high level signal to the connection terminal e. When the control signal 125 applies the high level signal to the connection signal e, a high pulse voltage is generated in the trigger circuit 19. The trigger circuit 19 then applies this high pulse voltage to the trigger electrode of the discharge tube 20. This excites the discharge tube 20. As a result, the discharge tube 20 has its impedance drastically reduced to cause the main capacitor 21 to discharge its charged energy, which is then converted into light energy. The electronic flash device 131 thus illuminates the object. Then, the control circuit 125 sets a flash flag FAL to 1. The flash flag set to 1 indicates that the electronic flash device 131 has been operated.

Next, when the shutter is closed, the control circuit 125 returns the lens, which has been at its focused position, to its initial position (step S16). The control circuit 125 then controls the film driving circuit 130 to wind the film by one frame on which photographing has been completed (step S17).

Then, the control circuit 125 checks whether the flash flag FAL is set to “1” (step S18). When the flash flag FAL is set to “1”, the control circuit sets the flash mode to charge the main capacitor 21 in the same manner as in the step S10, thereby completing the sequence of operations (step S19). When the flash flag FAL is not set to “1”, the procedure skips the step S19 and returns to the step S2, thus completing the sequence of operations.

Figure 5:
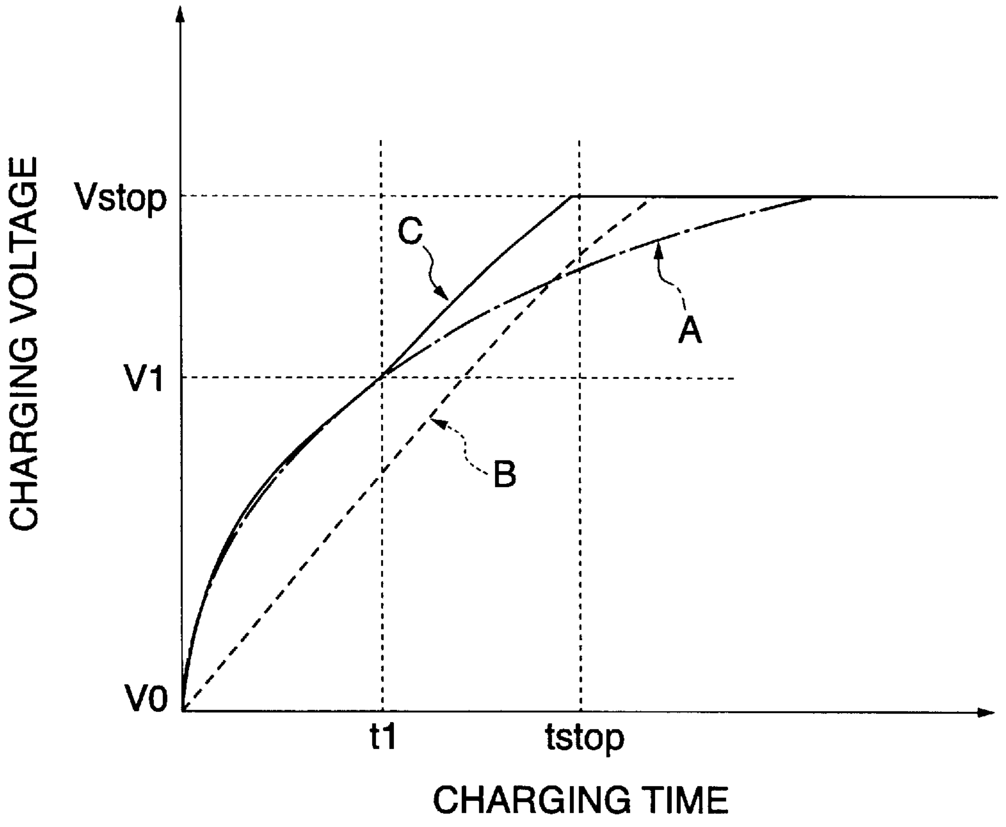
FIG. 5 is a view useful in explaining a charging characteristic of the electronic flash device.

Next, the charging characteristic of the electronic flash device of the present invention will be described with reference to FIG. 5. In the figure, character A denotes a curve which is indicative of charging executed by the forward type charging circuit. Character B denotes a curve which is indicative of charging executed by the flyback type charging circuit. Character C denotes a curve which is indicative of charging executed by the electronic flash device of the present invention. The ordinate denotes the charged voltage of the main capacitor 21. The abscissa denotes the charging time.

The forward type charging circuit has a higher charging speed than the flyback type charging circuit in the former half of charging (curve A), whereas the flyback type charging circuit has a higher charging speed than the forward type charging circuit in the latter half of charging (curve B).

In contrast, the electronic flash device 131 of the present invention uses the forward type charging circuit in the former half of charging, and switches it to the flyback type charging circuit at an intermediate voltage V1 (that is, at a time t1). Thus, the electronic flash device 131 can use a portion of the both charging circuits which has a higher charging speed. Accordingly, the electronic flash device 131 has a higher charging speed than the conventional forward type charging circuit and flyback type charging circuit.

(Second Embodiment)

Figure 6:
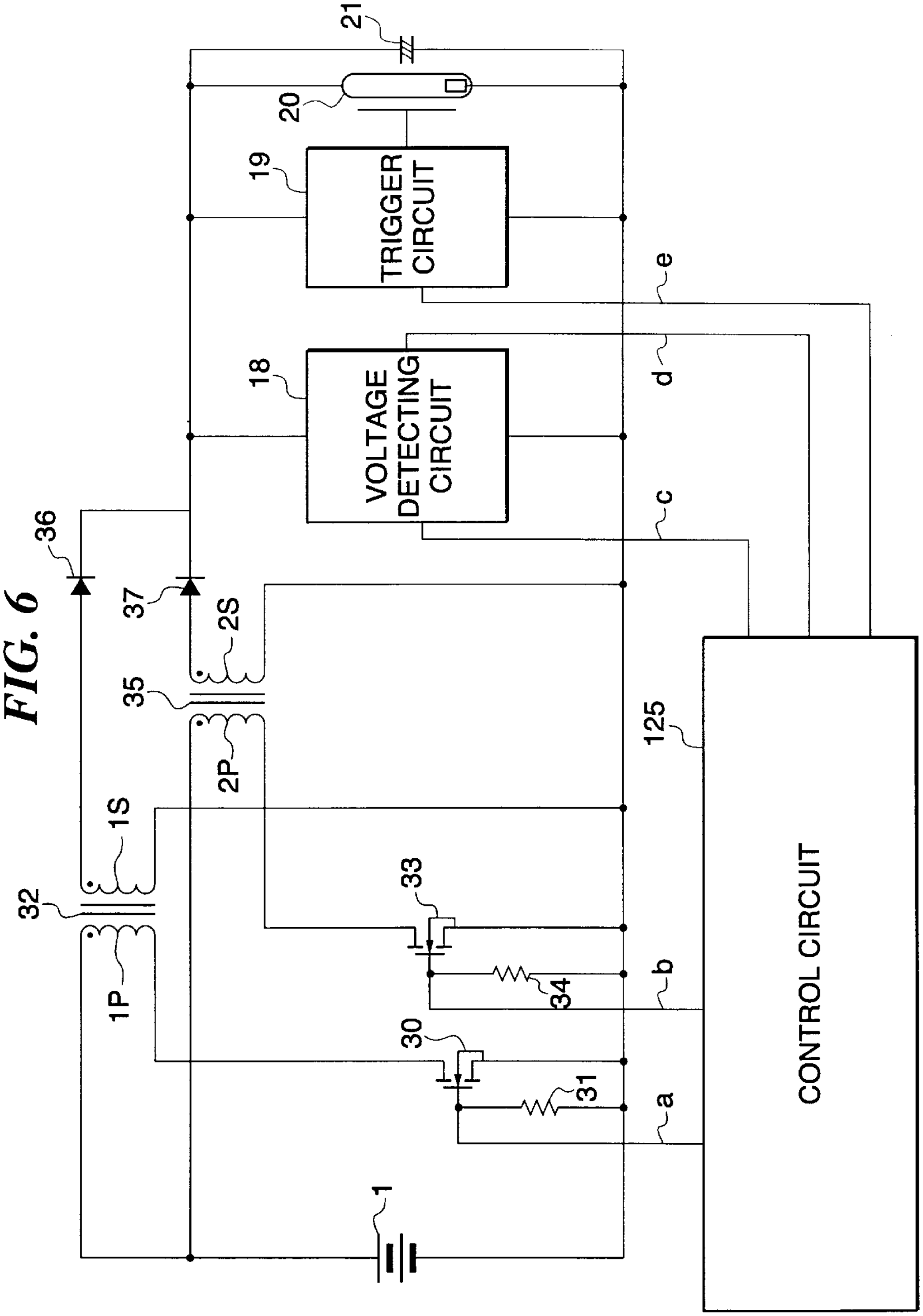
FIG. 6 is a circuit diagram showing the construction of an electronic flash device according to a second embodiment of the present invention.

FIG. 6 is a circuit diagram showing the construction of an electronic flash device according to a second embodiment of the present invention. This embodiment is different from the above described first embodiment in that a forward type charging circuit and a flyback type charging circuit have respective oscillation transformers connected in parallel to a main capacitor 21.

Characteristics of the configuration of the second embodiment will be described in detail with reference to FIG. 6. Components, connection terminals, and the like described below which are equivalent to those in the first embodiment are denoted by the same reference numerals.

Reference numeral 30 denotes a first switch element, 31 a resistor, 32 a first oscillation transformer, and 36 a high-voltage rectifying diode. The first oscillation transformer 32 is comprised of a primary coil 1P and a secondary coil 1S. The resistor 31 is a pull-down resistor connected to a control terminal of the first switch element 30. The primary coil 1P connects a positive electrode of a battery 1 and the first switch element 30 together. One end of the secondary coil 1S is connected to the high-voltage rectifying diode 36. The other end of the secondary coil 1S is connected to a negative electrode of the battery 1 and one of the electrodes of the main capacitor 21. The high-voltage rectifying diode 36 is connected to the other electrode of the main capacitor 21, and a current is allowed to flow to the main capacitor 21.

Likewise, reference numeral 33 denotes a second switch element, 34 a resistor, 35 a second oscillation transformer, and 37 a high-voltage rectifying diode. The second oscillation transformer 35 is comprised of a primary coil 2P and a secondary coil 2S. The resistor 34 is a pull-down resistor connected to a control terminal of the second switch element 33. The primary coil 2P connects the positive electrode of the battery 1 and the second switch element 33 together. One end of the secondary coil 2S is connected to the high-voltage rectifying diode 37. The other end of the secondary coil 2S is connected to the negative electrode of the battery 1 and one of the electrodes of the main capacitor 21. The high-voltage rectifying diode 37 is connected to the other electrode of the main capacitor 21, and a current is allowed to flow to the main capacitor 21.

Next, a control method of increasing the charged voltage of the main capacitor 21 will be described.

The control circuit 125 applies an oscillation signal to the control electrode of the second switch element 33 via a connection terminal b. When the oscillation signal is at a high level, the second switch element 33 is turned on. This causes the forward type booster circuit to start charging the main capacitor 21.

When this signal is at the high level, a current flows through the loop of the positive electrode of the battery 1, the primary coil 2P, the second switch element 33, and the negative electrode of the battery 1. Thus, an induced electromotive force is generated in the secondary coil 2S. Accordingly, the current flows to the main capacitor 21 via the high-voltage rectifying diode 37. Consequently, energy is accumulated in the main capacitor 21. Then, before the core of the second oscillation transformer 35 is saturated with magnetic flux, the above signal is set to a low level so that the core gets free from magnetic flux. The signal is then set to the high level again. The control circuit 125 repeats this operation to intermittently charge the main capacitor 21.

If the charged voltage of the main capacitor 21 reaches an intermediate voltage, the control circuit 125 switches the forward type booster circuit to the flyback type booster circuit. In this case, the control circuit 125 sets the voltage of the signal applied to the second switch element 33 via the connection terminal b, to the low level. This turns off the second switch element 33.

Next, the control circuit 125 applies an oscillation signal to the control electrode of the first switch element 30 via the connection terminal a. When this signal is at the high level, a current flows through the loop of the positive electrode of the battery 1, the primary coil 1P, the first switch element 30, and the negative electrode of the battery 1. Accordingly, an induced electromotive force is generated in the secondary coil 1S. An exciting current is blocked by the high-voltage rectifying diode 36. The exciting current is thus prevented from being discharged from the oscillation transformer 32, and energy is accumulated in the first oscillation transformer 32.

Next, when this signal is set to the low level, the first switch element 30 is turned off. Thus, a counter-electromotive force is generated in the secondary coil 1S. Accordingly, the energy accumulated in the first oscillation transformer 32 is released, and a current flows through the loop of the rectifying diode 36, the main capacitor 21, and the secondary coil 1S.

As a result, the main capacitor 21 is charged. As the oscillation signal repeatedly alternates between the high level and the low level, the main capacitor 21 is intermittently charged. Thus, the voltage across the main capacitor 21 increases. The voltage across the main capacitor 21 finally reaches a charging completion voltage. After the main capacitor 21 has been completely charged, the control circuit 125 applies a low-level signal to the first switch element 30. Consequently, the first switch element 30 is turned off.

Also with the above described configuration, the charging speed of the electronic flash device 131 is improved compared to the conventional construction by combining the forward type charging circuit with the flyback type charging circuit.

(Third Embodiment)

Figure 7:
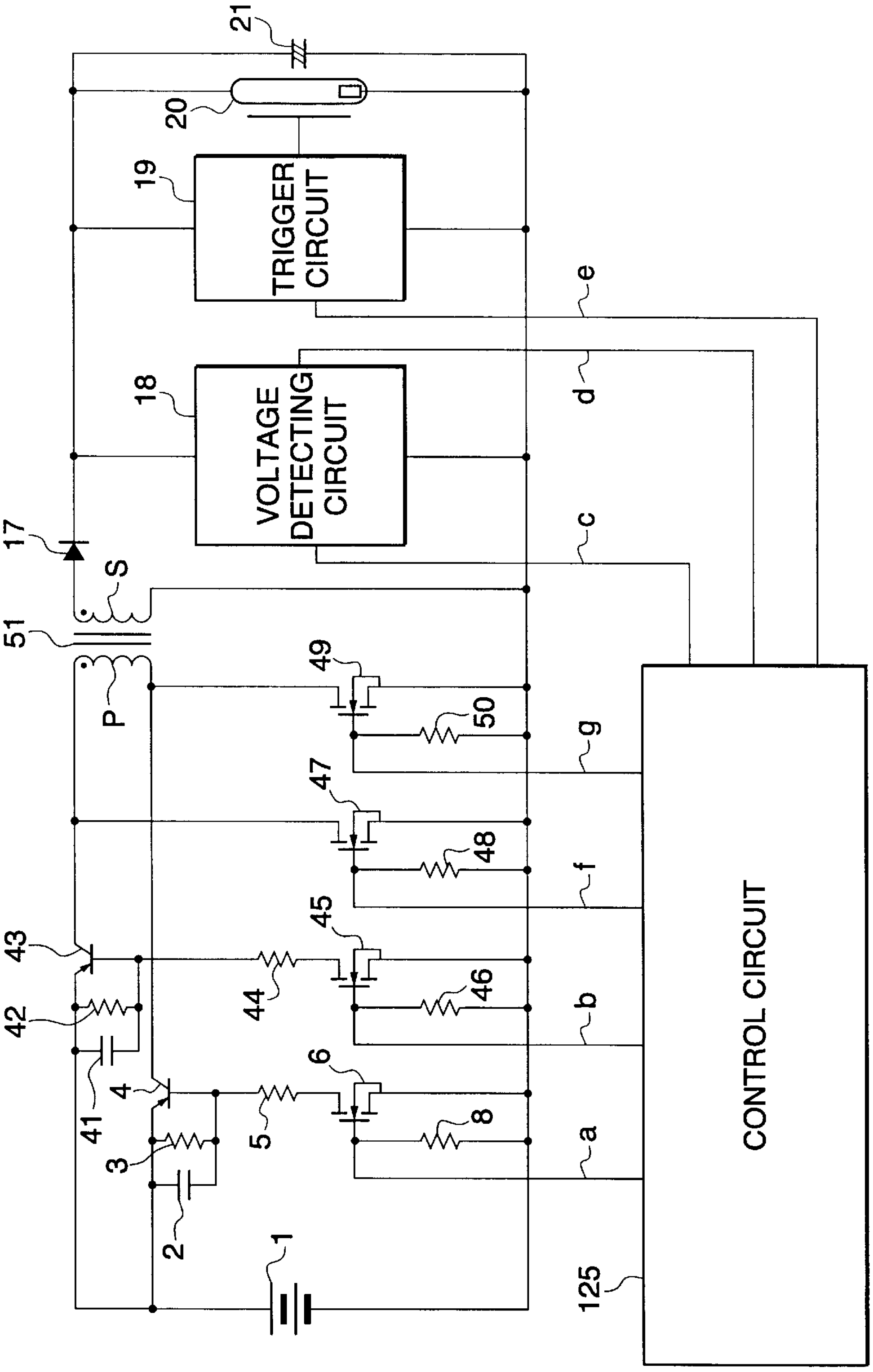
FIG. 7 is a circuit diagram showing the construction of an electronic flash device according to a third embodiment of the present invention.

FIG. 7 is a circuit diagram showing the construction of an electronic flash device according to a third embodiment of the present invention. This embodiment is different from the first embodiment in that the primary coil P has no intermediate terminal.

Characteristics of the configuration of the third embodiment will be described in detail with reference to FIG. 7. Components, connection terminals, and the like described below which are equivalent to those in the first embodiment are denoted by the same reference numerals.

Reference numeral 41 denotes a capacitor, 42 a resistor, 43 a second transistor, 44 a resistor, 45 a second switch element, and 46 a resistor. The capacitor 41 and the resistor 42 are connected in parallel between a source and a gate of the second transistor 43. The resistor 44 connects the gate of the second transistor 43 and the second switch element 45 together, and acts as a current limiting resistor for limiting a gate current. The resistor 46 is a pull-down resistor for the second switch element 45.

Reference numeral 47 denotes a third switch element, 48 a resistor, 49 a fourth switch element, 50 a resistor, and 51 an oscillation transformer. The oscillation transformer 51 is comprised of a primary coil P and a secondary coil S. One end of the secondary coil S is connected to a positive electrode of the battery 1 via a collector and an emitter of the second transistor 43. On the other hand, the other end of the secondary coil S is connected to the positive electrode of the battery 1 via a collector and an emitter of a first transistor 4.

The third switch element 47 is connected to a collector of the second transistor 43, the oscillation transformer 51, and one end of the primary coil P. The switch element 49 is connected to a collector of the first transistor 4 and the other end of the primary coil P. The resistor 48 is a pull-down resistor for the third switch element 47. The resistor 50 is a pull-down resistor for the fourth switch element 49.

Characters f and g denote connection terminals. The connection terminal f connects a control electrode of the third switch element 47 and a control circuit 125 together. The connection terminal g connects a control electrode of the four switch element 49 and the control circuit 125 together.

Next, a control method of increasing the charged voltage of the main capacitor 21 will be described.

First, the control circuit 125 applies an oscillation signal to the control electrode of the second switch element 45 via a connection terminal b. The control circuit 125 also applies a high-level signal to the control electrode of the fourth switch element 49 via the connection terminal g. This turns on the fourth switch element 49.

When an oscillation signal of the high level is applied to the control terminal of the second switch element 45, the second switch element 45 is turned on. This causes the forward type booster circuit to start charging the main capacitor 21.

When the second switch element 45 is turned on, a base current flows through the loop running through a positive electrode of a battery 1, between the emitter and a base of the transistor 43, and through the resistor 44, the second switch element 45, and a negative electrode of the battery 1. Accordingly, a collector current flows through the loop running through the positive electrode of the battery 1, between the emitter and collector of the transistor 43, and through a primary coil P, the fourth switch element 49, and the negative electrode of the battery 1. The direction of the current flowing through the primary coil P at this time is called “the first direction”.

Thus, an induced electromotive force is generated in the secondary coil S. Accordingly, an exciting current flows to a main capacitor 21 via a high-voltage rectifying diode 17. The direction of the current flowing through the secondary coil S at this time is called “the charging direction”. Then, before the core of the oscillation transformer 51 is saturated with magnetic flux, the control circuit 125 sets the signal applied to the connection terminal b, to a low level. Thus, the second switch element 45 is turned off. Accordingly, the flow of a current to the primary coil P of the oscillation transformer is stopped. This state continues until the magnetic flux is eliminated. Then, this signal is set to the high level again. The control circuit 125 then repeats this operation to intermittently charge the main capacitor 21.

If the charged voltage of the main capacitor 21 reaches an intermediate voltage, the control circuit 125 switches a forward type booster circuit to a flyback type booster circuit. In this case, the control circuit 125 sets the voltage of the signal applied to the second switch element 45 via the connection terminal b, to the low level. This turns off the second switch element 45. The control circuit 125 also sets the voltage of the signal applied to the fourth switch element 49 via the connection terminal g, to the low level. This turns off the fourth switch element 49.

Next, the control circuit 125 applies an oscillation signal to a control electrode of a first switch element 6 via a connection terminal a. The control circuit 125 also applies a high-level signal to the control electrode of the third switch element 47 via the connection terminal f. This turns on the third switch element 47.

When the first switch element 6 is turned on, the base current flows through the loop running through the positive electrode of the battery 1, between an emitter and a base of a transistor 4, and through a resistor 5, a first switch element 6, and the negative electrode of the battery 1. Accordingly, the collector current flows through the loop running through the positive electrode of the battery 1, between the emitter and an collector of the transistor 4, and through the primary coil P, the third switch element 47, and the negative electrode of the battery 1. The direction of the current flowing through the primary coil P at this time is defined as the second direction. The second direction is opposite to the above-mentioned first direction.

As a result, an induced electromotive force is generated in the secondary coil S. An exciting current flowing through the secondary coil S is blocked by a high-voltage rectifying diode 17. The exciting current is thus prevented from being discharged from the oscillation transformer 51. Consequently, energy is accumulated in the second oscillation transformer 51.

Next, the control circuit 125 applies a low-level signal to the control electrode of the first switch element 6 via the connection terminal a. This turns off the first switch element 6. Thus, a counter-electromotive force is generated in the secondary coil 2S. Accordingly, the energy accumulated in the oscillation transformer 51 is released, and a current flows through the loop of the rectifying diode 17, the main capacitor 21, and the secondary coil S. At this time, the current flows through the secondary coil S in the above-mentioned charging direction.

As a result, the main capacitor 21 is charged. As the oscillation signal repeatedly alternates between the high level and the low level, the main capacitor 21 is intermittently charged. Thus, the voltage across the main capacitor 21 increases. The voltage across the main capacitor 21 finally reaches a charging completion voltage. After the main capacitor has been completely charged, the control circuit 125 applies a low-level signal to the first switch element 6 and the third switch element 47. Consequently, the first switch element 6 and the third switch element 47 are turned off.

Also with the above described configuration, the charging speed of the electronic flash device 131 is improved compared to the conventional construction by combining the forward type charging circuit with the flyback type charging circuit.

(Fourth Embodiment)

Figure 8:
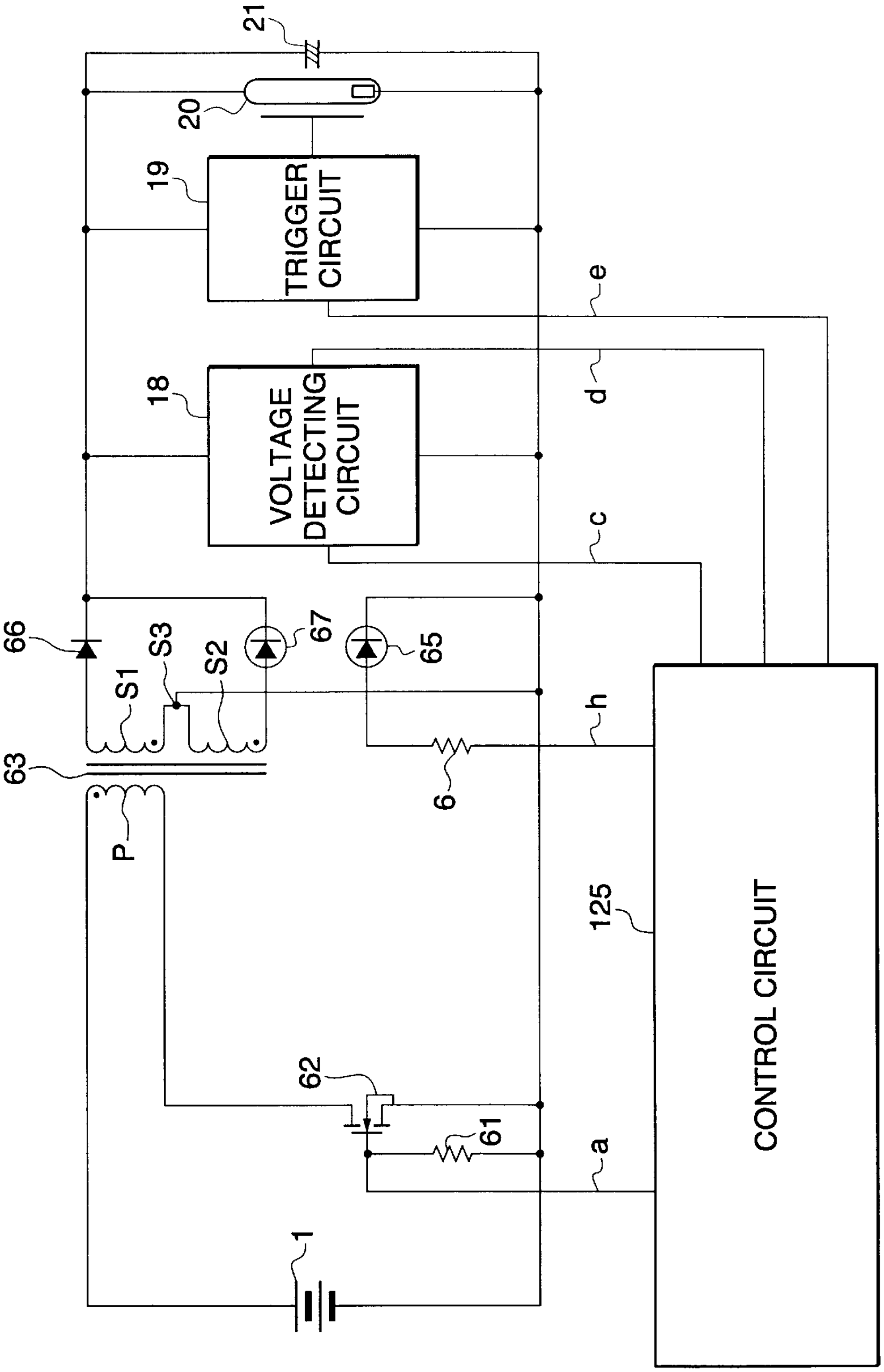
FIG. 8 is a circuit diagram showing the construction of an electronic flash device according to a fourth embodiment of the present invention.

FIG. 8 is a circuit diagram showing the construction of an electronic flash device according to a fourth embodiment of the present invention. This embodiment is different from the first embodiment in that the electronic flash device is constructed to switch a current flowing though a secondary circuit of an oscillation transformer to thereby switch a forward type charging circuit to a flyback type charging circuit.

Characteristics of the configuration of the fourth embodiment will be described in detail with reference to FIG. 8. Components, connection terminals, and the like described below which are equivalent to those in the first embodiment are denoted by the same reference numerals.

Reference numeral 61 denotes a resistor, and 62 a switch element. The resistor 61 is a pull-down resistor for the switch element 62.

Reference numeral 63 denotes an oscillation transformer. The oscillation transformer 63 is comprised of a primary coil P and a secondary coil S. The primary coil connects a positive electrode of a battery 1 and the switch element 62 together. The secondary coil S is comprised of a first coil S1, a second coil S2, and an intermediate terminal S3 connecting the first coil S1 and the second coil S2 together. The first coil S1 is connected to one of the electrodes of a main capacitor 21 via a high-voltage rectifying diode 66, described later. The second coil S2 is connected to the above-mentioned one of the electrodes of the main capacitor via an optical thyrister, described later. The intermediate terminal S3 is connected to the other electrode of the main capacitor 21 and a negative electrode of the battery 1.

Reference numeral 64 denotes a resistor, 65 a light emitting diode, 66 a high-voltage rectifying diode, and 67 denotes an optical thyrister. The light emitting diode 65 is connected to the resistor 64 to allow a current flowing from the resistor to pass therethrough. The high-voltage rectifying diode 66 is connected to the second coil S2 to allow a current to flow therefrom to the above-mentioned one of the electrodes of the main capacitor 21. The optical thyrister 67 becomes electrically conductive when the light emitting diode 65 applies light. An anode of the optical thyrister 67 is connected to the second coil S2. A cathode of the optical thyrister 67 is connected to the above-mentioned one of the electrodes of the main capacitor 21.

Character h denotes a connection terminal. The connection terminal h connects the resistor 64 and the light emitting diode 65 together.

Next, a control method of increasing the charged voltage of the main capacitor 21 will be described.

First, the control circuit 125 applies a high-level signal to the light emitting diode 65 via the connection terminal h had the resistor 64. As a result, the light emitting diode 65 is lighted to irradiate the optical thyrister 67 with light. The optical thyrister 67 thus becomes electrically conductive.

Next, a control circuit 125 applies an oscillation signal to the switch element 62 via a connection terminal a. When this oscillation signal is at a high level, the switch element 62 is turned on. This causes a forward type booster circuit to start charging the main capacitor 21.

When the switch element 62 is turned on, a current flows through the loop of a positive electrode of a battery 1, a primary coil P, the switch element 62, and a negative electrode of the battery 1. The direction of the current flowing through the primary coil P at this time is defined as the charging direction.

As a result, an induced electromotive force is generated in the second coil S2. Thus, an exciting current flows to the main capacitor 21 via the anode and cathode of the optical thyrister 67. The direction of the current flowing through the second coil S2 is defined as the first direction.

Next, before the core of the oscillation transformer 63 is saturated with magnetic flux, the control circuit 125 sets the signal applied to the connection terminal a, to a low level. Thus, the switch element 62 is turned off. Accordingly, the flow of a current to the primary coil P of the oscillation transformer 63 is stopped. This state continues until the magnetic flux is eliminated. Then, this signal is set to the high level again. The control circuit 125 then repeats this operation to intermittently charge the main capacitor 21.

If the charged voltage of the main capacitor 21 reaches an intermediate voltage, the control circuit 125 switches the forward type booster circuit to the flyback type booster circuit. In this case, the control circuit 125 sets the voltage of the signal applied to the light emitting diode 65 via the connection terminal h and the resistor 64, to the low level. This extinguishes the light emitting diode 65.

The control circuit 125 still applies an oscillation signal to the switch element 62 via the connection terminal a. When the oscillation signal is at the high level, as described above, a current flows through the loop of the positive electrode of the battery 1, the primary coil P, the switch element 62, and the negative electrode of the battery 1. At this time, the current flows through the primary coil P in the above-mentioned charging direction.

As a result, an induced electromotive force is generated in the first coil S1. An exciting current flowing through the first coil S1 is blocked by the high-voltage rectifying diode 66. The exciting current is thus prevented from being discharged from the oscillation transformer 63. Consequently, energy is accumulated in the oscillation transformer 63.

Next, the control circuit 125 applies a low-level signal to the control electrode of the switch element 62 via the connection terminal a. This turns off the switch element 62. Thus, a counter-electromotive force is generated in the first coil S1. Accordingly, the energy accumulated in the oscillation transformer 63 is released, and a current flows through the loop of the rectifying diode 66, the main capacitor 21, the intermediate terminal S3, and the first coil S1.

As a result, the main capacitor 21 is charged. As the oscillation signal repeatedly alternates between the high level and the low level, the main capacitor 21 is intermittently charged. Thus, the voltage across the main capacitor 21 increases. The voltage across the main capacitor 21 finally reaches a charging completion voltage. After the main capacitor has been completely charged, the control circuit 125 applies a low-level signal to the switch element 62. Consequently, the switch element 62 is turned off.

Also with the above described configuration, the charging speed of the electronic flash device 131 is improved compared to the conventional construction by combining the forward type charging circuit with the flyback type charging circuit.

(Fifth Embodiment)

Figure 9:
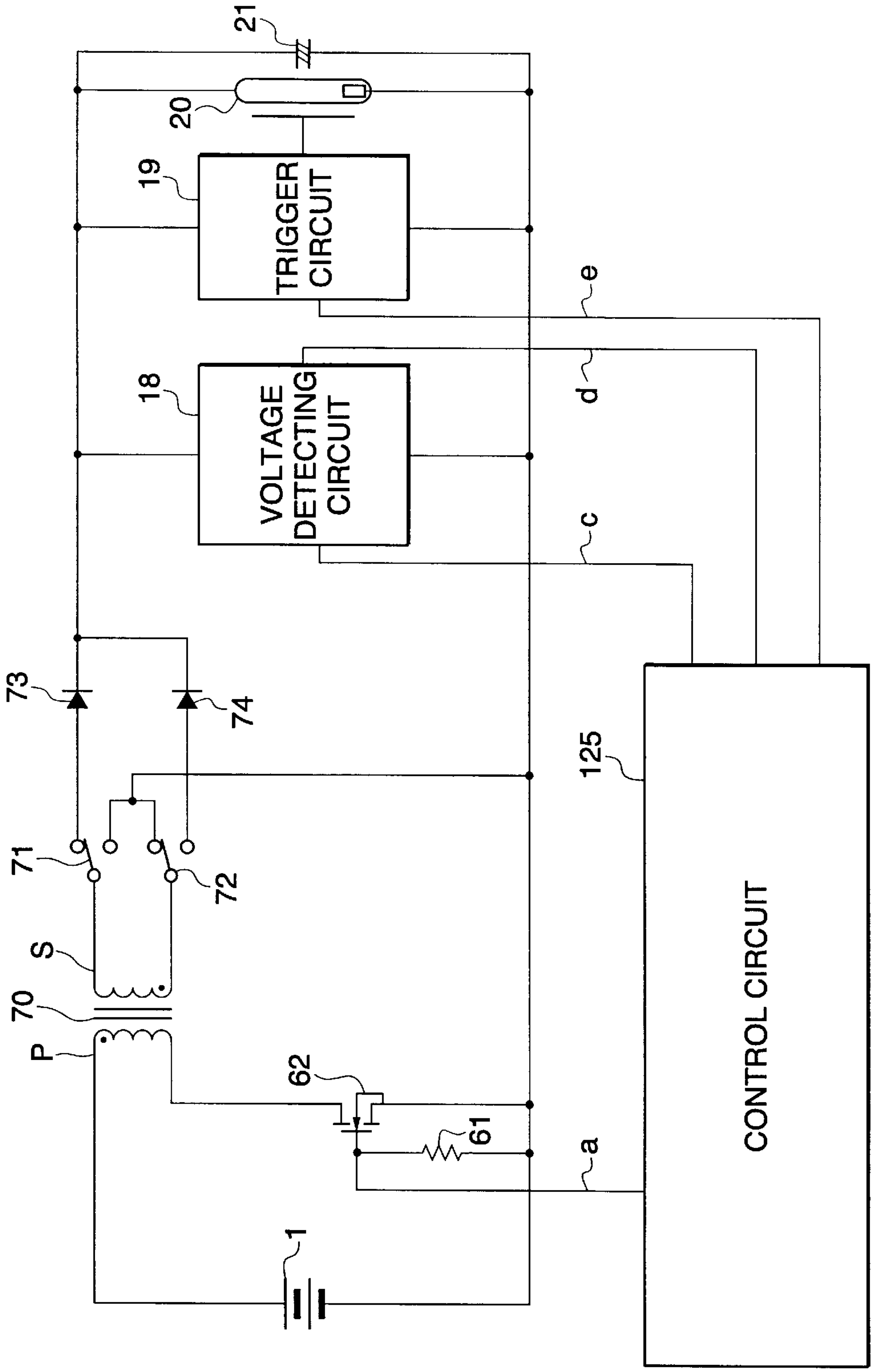
FIG. 9 is a circuit diagram showing the construction of an electronic flash device according to a fifth embodiment of the present invention.

FIG. 9 is a circuit diagram showing the construction of an electronic flash device according to a fifth embodiment of the present invention. This embodiment is different from the first embodiment that, as in the fourth embodiment, the electronic flash device is constructed to switch a current flowing though a secondary circuit of an oscillation transformer to thereby switch a forward type charging circuit to a flyback type charging circuit.

Characteristics of the configuration of the fifth embodiment will be described in detail with reference to FIG. 9. Components, connection terminals, and the like described below which are equivalent to those in the first embodiment are denoted by the same reference numerals.

Reference numeral 70 denotes an oscillation transformer, 71 and 72 interlocked switch elements, and 73 and 74 high-voltage rectifying diodes. The oscillation transformer 70 is comprised of a primary coil P and a secondary coil S. The switch elements 71 and 72 are connected to respective corresponding ends of the secondary coil. The switch elements 71 and 72 are controlled by a control circuit 125. The high-voltage rectifying diodes 73 and 74 are connected to the switch elements 71, 72 and one of the electrodes of a main capacitor 21 to allow a current to flow from the secondary coil S to the main capacitor 21.

Next, a control method of increasing the charged voltage of the main capacitor 21 will be described.

First, the control circuit 125 connects the switch elements 71 and 72 to points which are different from those shown in FIG. 9. The control circuit 125 then applies an oscillation signal to a switch element 62 via a connection terminal a. When this oscillation signal is at a high level, the switch element 62 is turned on. This causes the forward type booster circuit to start charging the main capacitor 21.

When the switch element 62 is turned on, a current flows through the loop of a positive electrode of a battery 1, the primary oil P, the switch element 62, and a negative electrode of the battery 1. The direction of the current flowing through the primary coil P at this time is called "the charging direction".

As a result, an induced electromotive force is generated in the secondary coil S. Thus, an exciting current flows to the main capacitor 21 via the switch element 72 and the diode 74. The direction of the current flowing through the secondary coil S at this time is called "the first direction".

Next, before the core of the oscillation transformer 70 is saturated with magnetic flux, the control circuit 125 sets the signal applied to the connection terminal a, to a low level. Thus, the switch element 62 is turned off. Accordingly, the flow of a current to the primary coil P of the oscillation transformer 70 is stopped. This state continues until the magnetic flux is eliminated. Then, this signal is set to the high level again. The control circuit 125 then repeats this operation to intermittently charge the main capacitor 21.

If the charged voltage of the main capacitor 21 reaches an intermediate voltage, the control circuit 125 switches the forward type booster circuit to the flyback type booster circuit. In this case, the control circuit 125 connects the switch elements 71 and 72 to the same points as those shown in FIG. 9.

The control circuit 125 still applies an oscillation signal to the switch element 62 via the connection terminal a. When the oscillation signal is at the high level, a current flows through the loop of the positive electrode of the battery 1, the primary coil P, the switch element 62, and the negative electrode of the battery 1. At this time, the current flows through the primary coil P in the above-mentioned charging direction.

As a result, an induced electromotive force is generated in the secondary coil S. An exciting current flowing through the secondary coil S is blocked by the high-voltage rectifying diode 73. The exciting current is thus prevented from being discharged from the oscillation transformer 70. Consequently, energy is accumulated in the oscillation transformer 70.

Next, the control circuit 125 applies a low-level signal to the control electrode of the switch element 62 via the connection terminal a. This turns off the switch element 62. Thus, a counter-electromotive force is generated in the secondary coil S. Accordingly, the energy accumulated in the oscillation transformer 70 is released, and a current flows through the loop of the high-voltage rectifying diode 73, the main capacitor 21, the switch element 72, and the secondary coil S. The direction of the current flowing through the secondary coil S at this time is defined as the second direction. The second direction is opposite to the above-mentioned first direction.

As a result, the main capacitor 21 is charged. As the oscillation signal repeatedly alternates between the high level and the low level, the main capacitor 21 is intermittently charged. Thus, the voltage across the main capacitor 21 increases. The voltage across the main capacitor 21 finally reaches a charging completion voltage. After the main capacitor has been completely charged, the control circuit 125 applies a low-level signal to the switch element 62. Consequently, the switch element 62 is turned off.

Also with the above described configuration, the charging speed of the electronic flash device 131 is improved compared to the conventional construction by combining the forward type charging circuit with the flyback type charging circuit.

(Sixth Embodiment)

Figure 10:
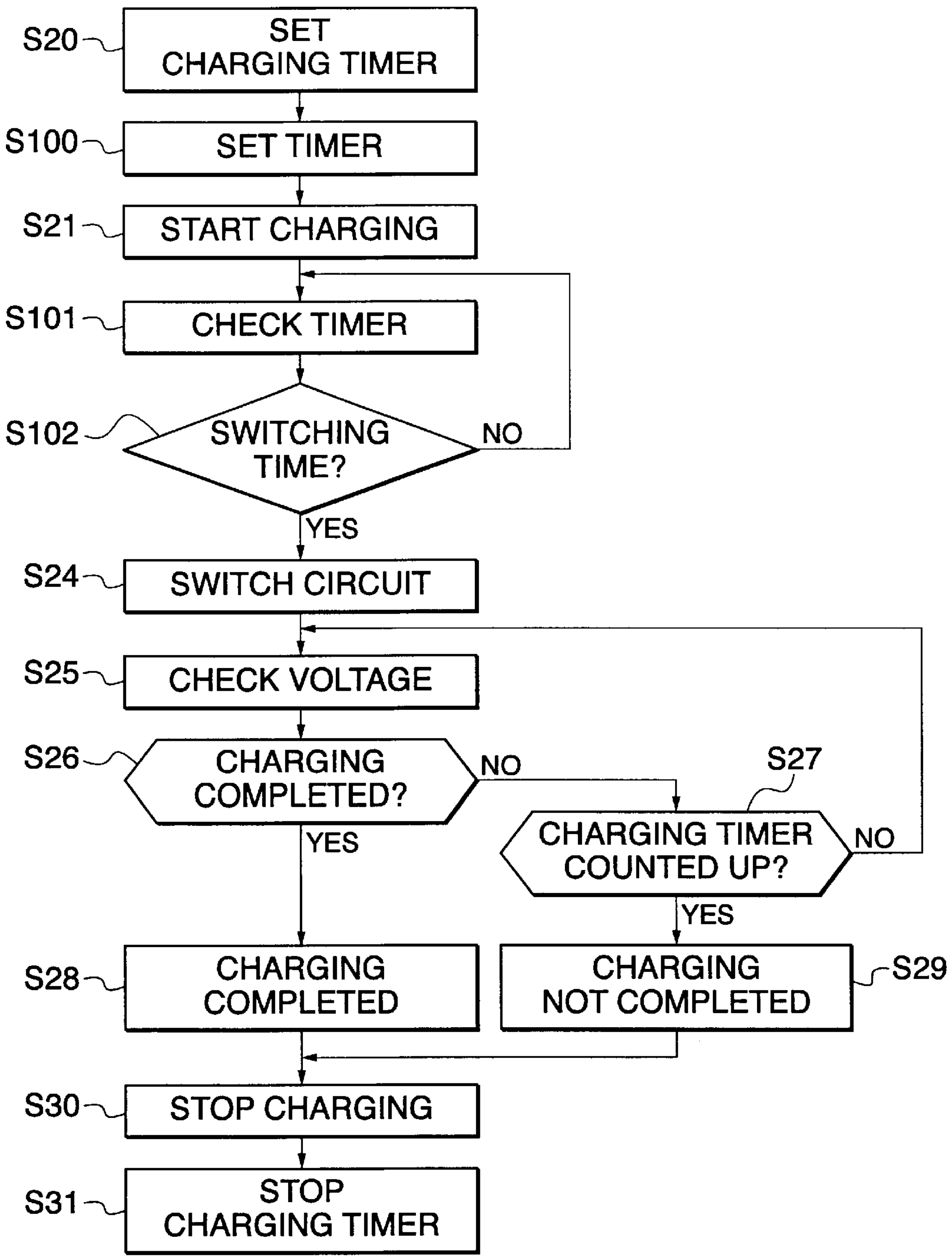
FIG. 10 is a flow chart showing the flow of a operation of the electronic flash device in the flash mode.

FIG. 10 is a flow chart similar to FIG. 4, showing the flow of an operation of an electronic flash device according to a sixth embodiment of the present invention in a flash mode. This embodiment is different from the first embodiment in that a timer is used to switch a forward type booster circuit to a flyback type booster circuit.

The operation of an electronic flash device 131 performed in the flash mode (step S9) according to the sixth embodiment will be described with reference to FIG. 10. Operational steps in the figure which are identical or similar to those of the sequence in FIG. 4 are denoted by the same reference numerals.

In this embodiment, a control circuit 125 is comprised of a setting circuit and a switching circuit (neither of them is shown). The setting circuit sets an intermediate time corresponding to an intermediate voltage based on the conditions of a battery 1. The switching circuit causes the forward type booster circuit to charge a main capacitor 21 when the charging time is shorter than the intermediate time, and switches the forward type booster circuit to the flyback type booster circuit to cause the flyback type booster circuit to charge the main capacitor 21 when the time taken for charging the main capacitor 21 has reached the intermediate time.

First, the control circuit 125 sets the charging timer at, for example, 10 to 15 seconds (step S20).

Then, the setting circuit uses a battery check circuit (not shown in FIG. 2) to set an appropriate timer time at which the forward type booster circuit is to be switched to the flyback type booster circuit, depending on the conditions of the battery 1 (step S100). The conditions of the battery 1 include the released voltage of the battery, and the internal resistance of the battery which is calculated from a voltage assumed when a predetermined current is caused to flow through the battery. The setting circuit predicts the charged state of the battery 1 based on the conditions of the battery 1 and sets the timer time by converting the intermediate voltage into the switching time.

Next, the switching circuit causes the forward type booster circuit to start charging the main capacitor 21 (step S21). The switching circuit then checks the timer time (step S101). Once the charging time reaches the switching time (step S102), the switching circuit switches the forward type booster circuit to the flyback type booster circuit (step S24).

The subsequent steps of the control method are the same as those of the control method according to the above described embodiments, and description thereof is omitted.

Also with the above described construction, the control circuit can switch the forward type charging circuit to the flyback type charging circuit by using the switching time calculated based on the charged state of the battery 1.

Various modifications or alterations to the above embodiments are possible. For example, in the fourth embodiment, elements similar to the optical thyrister 67 and the light emitting diode 65 may be used in place of the diode 66.

Further, in the fifth embodiment, mechanical or electric switches for plungers, motors, or the like may be used as the switches 71 and 72.

(Seventh Embodiment)

Figure 11:
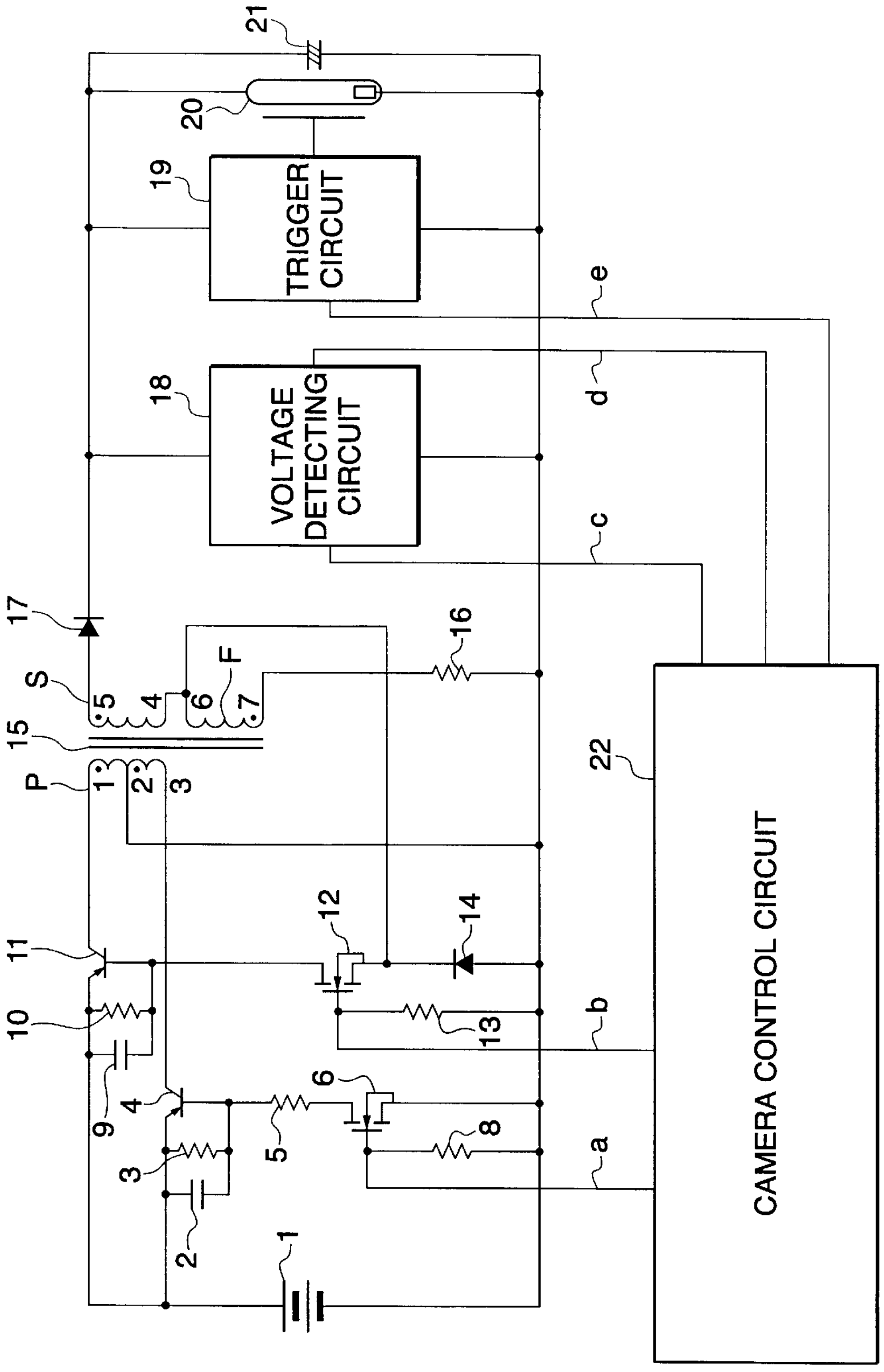
FIG. 11 is a circuit diagram showing the construction of an electronic flash device according to a seventh embodiment of the present invention.
Figure 12:
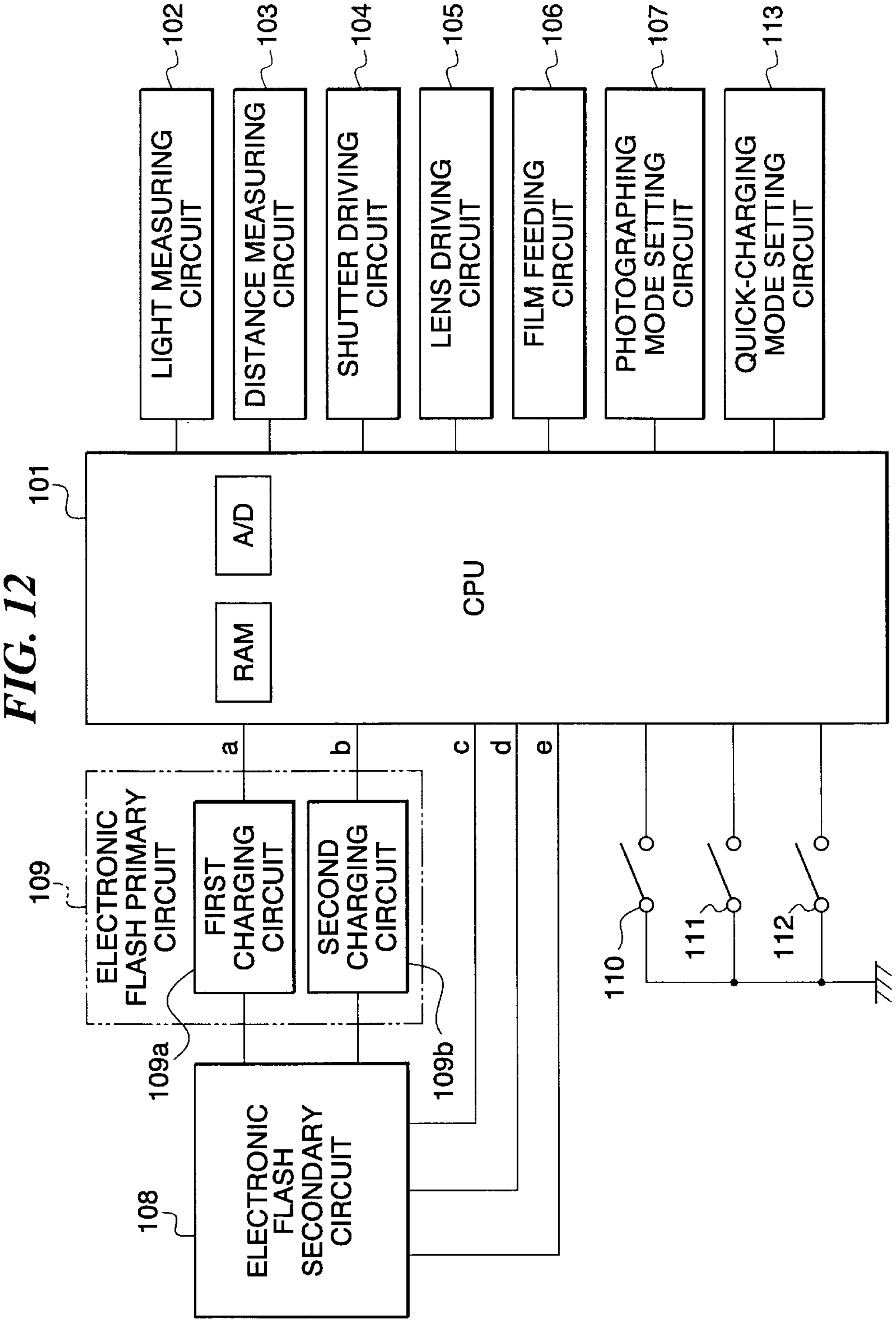
FIG. 12 is a block diagram showing the construction of a camera control device for controlling the electronic flash device according to the seventh embodiment.
Figure 13A:
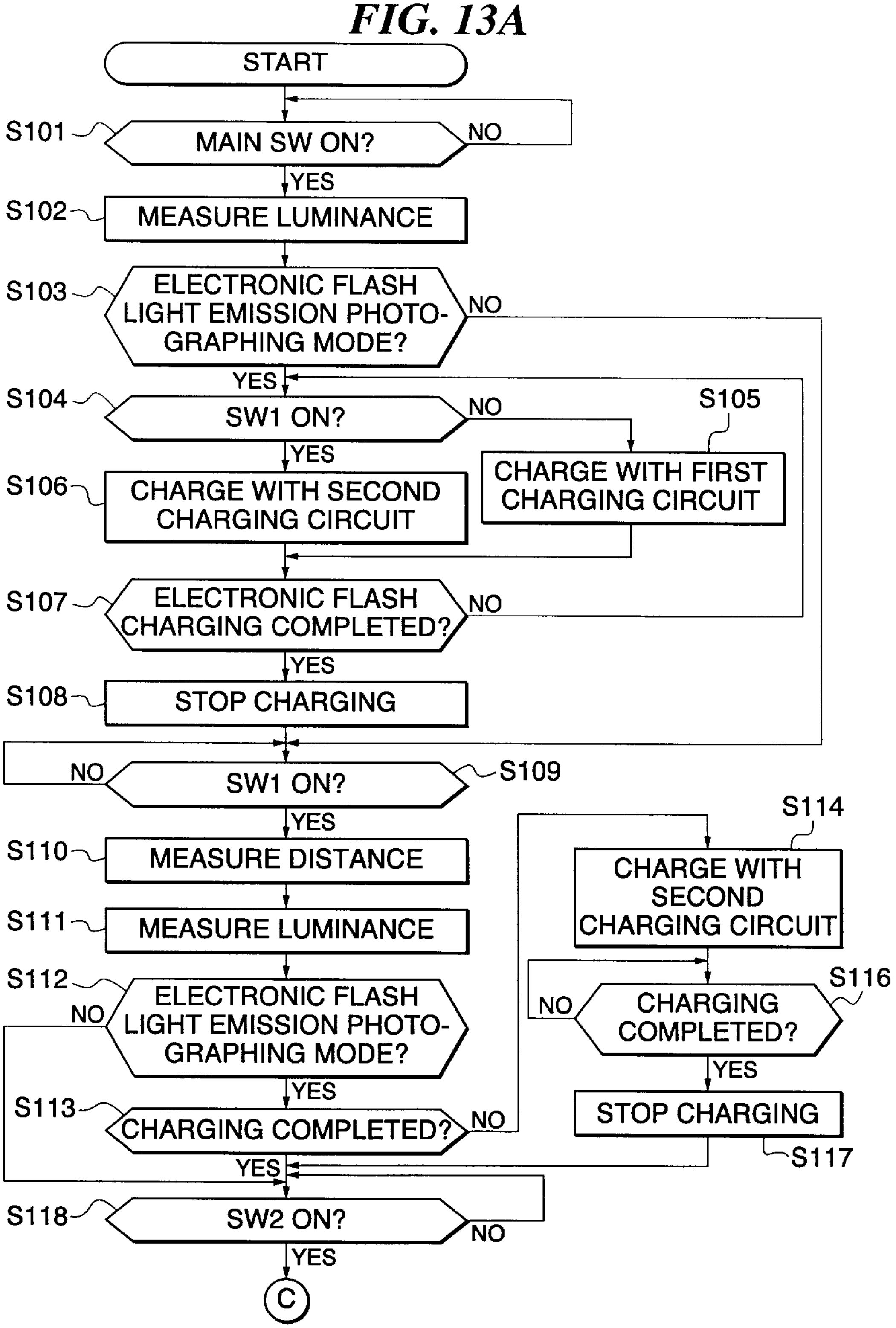
FIGS. 13A and 13B is a flow chart showing the flow of an operation of a camera according to the seventh embodiment.
Figure 13B:
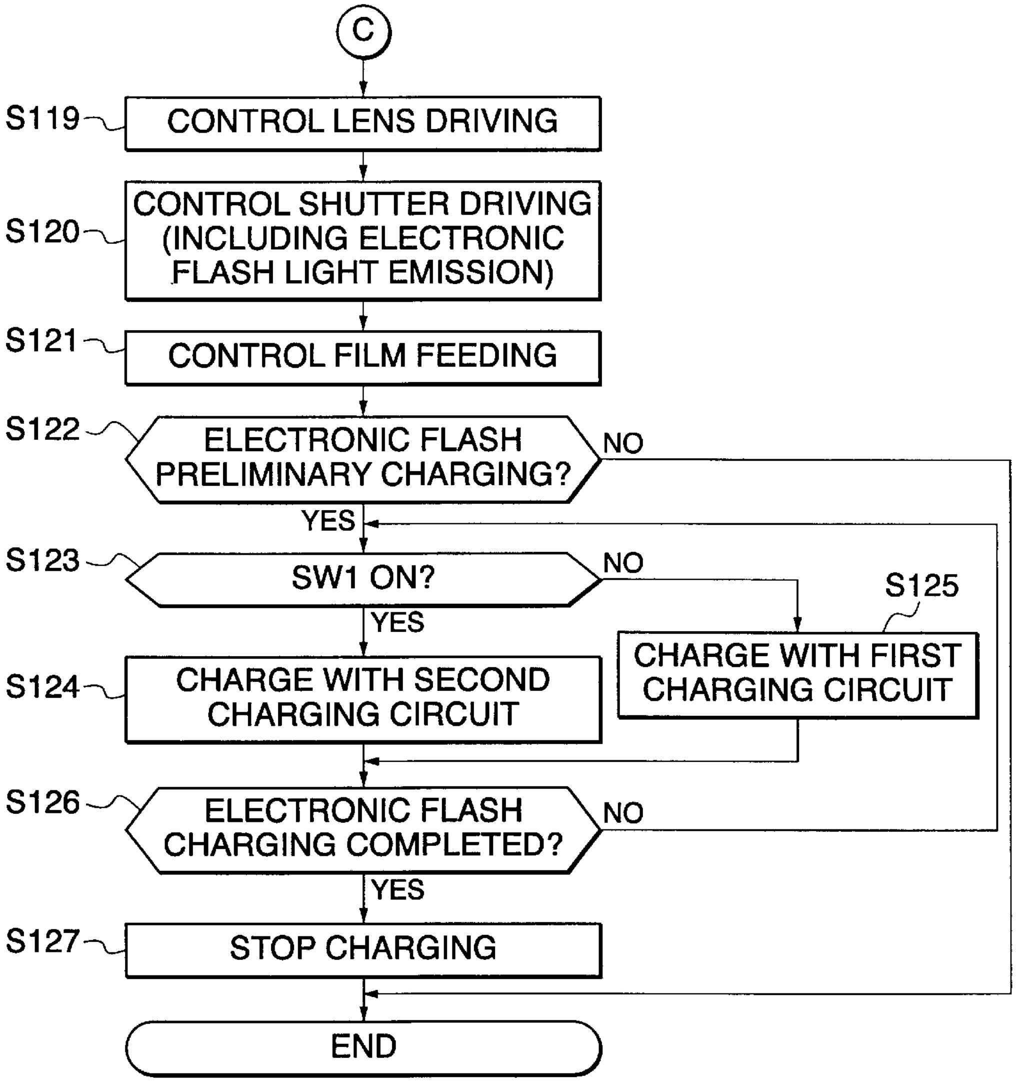

FIGS. 11 and 13 are views useful in explaining a seventh embodiment of a camera having an electronic flash device of the present invention. FIG. 11 is a circuit diagram showing the construction of the electronic flash device. FIG. 12 is a block diagram showing the construction of a camera controller for controlling the electronic flash device. FIGS. 13A and 13B is a flow chart showing the flow of an operation of this camera.

First, the construction of a circuit of the electronic flash device will be described with reference to FIG. 11.

Reference numeral 1 denotes a battery as a power supply, 2 a capacitor, 3 a resistor, and 4 a first oscillation transformer. A parallel circuit of the capacitor 2 and the resistor 3 is connected between a base and an emitter of the first oscillation transistor 4. Reference numeral 5 denotes a resistor, 6 an FET as a first switch, and 8 a pull-down resistor for a control terminal of the first switch element 6.

Reference numeral 9 denotes a capacitor, 10 a resistor, and 11 a second oscillation transistor. A parallel circuit of the capacitor 9 and the resistor 10 is connected between a base and an emitter of the second oscillation transistor 11. Reference numeral 12 denotes an FET as a second switch element. Reference numeral 13 denotes a resistor, and 14 denotes a diode. The resistor 13 is connected as a pull-down resistor to a control terminal of the second switch element 12. An anode of the diode 14 is connected to a negative electrode of the battery 1, while a cathode thereof is connected to the second switch element 12.

Reference numeral 15 denotes an oscillation transformer including a primary coil P having an intermediate tap. An intermediate electrode attached to this intermediate tap is connected to the negative electrode of the battery 1. The opposite ends of the primary coil P of the oscillation transformer 15 are connected, respectively, to a collector of the first oscillation transistor 4 and a collector of the second oscillation transistor 11. The junction between a secondary coil S of the oscillation transformer 15 and a feedback coil F is connected to the second switch element 12 and the cathode of the diode 14.

Reference numeral 16 denotes a resistor which is connected to the feedback coil F of the oscillation transformer 15 so as to limit a current flowing through the feedback coil F of the oscillation transformer 15. Reference numeral 17 denotes a high-voltage rectifying diode, 18 a voltage detecting circuit, 19 a trigger circuit, 20 a discharge tube, and 21 a main capacitor. An output terminal of the trigger circuit 19 is connected to a trigger electrode of the discharge tube 20. The discharge tube 20 is connected in parallel to the main capacitor 21, and the voltage detecting circuit 18 is also connected in parallel to the main capacitor 21 to detect the voltage across the main capacitor 21. Reference numeral 22 denotes a camera control circuit.

This electronic flash circuit is connected to the camera control circuit 22 (specifically, a CPU 101, described later) via connection lines a to e and is controlled by this camera control circuit 22.

The connection line a is connected to a control electrode of the first switch element 6 of the camera control circuit 22. The connection line b is connected to a control electrode of the second switch element 12.

The connection line c is a voltage detection driving signal line for driving the voltage detecting circuit 18. The connection line d is used to output the voltage across the main capacitor 21 as detected by the voltage detecting circuit 18. Upon receiving the voltage detection driving signal output by the CPU 101 via the connection line c, the voltage detecting circuit 18 detects the voltage across the main capacitor 21, divides the detected voltage, and then supplies the divided voltage to the CPU 101 via the connection line d.

The connection line e is connected to an input terminal of the trigger circuit 19. Upon receiving a control signal for activating light emission from the CPU 101 via the connection line e, the trigger circuit 19 outputs a trigger voltage through its output terminal to cause the discharge tube 20 to emit light.

Next, the entire construction of the camera having the above described electronic flash circuit will be described with reference to FIGS. 11 and 12.

Reference numeral 101 denotes a CPU for carrying out sequence control of the entire camera. The CPU 101 includes a RAM that stores various information, and an A/D circuit for converting analog signals into digital ones. Reference numeral 102 denotes a light measuring circuit for detecting the luminance of an object. Reference numeral 103 denotes a distance measuring circuit for detecting the distance to the object. Reference numeral 104 denotes a shutter driving circuit for controlling the opening of the shutter based on the result of the detection by the light measuring circuit 102.

Reference numeral 105 denotes a lens driving circuit for driving a photographing lens based on the result of the detection by the distance measuring circuit 103, to focus a film surface on the object. Reference numeral 106 denotes a film feeding circuit for automatically loading, winding, or rewinding a film. Reference numeral 107 denotes a photographing mode setting circuit for setting a photographing mode of the camera. Reference numeral 113 denotes a quick-charge-mode setting circuit for setting either speed charging in which priority is given to the speed or energy saving charging in which priority is given to efficiency.

Reference numeral 108 denotes a stroboscopic secondary circuit for executing stroboscopic light emission during flash photographing. As shown in FIG. 11, the stroboscopic secondary circuit 108 is comprised of the oscillation transformer 15, the resistor 16, the high-voltage rectifying diode 17, the voltage detecting circuit 18, the trigger circuit 19, the discharge tube 20, and the main capacitor 21.

Reference numeral 109 denotes an electronic flash primary circuit for charging the main capacitor 21 provided in the electronic flash device. As shown in FIG. 12, the electronic flash primary circuit 109 is comprised of a first charging circuit 109*a,* and a second charging circuit 109*b,* which are selectively actuated.

The first charging circuit 109*a* is comprised of the capacitor 2, the resistor 3, the first oscillation transistor 4, the resistor 5, the first switch element 6, the resistor 8, and the oscillation transformer 15, as shown in FIG. 11. On the other hand, the second charging circuit 109*b* is comprised of the capacitor 9, the resistor 10, the second oscillation transistor 11, the second switch element 12, the resistor 13, the diode 14, and the oscillation transformer 15, as shown in FIG. 11.

Reference numeral 110 denotes a main switch (main SW) for starting the operation of the camera. Reference numeral 111 denotes an SW1 switch which causes detecting operations such as light measurement and distance measurement to be executed when turned on. On the other hand, reference numeral 112 denotes an SW2 switch which is turned on by a second stroke of depression of a shutter button. When the SW2 switch is turned on, the CPU 101 outputs an actuation signal for a photographing sequence executed after the SW1 switch 111 has been turned on.

Next, the operation of the first charging circuit 109*a* and the second charging circuit 109*b* will be described in detail.

The first charging circuit 109*a* is comprised of the capacitor 2, the resistor 3, the first oscillation transistor 4, the resistor 5, the first switch element 6, the resistor 8, and the oscillation transformer 15, as described above. To start charging by the first charging circuit 109*a*, the CPU 101 supplies a predetermined oscillation signal to the control electrode of the first switch element 6, shown in FIG. 1, via the connection terminal a. Here, the predetermined oscillation signal is a separate-excitation signal composed of a high-level signal and a low-level signal which are repeatedly alternately output with a predetermined period.

With the electronic flash device constructed as above, when the high-level signal is applied to the control electrode of the first switch element 6, the first switch element 6 is turned on, whereby a base current from the first oscillation transistor 4 flows via the current limiting resistor 5. Then, when the first oscillation transistor 4 thus becomes electrically conductive, a collector current which is $h_{fe}$ times as high as the base current flows through the loop running through the positive electrode of the battery 1, between the emitter and collector of the first oscillation transistor 4, and through the intermediate terminal of the primary coil P of the oscillation transformer 15 and the negative electrode of the battery 1.

Thus, an induced electromotive force is generated in the secondary coil S. This induced electromotive force, however, has such a polarity that it is blocked by the high-voltage rectifying diode 17, so that no exciting current flows from the oscillation transformer 15. Consequently, energy is accumulated in the oscillation transformer 15.

Next, when the low-level signal is applied to the control electrode of the first switch element 6, the first switch element 6 is turned off to block the base current from flowing from the first oscillation transistor 4, which thus becomes electrically non-conductive. Consequently, a counter-electromotive force is generated in the secondary coil S of the oscillation transformer 15. This counter-electromotive force causes the energy accumulated in the oscillation transformer 15 to be discharged therefrom. At this time, a current flows through the loop of the high-voltage rectifying diode 17, the main capacitor 21, and the diode 14, and charges are accumulated in the main capacitor 21.

Furthermore, when the high-level signal is again applied to the control electrode of the first switch element 6 immediately after the energy has been discharged from the oscillation transformer 15, the first switch element 6 and the first oscillation transistor 4 similarly become electrically conductive again to accumulate energy in the oscillation transformer 15. The low-level signal subsequently applied to the control electrode of the first switch element 6 makes the first switch element 6 and the first oscillation transistor 4 electrically non-conductive to discharge the accumulated energy from the oscillation transformer 15, accumulating charges in the main capacitor 21. In the electronic flash circuit, this operation is repeated to increase the voltage across the main capacitor 21. This charging circuit is generally called “the flyback type charging circuit”.

The CPU 101 repeats this operation to charge the main capacitor 21, while applying the voltage detection driving signal to the voltage detecting circuit 18 via the connection line c and receiving, via the connection line d, the divided voltage of the main capacitor 21 output by the voltage detecting circuit 18, to detect the charged voltage of the main capacitor 21. This voltage detection is executed via the A/D converter shown in FIG. 2, provided in the CPU 101. When the charged voltage reaches a predetermined value, the CPU 101 determines that the main capacitor 21 is completely charged.

On the other hand, the second charging circuit 109*b* is comprised of the capacitor 9, the resistor 10, the second oscillation transistor 11, the second switch element 12, the resistor 13, the diode 14, and the oscillation transformer 15, as described above.

The CPU 101 outputs the low-level signal through the connection line a, while outputting the high-level signal to the control electrode of the second switch element 12 via the connection line b. This causes the first switch element 6 to remain off (electrically non-conductive), while turning on the second switch element 12.

In the electronic flash device, when the second switch element 12 is turned on, a base current for the second oscillation transistor 11 flows from the battery 1, between the base and emitter of the second oscillation transistor 11, and through the second switch element 12 and the feedback coil F of the oscillation transformer 15 to the resistor 16. Accordingly, a collector current which is $h_{fe}$ times as high as this base current flows to the negative electrode of the battery 1 via the primary coil P of the oscillation transformer 15 and the intermediate terminal.

This collector current induces an induced electromotive force in the secondary coil S of the oscillation transformer 15 to charge the main capacitor 21 with a current flowing the loop running through the high-voltage rectifying diode 17 and the main capacitor 21, the battery 1, between the base and emitter of the second oscillation transistor 11, and through the second switch element 12, the secondary coil S of the oscillation transformer 15, and the high-voltage rectifying diode 17. This induced electromotive force also acts as a base current for the second oscillation transistor 11, thus increasing the base current for the oscillation transistor 11. Thus, a positive feedback is applied to the base current for the oscillation transistor 11 to instantaneously set the voltage between the collector and emitter of the second oscillation transistor 11 in a saturated state.

Further, when a certain period of time has elapsed since the above-mentoined current started to flow, the core of the oscillation transformer 15 is saturated with magnetic flux to generate a counter-electromotive force in the secondary coil S of the oscillation transformer 15 and the feedback coil F. The counter-electromotive force generated in the secondary coil S of the oscillation transformer 15 applies a base reverse bias to the second oscillation transistor 11 using the loop running through the second switch element 12, between the base and emitter of the second oscillation transistor 11, and through the battery 1, the main capacitor 21, a parasitic capacity of the high-voltage rectifying diode 11, and the secondary coil S of the oscillation transformer 15. The counter-electromotive force generated in the feedback coil F of the oscillation transformer 15 also applies a base reverse bias to the second oscillation transistor 11 using the loop running through the second switch element 12, between the base and emitter of the second oscillation transistor 11, and through the battery 1, the resistor 16, and the feedback coil F, thus rapidly making the second oscillation transistor 11 electrically non-conductive.

Then, once the core of the oscillation transformer 15 is released from saturation with magnetic flux, a base current flows through the second oscillation transistor 11 again, which thus repeatedly alternately becomes electrically conducive and non-conductive as described above to charge the main capacitor 21. This charging circuit is generally called "the forward type charging circuit".

Figure 14:
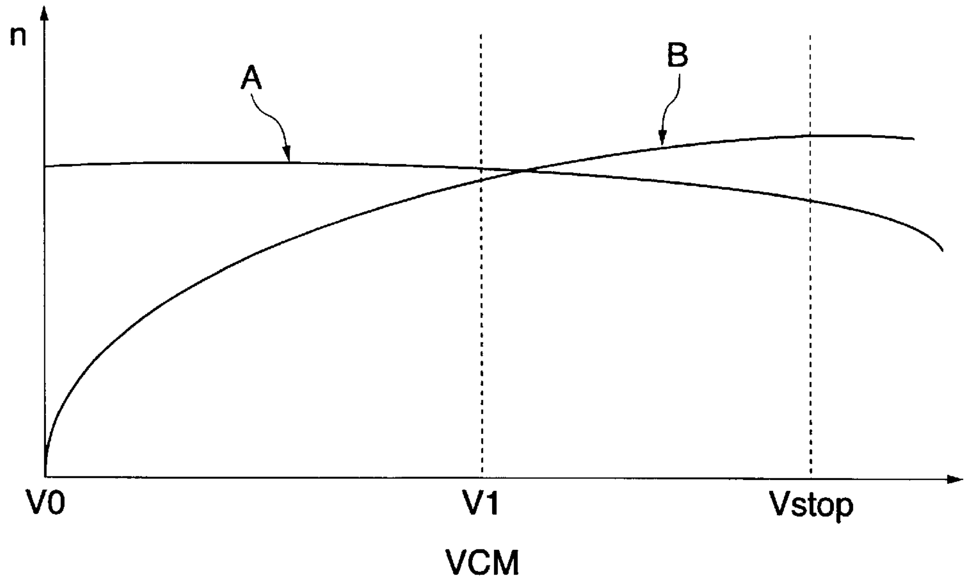
FIG. 14 is a graph showing a charging efficiency according to the seventh embodiment.
Figure 15:
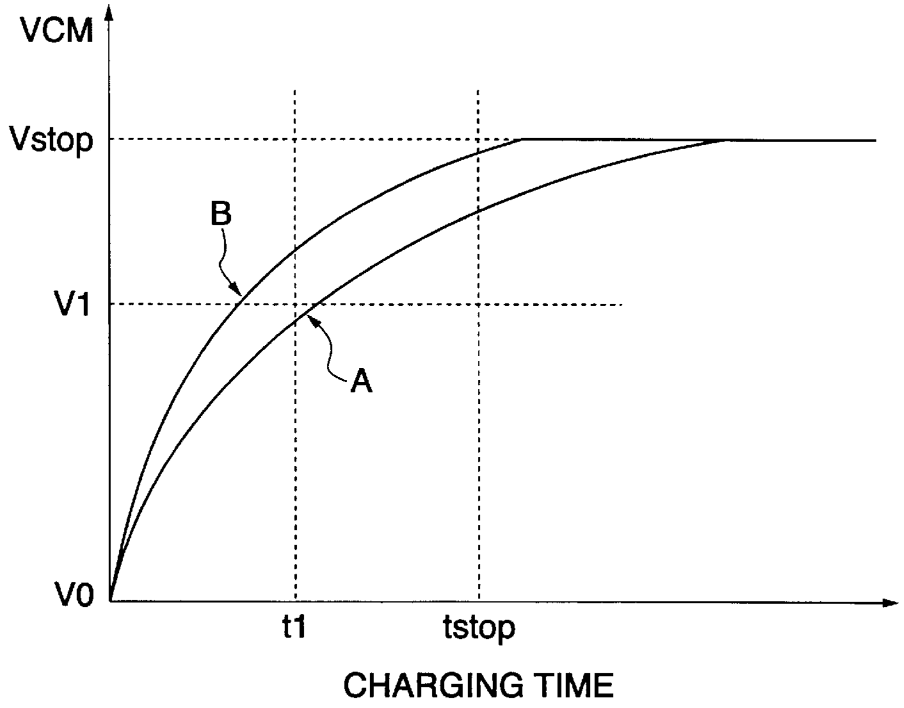
FIG. 15 is a graph showing a charging speed according to the seventh embodiment.

These two types of booster circuits will be described in terms of their charging efficiency and speed, with reference to FIGS. 14 and 15. FIGS. 14 and 15 are graphs showing the charging efficiency and speed, respectively. FIG. 14 shows the charged voltage VCM of the main capacitor 21 on the abscissa, while showing on the abscissa a real-time efficiency η which is the ratio of energy output by the battery 1 to energy charged in the main capacitor 21. On the other hand, FIG. 15 shows the time taken for charging the main capacitor 21, on the abscissa, while showing the charged voltage VCM of the main capacitor 21 on the ordinate. Further, in FIGS. 14 and 15, characteristics A and B are indicative of the efficiency achieved by the flyback type booster circuit and the efficiency achieved by the forward type booster circuit, respectively.

According to the real-time efficiency achieved by the flyback type charging circuit at each charged voltage as shown in FIG. 14, the input current from the battery 1 does not vary from an initially set value thereof, and the efficiency value remains flat, indicating a generally good charging efficiency. According to the characteristic of the flyback type booster circuit shown in FIG. 15, a longer time is required to completely charge the main capacitor 21 (to the charging completion voltage) than the forward type booster circuit.

In contrast, according to the forward type booster circuit, the lower the voltage across the main capacitor 21, the higher the current value. Thus, this circuit initially exhibits a significantly low efficiency when a rush current flows, as shown in FIG. 14, but is able to charge the main capacitor more quickly than the flyback type charging circuit, as shown in FIG. 15.

The present embodiment attempts to achieve a high charging efficiency while allowing users to use the electronic flash device with ease, by switching the two types of booster or charging circuits as described below so as to take advantage of the characteristics of these two types of booster circuits.

The operation of the camera and the switching of the charging circuits by the CPU 101 will be described below with reference to the flow chart in FIGS. 13A and 13B.

First, at a step S101, the CPU 101 monitors the output from the main switch 110 to determine whether or not the main switch 110 is turned on. When the main switch 110 is turned on, the procedure proceeds to a step S102.

At the step S102, the CPU 101 controls the light measuring circuit 102 to execute light measurement by detection of the luminance of an object, and stores the result of the detection of the luminance in a RAM as object luminance information. The procedure then proceeds to a step S103.

At the step S103, the CPU 101 determines whether the camera is in a stroboscpic photographing mode in which the camera is to execute stroboscopic photographing. Specifically, the CPU 101 determines based on the object luminance information whether or not the luminance obtained as the result of the detection executed at the step S102 is so low that stroboscopic light emission for photographing is required. If the luminance is not so low as requires stroboscopic light emission and thus stroboscopic charging, the procedure proceeds to a step S109, described later, to wait for the SW1 switch 111 to be turned on.

On the other hand, if the CPU 101 determines that the luminance is so low as requires stroboscopic light emission and thus stroboscopic charging, the procedure proceeds to a step S104, where the CPU determines whether or not the SW1 switch is on. If the SW1 switch is on, the procedure proceeds to a step S106. If the SW1 switch is not on, that is, it is off, the procedure proceeds to a step S105.

The step S106 is provided for the case where the photographer is about to take a photograph. In this case, if a signal for making a photographing operation ready is input (SW1=ON), the CPU 101 determines that stroboscopic photographing must be immediately enabled, and starts charging the main capacitor 21 using the second charging circuit 109*b*, that is, the speed-oriented forward type booster circuit. The procedure then proceeds to a step S107. Specifically, the CPU 101 outputs the high-level signal to the control electrode of the second switch element 12 via the connection line b.

On the other hand, the step S105 is provided for the case where the photographer is not about to take a photograph. In this case, if the signal for making a photographing operation ready is not input (SW1=oFF), the CPU 101 determines that quick charging is not required, and applies a predetermined oscillation signal to the control electrode of the first switch element 6 via the connection terminal a shown in FIG. 12, to thereby charge the main capacitor 21 using the first charging circuit 109*a*, that is, the charging efficiency-oriented flyback type booster circuit. The procedure then proceeds to a step S107.

At the step S107, the CPU 101 detects the charged voltage of the main capacitor 21 using the A/D circuit and continues charging the main capacitor 21 until it detects a charging completion voltage (Vstop in FIGS. 14 and 15), at which the main capacitor 21 is completely charged. In this embodiment, before the charging completion voltage is detected, the procedure returns to the step S104 to repeat the loop of the steps S104 to S107. Accordingly, before the main capacitor 21 is completely charged, the CPU 101 repeatedly determines whether or not the SW1 switch is on in order to switch the charging circuits for the main capacitor 21 depending on the state of the SW1 switch 111. Thus, if the SW1 switch 111 is off, priority is given to the charging efficiency to save the energy of the battery 1. If the SW1 switch is on, priority is given to the charging speed to charge the main capacitor 21 quickly.

When the CPU 101 detects the charging completion voltage at the step S107, the procedure proceeds to a step S108, where the CPU 101 outputs a charging signal instructing stoppage of charging to stop the operation of the flyback type booster circuit or the forward type booster circuit, thereby stopping charging the main capacitor 21. At a subsequent step S109, the CPU 101 determines again whether or not the SW1 switch 111 is on and waits until it is turned on. When the CPU detects that the SW1 switch 111 is turned on, the procedure proceeds to a step S111.

At the step S111, the CPU 101 causes the distance measuring circuit 103 to detect the distance to the object and stores the detected distance in the RAM. Then, at a step S 112, the CPU 101 executes a light measurement using the light measuring circuit, which detects the luminance of the object, and also stores the result of the light measurement in the RAM. The procedure then proceeds to a step S112.

At the step S112, the CPU 101 determines again whether or not the camera is in the stroboscopic photographing mode in which stroboscopic charging is required. Stroboscopic light emission is required if a photograph must be taken in a dark environment or against the light. Then, if the CPU 101 determines that the stroboscopic light emission is required, the procedure proceeds to a step S113. If the CPU 101 determines that the stroboscopic light emission is not required, the procedure proceeds to a step S118.

At the step S113, the CPU 101 detects the charged voltage of the main capacitor 21 using the A/D circuit to determine again whether or not the above-mentioned charging completion voltage has been reached. If the charging completion voltage has been reached, the procedure proceeds to the step S118. If the charging completion voltage has not been reached due to natural discharge or the like, the procedure proceeds to a step S114.

At the step S114, the CPU 101 causes the second charging circuit 109*b* to start the charging using the charging-speed-oriented forward circuit. At a subsequent step S116, the CPU 101 detects the charged voltage of the main capacitor 21 and then waits for the above-mentioned charging completion voltage to be reached. Once the charging completion voltage has been reached, the CPU 101 stops the charging at a step S117, and the procedure shifts to the step S118.

At the step S118, the CPU 101 monitors the SW2 switch until it is turned on, and the procedure proceeds to a step S119 when the SW2 switch is turned on. At the step S119, the CPU 101 outputs a control signal to the lens driving circuit 105 to control driving of the photographing lens, based on the measured distance data obtained and stored in the RAM at the step S110.

At the following step S120, the CPU 101 outputs a control signal to the shutter driving circuit 104 to control driving of the shutter. At this time, if the camera is in the stroboscopic-light-emission photographing mode, the CPU 101 outputs a control signal (high-level signal) for actuation of light emission to the trigger circuit 19, which thus outputs a trigger voltage through its output terminal. Consequently, the discharge tube 20 emits light for stroboscopic photographing.

Then, when the high-level signal is applied to the connection line e, the trigger circuit 19 generates and outputs a high pulse voltage to a trigger electrode of the discharge tube 20, which is thus excited. This excitation rapidly reduces the impedance of the discharge tube 20 to discharge the charged energy from the main capacitor 21. The energy is then converted into optical energy for light emission to illuminate the object.

At the following step S121, the CPU 121 outputs a control signal to the film driving circuit 107 to control film feeding so as to feed the film until the next photographing frame is set. At the following step S122, the CPU 101 determines whether or not to execute stroboscopic preliminary charging.

The stroboscopic preliminary charging is not executed if it is determined that the camera is not in the stroboscopic-light-emission photographing mode, at the step S112 based on the result of the light measurement executed at the step S111. On the other hand, the stroboscopic preliminary charging is executed if it is determined at the step S112 that the camera is in the stroboscopic-light-emission photographing mode.

Then, if the CPU 101 determines at the step S122 that the stroboscopic preliminary charging is not to be executed, the camera sequence is immediately terminated. If it determines at the step S122 that the stroboscopic preliminary charging is to be executed, the procedure proceeds to a step S123.

At the step S123, the CPU 101 determines whether or not the SW1 switch is on. If the SW1 switch is on, the procedure proceeds to a step S124. If the SW1 switch is not on, that is, it is off, the procedure proceeds to a step S125.

At the step S124, the CPU 101 determines that there is a possibility of a photograph being immediately taken, and charges the main capacitor 21 using the second charging circuit 109*b*, that is, the speed-oriented forward type booster circuit. The procedure then proceeds to a step S126. On the other hand, at the step S125, the CPU 101 determines that the main capacitor 21 need not be quickly charged, and charges the main capacitor 21 using the charging efficiency-oriented flyback type booster circuit. The procedure then proceeds to the step S126.

At the step S126, the CPU 101 detects the charged voltage of the main capacitor 21 and continues charging until the charging completion voltage (Vstop in FIGS. 14 and 15) is detected when the main capacitor 21 is completely charged. In this embodiment, before the charging completion voltage is detected, the procedure returns to the step S123 to repeat the loop of the steps S123 to S126. This loop is similar to the above described loop of the steps 104 to S107; before the main capacitor 21 is completely charged, the CPU 101 repeatedly determines whether or not the SW1 switch 111 is on in order to switch the charging circuits for the main capacitor 21 depending on the state of the SW1 switch 111. Thus, if the SW1 switch 111 is off, priority is given to the charging efficiency to save the energy of the battery 1. If the SW1 switch is on, priority is given to the charging speed to charge the main capacitor 21 quickly.

When the CPU 101 detects the charging completion voltage at the step S126, the procedure proceeds to a step S127, where the CPU 101 outputs a charging signal for stoppage of charging to stop the operation of the flyback type booster circuit or the forward type booster circuit, thereby stopping charging the main capacitor 21. Thus, the series of process operations are completed.

As described above, in this embodiment, the booster circuit to be used is switched upon detecting on-off state of the SW1 switch 111 as a release switch. After on-state of the SW1 switch 111 has been detected, the charging speed-oriented forward type booster circuit is actuated so as to deal with an unexpected shutter chance. On the other hand, before the SW1 switch is turned on, the charging efficiency-oriented flyback type booster circuit is used for charging, thereby preventing the consumption of the battery.

In the above described embodiment, the booster circuit is shown as a single oscillation transformer, but it may be comprised of two independent oscillation circuits.

Further, in the above described embodiment, the signal for making a photographing operation ready is input to the CPU 101 when the SW1 switch is turned on, but a signal for making a photographing operation ready may be input to the CPU by operating a remote controller, for example.

Moreover, in the above described embodiment, the speed-oriented boosting means is implemented by the charging operation performed by the forward type booster circuit, which provides a large amount of primary current, and the efficiency-oriented boosting means is implemented by the charging operation performed by the flyback type booster circuit, which can maintain a small amount of primary current. The speed- and efficiency-oriented boosting means, however, are not limited to those implemented by the forward and flyback type booster circuits, but the flyback type booster circuit may act as the speed-oriented boosting means when the primary current thereof is set high and as the efficiency-oriented boosting means when the primary current thereof is set low.

Further, as disclosed in Japanese Laid-Open Patent Publication (Kokai) No. 06-089794, in a charging circuit formed by a combination of transformers of different boosting characteristics (the turn ratio of a primary coil to a secondary coil) in a forward type booster circuit, an efficiency-oriented boosting means as a first boosting means may be implemented by a booster circuit having a predetermined turn ratio between the primary and secondary coils of the transformer, and an speed-oriented boosting means as a second boosting means may be implemented by a booster circuit having a larger turn ratio (higher primary current) than the efficiency-oriented booster circuit.

(Eighth Embodiment)

Figure 16:
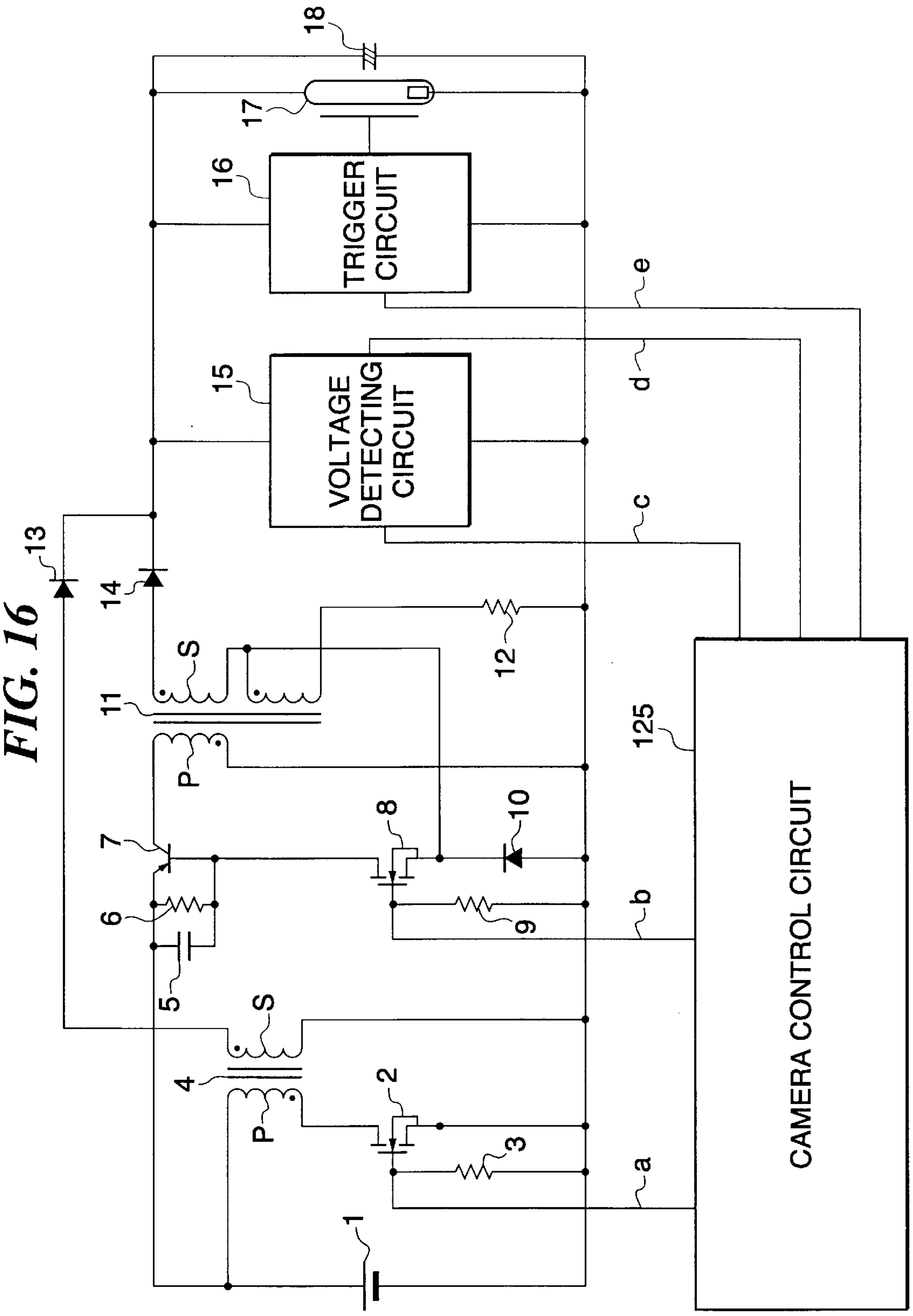
FIG. 16 is a circuit diagram showing the construction of an electronic flash device according to an eighth embodiment of the present invention.
Figure 17:
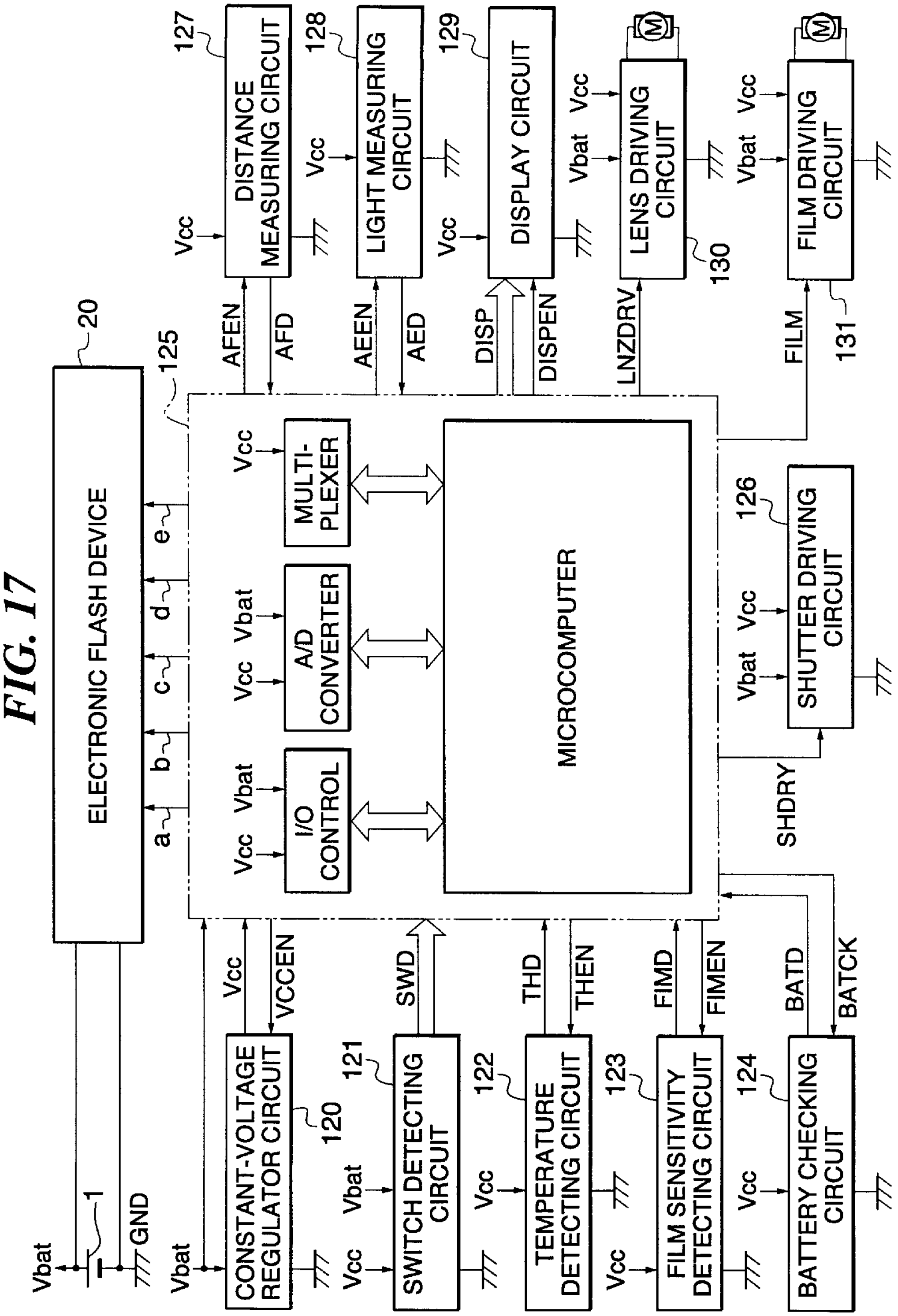
FIG. 17 is a circuit diagram showing the construction of a camera having the electronic flash device according to the eighth embodiment.
Figure 18A:
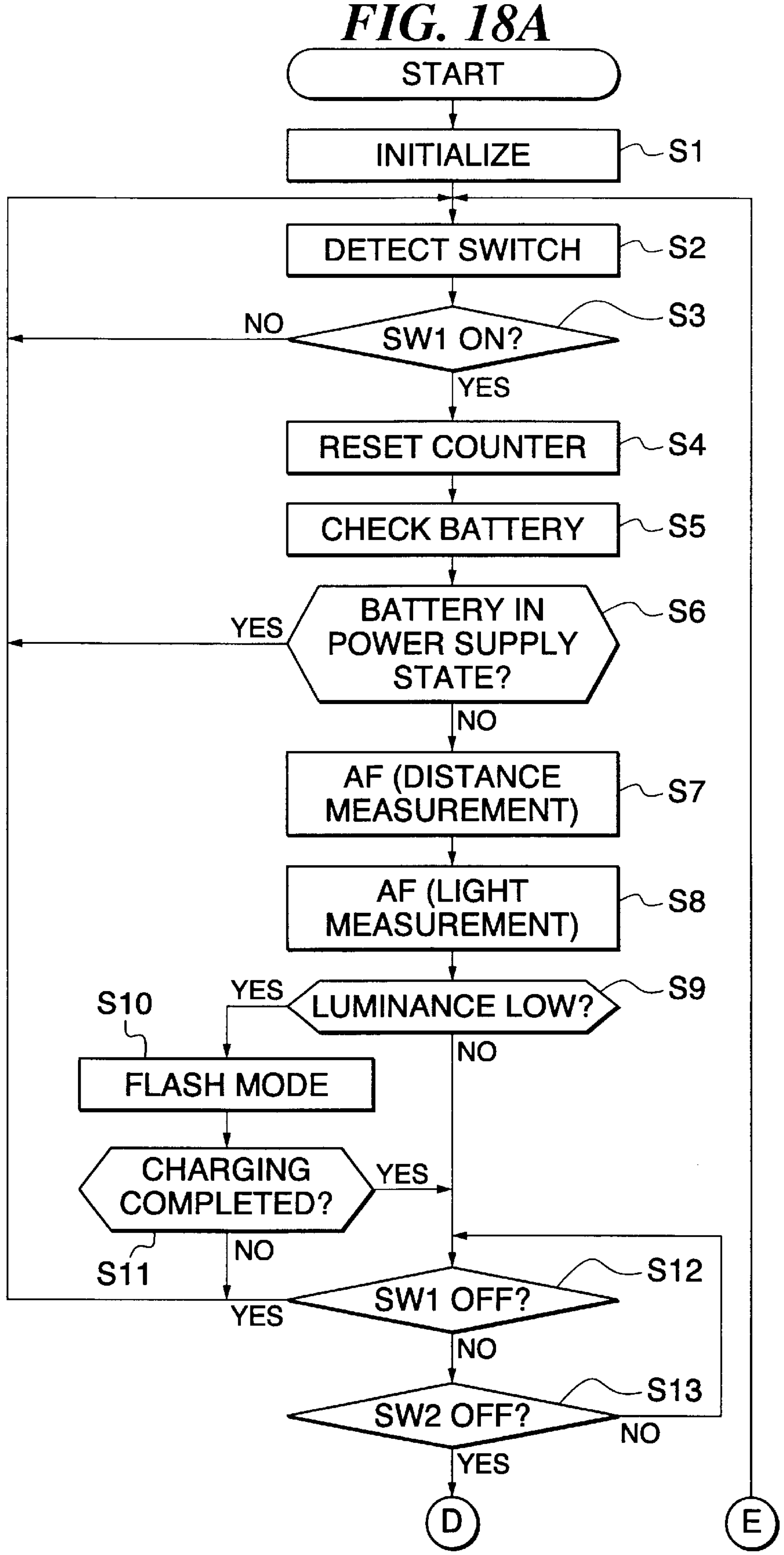
FIGS. 18A and 18B is a flow chart showing the flow of an operation of the camera according to the eighth embodiment.
Figure 18B:
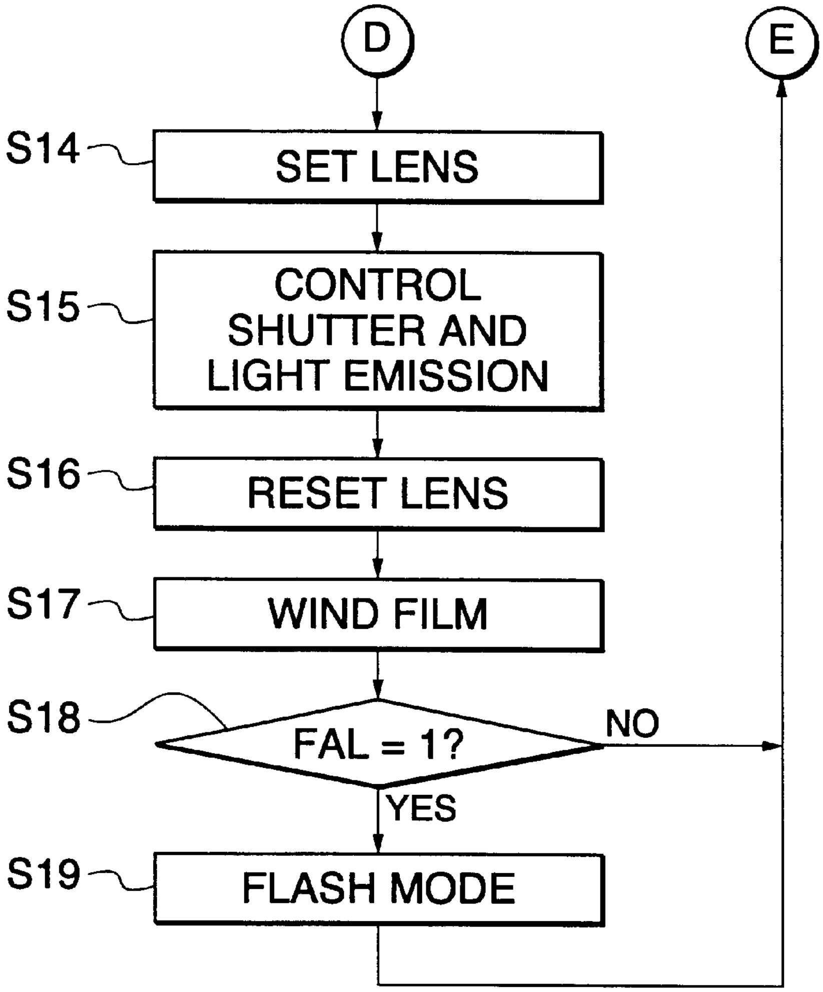
Figure 19:
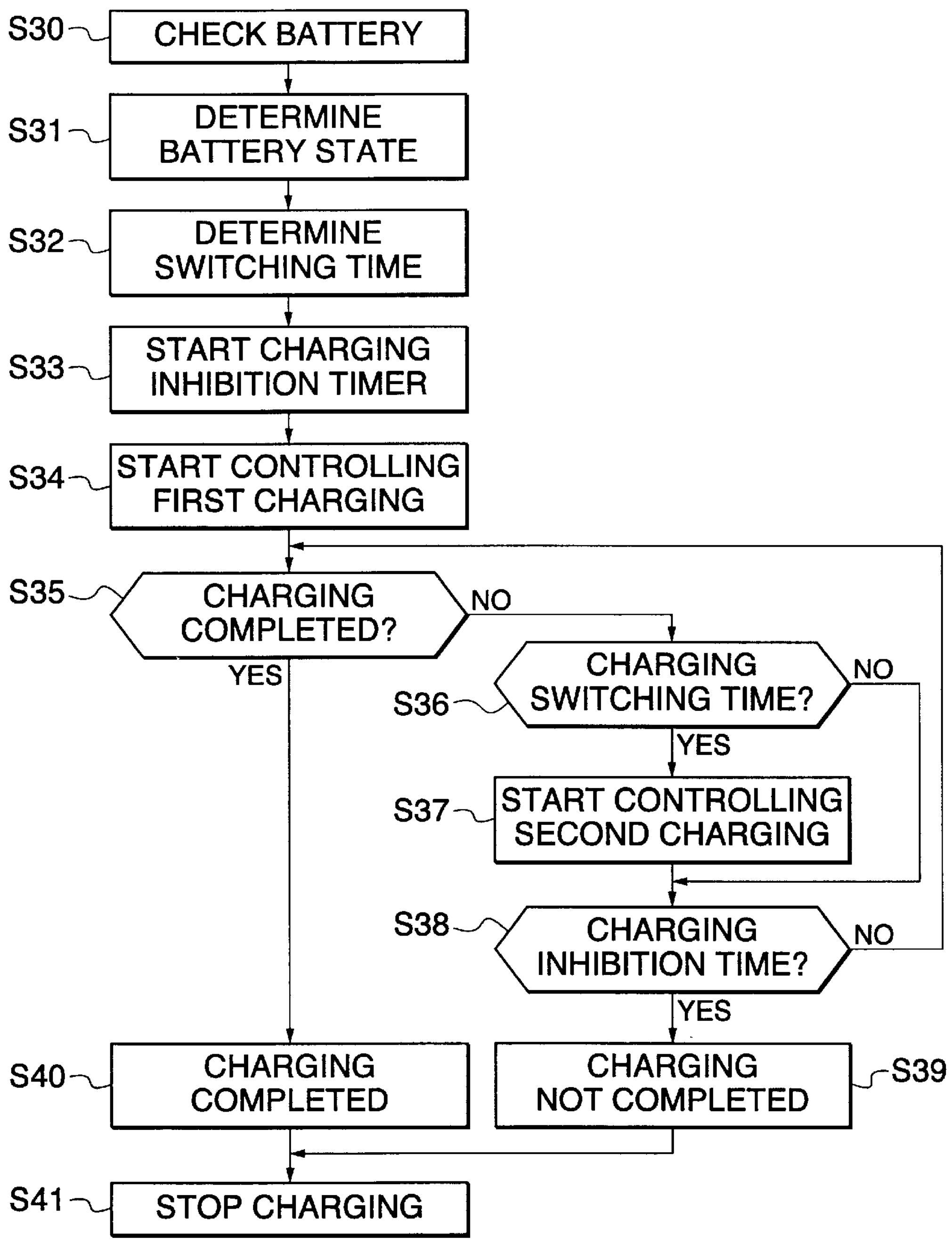
FIG. 19 is a flow chart showing the flow of the flash mode according to the eighth embodiment.

FIGS. 16 to 19 show the construction and operation of a camera having an electronic flash device according to an eighth embodiment of the present invention. FIG. 16 is a circuit diagram showing the construction of the electronic flash device according to the eighth embodiment. FIG. 17 is a block diagram showing the construction of the camera having the electronic flash device. FIGS. 18A and 18B is a flow chart showing the operation of the camera. FIG. 19 is a flow chart showing the flow of an operation in a flash mode.

First, the construction of the electronic flash device 20 will be described with reference to FIG. 16.

Reference numeral 1 denotes a power supply battery, 2 a switch element, 3 a resistor connected as a pull-down resistor for a control terminal of the switch element 2, 4 an oscillation transformer, 5 a capacitor, and 6 a resistor. Reference numeral 7 denotes an oscillation transistor having the capacitor 5 and the resistor 6 connected in parallel between its base and emitter. Reference numeral 8 denotes a switch element. Reference numeral 9 denotes a resistor connected as a pull-down resistor for a control terminal of the switch element 8. Reference numeral 10 denotes a diode connected between a negative electrode of the battery 1 and the switch element 8 so as to have the polarity shown in FIG. 16.

Reference numeral 11 denotes an oscillation transformer having a primary coil P, one end of which is connected to a collector of the oscillation transistor 7 and the other end is connected to the negative electrode of the battery 1. The junction between a secondary coil S and a feedback coil F of the oscillation transformer 11 is connected to a source electrode of the switch element 8. Reference numeral 12 denotes a resistor connected to the feedback core F to limit a current flowing thereto.

Reference numeral 13 denotes a high-voltage rectifying diode connected between a secondary output terminal S of the oscillation transformer 4 and a main capacitor 18, described later. Reference numeral 14 denotes a high-voltage rectifying diode connected between a secondary output terminal S of the oscillation transformer 11 and the main capacitor 18.

Reference numeral 15 denotes a voltage detecting circuit, 16 a trigger circuit, 17 a discharge tube, 18 a main capacitor, and 125 a camera control circuit, described later in detail. The voltage detecting circuit 15 is connected in parallel to the main capacitor 18 in order to detect the voltage thereacross. The trigger circuit 16 outputs a signal for stroboscopic light emission from the discharge tube 17 to a trigger electrode of the discharge tube 17, as described later. The discharge tube 17 is connected in parallel to the main capacitor 18 in the same manner as the voltage detecting circuit 15.

Characters a to e denote connection lines connecting the electronic flash device 20 and the camera control circuit 125 together. The connection line a is connected to a control electrode of the switch element 2, and the connection line b is connected to a control electrode of the switch element 8.

The connection line c is used by the camera control circuit 125 to output a voltage detection driving signal to the voltage detecting circuit 15. The voltage detecting circuit 15 inputs this signal to the camera control circuit 125 via the connection line d, so that the camera control circuit 125 detects the charged voltage of the main capacitor 18. The connection line e is used by the camera control circuit 125 to provide a light emission actuation signal for actuating the trigger circuit 16 in order to cause the discharge tube 17 to emit light.

Next, the construction of the camera having the above described electronic flash device 20 will be described with reference to FIG. 17.

Reference numeral 125 denotes the camera control circuit (enclosed by a broken-line) comprised of an I/O controller, an A/D converter, a multiplexer, and a microcomputer. Reference numeral 120 denotes a constant-voltage regulator circuit controlled by the camera control circuit 125 via a VCCEN terminal, for supplying a voltage Vcc as a power supply to various circuits.

Reference numeral 121 denotes a switch detecting circuit actuated by the power supply battery 1 or the Vcc power supply to transmit the state of each switch or a state change therein to the camera control circuit 125. Reference numeral 122 denotes a temperature detecting circuit, and 123 a film sensitivity detecting circuit for obtaining information such as film sensitivity and the number of frames. Reference numeral 124 denotes battery check circuit, 126 a shutter driving circuit for driving a shutter, and 127 a distance measuring circuit.

Reference numeral 128 denotes a light measuring circuit for transmitting required information to the camera control circuit 125 via an AED terminal. Reference numeral 129 denotes a display circuit for displaying required information on, for example, an LCD, and 131 a film driving circuit for feeding and driving a film via a FILMD terminal under the control of the camera control circuit 125.

Next, the operation of the camera will be described with reference to FIGS. 18A and 18B.

It is hereby assumed that the power supply to the camera control circuit has already been turned on, and in this state, the microcomputer of the camera control circuit 125 is in a low-consumption mode and is inoperative.

First, when a power supply switch in the switch detecting circuit 121 is turned on, the camera control circuit 125 starts operation. The camera control circuit 125 then applies a signal to the constant-voltage regulator circuit 120 via the VCCEN terminal, so that the constant-voltage regulator circuit 120 supplies the power supply Vcc to various circuits.

Next, the microcomputer of the camera control circuit 125 is initialized as required (step S1). The camera control circuit 125 then receives information from the switch detecting circuit 121 to check information required for photographing (step S2). The camera control circuit 125 then waits for the switch detecting circuit 121 to output a first stroke signal indicating that a release button for getting ready for photographing is half-depressed (step S3).

If the first stroke signal is not generated, the procedure returns to the step S2. On the other hand, if the first stroke signal is generated, the camera control circuit 125 sets a predetermined counter into an initial state (step S4), and checks the battery (step S5) to determine whether or not the battery can supply an amount of power required by the camera for photographing (step S6).

If the battery can only supply an insufficient amount of power, the procedure returns to the step S2. If the battery can supply a sufficient amount of power, the camera control circuit 124 applies a signal to the distance measuring circuit to actuate the same, thereby causing the same to measure the distance to an object (step S7). The distance measuring circuit 127 provides measured distance information to the camera control circuit 125 via an AFD terminal.

Next, the camera control circuit 125 applies a signal to the light measuring circuit via the terminal AEEN to actuate the same, thereby causing the same to measure the luminance of the object (step S8). The light measuring circuit 128 provides luminance information to the camera control circuit 125 via the AED terminal. The camera control circuit 125 determines based on this luminance information whether the luminance of the object is higher or lower than a predetermined value (step S9). If the luminance is higher than the predetermined value, the procedure proceeds to a step S12, described later. On the other hand, if the luminance is lower than the predetermined value, the camera control circuit 125 enters a flash mode (step S10).

Then, the operation in the flash mode will be described with reference to FIG. 19.

First, the camera control circuit 125 determines the open voltage E0 of the battery 1 and also determines a battery voltage E1 by allowing a constant current 10 to flow through the battery (step S30). The camera control circuit 125 determines the internal resistance Rbat of the battery using the following equation:

$$Rbat=(E0-E1)/10 \qquad (1)$$

The camera control circuit 125 thus determines the state of the battery 1 (step S31). This internal resistance Rbat includes the contact resistance of the battery armature or the like.

Next, based on the determined state of the power supply battery 1 (the open voltage E0 of the battery 1 and the internal resistance Rbat determined by means of the above Equation (1)), the camera control circuit 125 sets timing for switching a first booster circuit to a second booster circuit in such a manner that a charging completion time required before the charged voltage of the main capacitor 18 reaches a charging completion voltage (predetermined voltage required for stroboscopic light emission).

In this embodiment, the first booster circuit is set as a flyback type booster circuit, while the second booster circuit is set as a forward type booster circuit. Further, the camera control circuit 125 sets the switching timing based on a time required to charge the main capacitor 18 (step S32). A point of time during the charging of the main capacitor 18 when the booster circuits are switched is called "the switching time".

Next, the camera control circuit sets a charge inhibiting timer (the timer for canceling the charging if the charging time is prolonged) for 10 to 15 seconds, for example, and then starts the timer (step S33) to control the flyback type booster circuit (step S34).

Then, a method of controlling the flyback type booster circuit will be described with reference to FIG. 16.

First, the camera control circuit 125 applies a predetermined oscillation signal (repeatedly alternately changing between a high level and a low level) to the control electrode of the switch element 2 via the connection terminal a. When the control terminal of the switch element 2 is at the high level, the switch element 2 becomes electrically conductive to cause a current to flow from the battery 1 to a primary coil P of the oscillation transformer 4.

Thus, an induced electromotive force is generated in the secondary coil S of the oscillation transformer 4. This current, however, has such a polarity that it is blocked by the high-voltage rectifying diode 13, so that no exciting current flows from the oscillation transformer 4. Consequently, energy is accumulated in the oscillation transformer 4.

Next, when the control electrode of the switch element 2 is set to a low level, the switch element 2 becomes electrically non-conductive to generate a counter-electromotive force in the secondary coil S of the oscillation transformer. This counter-electromotive force causes a current to flow through the rectifying diode 13 and the main capacitor 18, so that charges are accumulated in the main capacitor 18.

When the terminal a generates a high-level signal again immediately after the energy is discharged from the oscillation transformer 4, the switch element 2 similarly becomes electrically conductive to accumulate energy in the oscillation transformer 4. Further, when a low-speed signal is supplied, this makes the switch element 2 electrically non-conductive to discharge the accumulated energy from the oscillation transformer 4, thereby charging the main capacitor 18. This operation is repeated to increase the voltage across the main capacitor 18.

During the above operation, the camera control circuit continues supplying a drive signal to the voltage detecting circuit 15 via the connection line c as described above. Upon receiving this drive signal, the voltage detecting circuit 15 measures the charged voltage of the main capacitor 18 and outputs the measured charged voltage to the camera control circuit 125 via the connection line d. The camera control circuit 125 detects this charged voltage using the A/D converter to check whether or not the charged voltage has reached a predetermined charging completion voltage (step S35). If the charged voltage has reached the predetermined charging completion voltage, a charge OK flag is set (step S40), and the procedure proceeds to a step S41, described later.

If the charged voltage has not reached the charging completion voltage, the camera control circuit checks whether or not the charging time has reached the switching time (step S36). If the charging time has not reached the switching time, the procedure proceeds to a step S38, described later, while if the charging time has reached the switching time, the camera control circuit 125 switches the flyback type booster circuit to the forward type booster circuit.

With the forward type booster circuit, the camera control circuit 125 first stops outputting the oscillation signal so far applied to the oscillation switch 1 via the connection line b, to make the switch element electrically non-conductive. The camera control circuit 125 then applies the high-level signal to the control electrode of the switch element 8 via the connection line b (step S37). Upon receiving the high-level signal, the switch element 8 becomes electrically conductive.

When the switch element 8 becomes electrically conductive, a base current for the oscillation transistor 7 flows from a positive electrode of the battery 1, between the base and emitter of the oscillation transistor 7, and through the switch element 8 and the feedback coil F of the oscillation transformer 11 to the resistor 12. Thus, a collector current which is $h_{fe}$ times as high as the base current flows to a negative electrode of the battery 1 via a primary coil P of the oscillation transformer 11.

Thus, an induced electromotive force is generated in a secondary coil S of the oscillation transformer 11. Accordingly, a current flows through the loop of the high-voltage rectifying diode 14, the main capacitor 18, and the battery 1, between the base and emitter of the oscillation transistor 7, and through the switch element 8 and the secondary coil of the oscillation transformer 11, thereby charging the main capacitor 18. This current also acts as a base current for the oscillation transistor 7 to increase the total amount of base current. Thus, the increased base current returns to the oscillation transistor 7 to provide a positive feedback, thereby instantaneously setting the voltage between the collector and emitter of the oscillation transistor 7 into a saturated state.

When the current has flown for a certain period of time, the core of the oscillation transformer 11 is saturated with magnetic flux and a counter-electromotive force is generated in the oscillation transformer 11. The counter-electromotive force generated in the secondary coil of the oscillation transformer 11 applies a base reverse bias to the oscillation transistor 7 through the loop running through the switch element 8, between the base and emitter of the oscillation transistor 7, and through the battery 1, the main capacitor 18, and a parasitic capacity of the high-voltage rectifying diode 14. A counter-electromotive force in the feedback coil F also applies a base reverse bias to the oscillation transistor 7 through the loop running through the switch element 8, between the base and emitter of the oscillation transistor 7, and through the battery 1 and the resistor 12, thereby rapidly making the oscillation transistor 7 electrically non-conductive.

When the core of the oscillation transformer 11 is released from saturation with magnetic flux, the base current for the oscillation transistor 7 flows again to repeatedly make the oscillation transistor 7 alternately electrically conductive and non-conductive, as described above. Consequently, the charged voltage of the main capacitor 18 increases.

Next, the camera control circuit 125 determines whether the charge inhibiting timer for inhibiting charging if the charging time has become prolonged (step S38). If the charge inhibiting timer has not counted up, the camera control circuit 125 maintains its control state, and the procedure returns to the step S35.

If the charge inhibiting timer has counted up, the camera control circuit 125 sets a charge NG flag (step S39), and stops the oscillation signal outputted to the switch element 2 via the connection line a or the oscillation signal outputted to the switch element 8 via the connection line b.

This makes the switch element 2 or 8 electrically non-conductive to stop the charging (step S41). Thus, the flash mode (step S10) is completed, and the procedure returns to the flow chart in FIGS. 18A and 18B.

Next, the camera control device 125 checks the flag set at the step S40 or S39 shown in FIG. 19 (step S11), and if the NG flag is set, the procedure returns to the step S2. If the OK flag is set, the camera control device 125 determines whether or not the first stroke signal is being output by the switch detecting circuit 121 (step S12).

Then, when the first stroke signal is not being input, the procedure returns to the step S2. When the first stroke signal is being input, the camera control circuit 125 determines whether or not a second stroke signal (generated when the release button is fully depressed) is being output by the switch detecting circuit 121 (step S13).

Then, when the second stroke signal is not being input, the procedure returns to the step S12. When the second stroke signal is being input, the camera control circuit 125 controls a lens driving circuit 130 to carry out focusing based on the measured distance data obtained at the step S7 (step S14).

Next, the camera control device 125 controls the opening of the shutter via the shutter driving circuit 126 based on the luminance of the object obtained at the step S8 and conditions according to the film sensitivity data. At the same time, if the luminance is so low that the electronic flash device is required to operate, the camera control device 125 controls the shutter based on the measured distance data and the film sensitivity so as to cause the electronic flash device to emit light with a proper aperture value.

The electronic flash device is caused to emit light by applying the high-level signal to the connection line e. When the camera control device 125 applies the high-level signal to the trigger circuit 16 via the connection line e, the trigger circuit 16 generates and outputs a high voltage pulse signal to a trigger electrode of the discharge tube 17.

Upon receiving the high voltage pulse signal, the discharge tube 17 is excited and has its impedance reduced rapidly to cause the main capacitor 18 to discharge its charged energy, which is then converted into light energy. The object is then illuminated. In this connection, if the electronic flash device is used, a flash flag FAL is set to 1.

Next, when the shutter is closed, the control device 125 returns the lens, which has been at its focused position, to its initial position (step S16). The control device 125 controls the film driving circuit 131 to wind the film by one frame on which photographing has been completed (step S17).

Then, the control device 125 checks whether the flash flag FAL is set to "1" indicating that the electronic flash device has been used (step S18). When the flag is set to "1", the control device sets the flash mode to charge the main capacitor 18 in the same manner as in the step S10, thereby completing the sequence of operations (step S19). When the electronic flash device is not used, the procedure skips the step S19 and returns to the step S2, thus completing the sequence of operations.

Figure 20A:
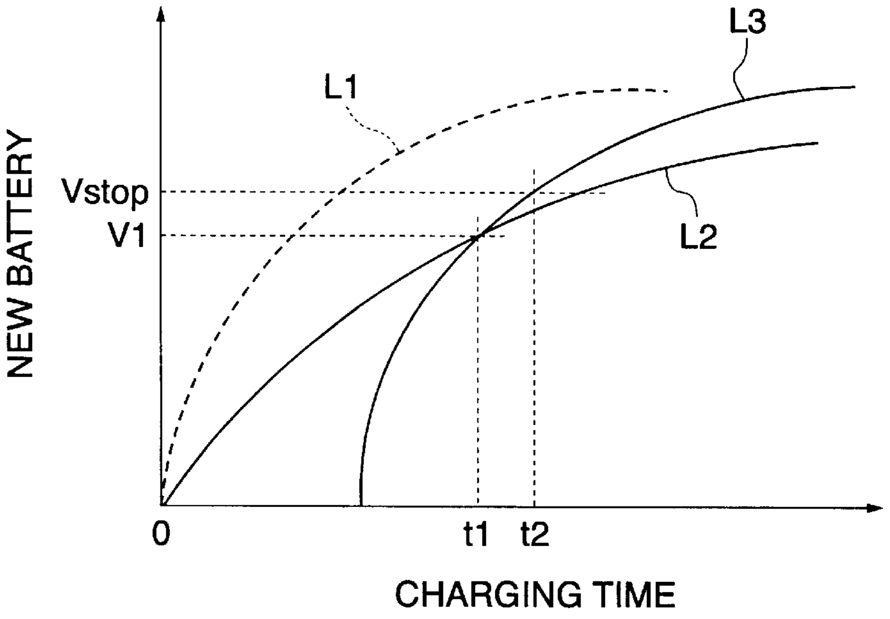
FIG. 20A is a graph showing charged voltage according to the eighth embodiment.
Figure 20B:
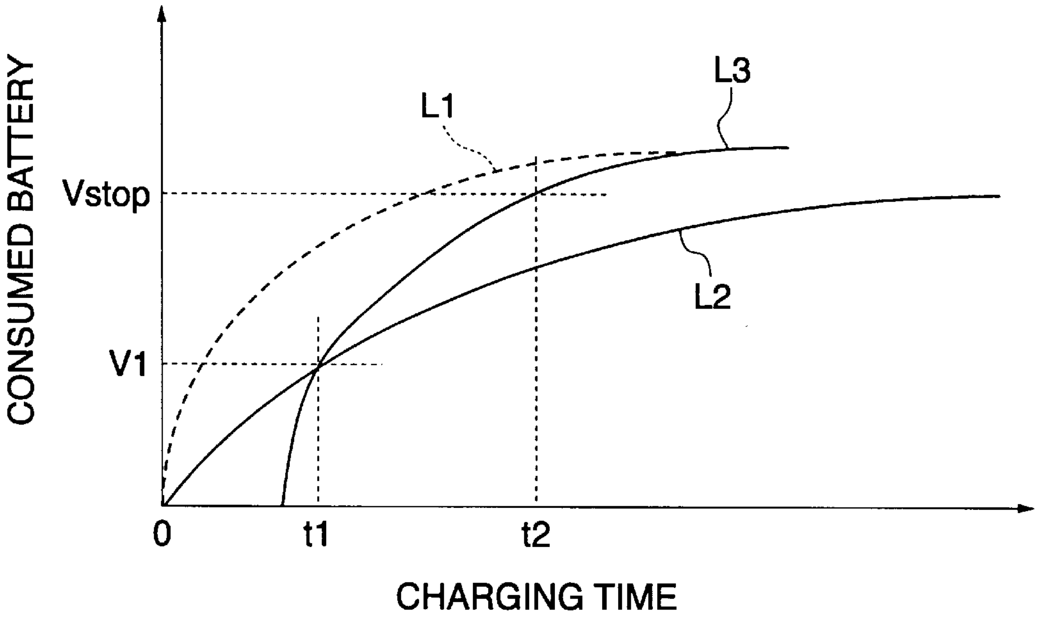
FIG. 20B is a graph showing charged voltage according to the eighth embodiment.

Next, the charging characteristic of the electronic flash device of the eighth embodiment will be described with reference to FIGS. 20A and 20B. FIG. 20A shows charged voltage curves for a new battery. FIG. 20B shows charged voltage curves for a consumed battery. Reference numeral L1 denotes the case where only the forward type booster circuit is used. Reference numeral L2 denotes the case where only the flyback type booster circuit is used. Reference numeral L3 denotes a charged voltage curve for the present invention. The ordinate indicates the charged voltage (VCM) of the main capacitor 18, while the abscissa indicates the charging time.

In the eighth embodiment, the flyback type booster circuit initially executes charging and is then switched to the forward type booster circuit at a time t1. The charging operation starts at a time 0 and progresses as shown by the curve L2. At the charging time t1, the charging control state is switched (flyback type booster circuit→forward type booster circuit), and then the charging operation progresses along the charging curve L3, corresponding to the curve L1 as shifted in the direction of the time axis. Then, when the charged voltage reaches a charging completion voltage Vstop, the charging operation is stopped at the charging time t2.

As is apparent from a comparison between FIGS. 20A and 20B, the charging time t2, when the charging completion voltage Vstop is reached, is set to be substantially equal between the new battery and the consumed battery by varying the charging time t1 between these batteries.

When the main capacitor 18 is thus charged by the camera control circuit 125 by switching the flyback type booster circuit to the forward type booster circuit at the switching time t1 depending on the consumption state of the power supply battery 1, the charging completion time t2 is made substantially constant regardless of the consumption state of the power supply battery, thus allowing users to easily use the camera with this electronic flash device.

Next, a method of setting the above-mentioned switching time t1 will be described.

First, the charging characteristic of the flyback type booster circuit will be described.

In general, the charging completion time t1 for the forward type booster circuit is qualitatively determined using the following equation:

$$t1=dCm\times(RL+Rbat)>n2>Ln\{1-Vstop/(n\times E0)\} \qquad (2)$$

where d denotes a coefficient including the on-off duty of the oscillation element by the oscillation transformer, and the like, Cm denotes the capacitance of the main capacitor, RL denotes the loop resistance of the charging circuit such as the wiring resistance, n denotes the turn ratio of the primary coil to the secondary coil of the oscillation transformer, and Vstop denotes the charging completion voltage. These parameters each have a known fixed value.

Thus, the charging completion time for the forward type booster circuit can be determined using the above Equation (2) by measuring the battery open voltage E0 and the internal resistance Rbat. Then, by incorporating a matrix table for the charging time t1 corresponding to the charging completion time t1, in a memory of the camera control circuit 125 beforehand, the camera control circuit 125 can determine the switching time t1 using this matrix table.

For example, in general, the camera control circuit 125 qualitatively determines the charging completion time t1 in the case where only the forward type booster circuit is used, using Equation (4), shown below.

Alternatively, the camera control circuit 125 determines a current I flowing through the oscillation transformer 4 when a predetermined period of time Ton has elapsed since the switch element became electrically conductive, using Equation (3):

$$I=E0/(RL+Rbat)\times[1-Exp\{-Ton\times(RL+Rbat)/L\}] \qquad (3)$$

where L denotes the primary inductance of the oscillation transformer 4 and RL denotes the loop resistance of the charging circuit such as the wiring resistance.

Then, the camera control circuit 125 calculates the amount of emitted energy Q (the amount of electric energy charged in the main capacitor 18 during a single discharging operation), using Equation (4).

$$Q=L\times I^2/2 \qquad (4)$$

When the emitted energy Q is charged in the main capacitor 18, the charged voltage gradually increases. Thus, the matrix table for the emitted energy Q, the charging time and the switching time t1 is stored in the memory of the camera control circuit 125 so that the camera control circuit 125 can determine the switching time t1 using this matrix table.

Figure 21A:
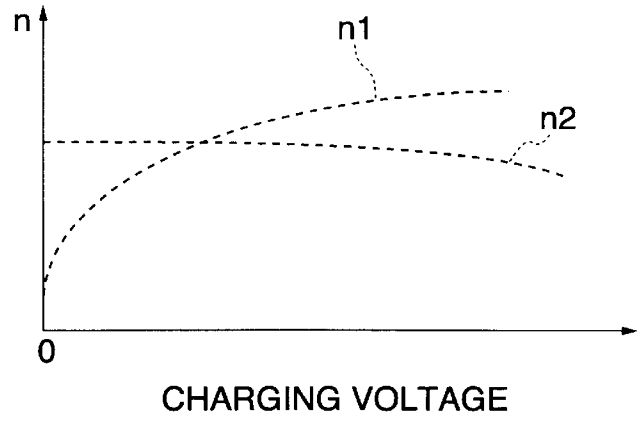
FIG. 21A is a graph showing charging efficiency curves (in real time) for the electronic flash device, where the flyback type booster circuit alone and the forward type booster circuit alone are used.
Figure 21B:
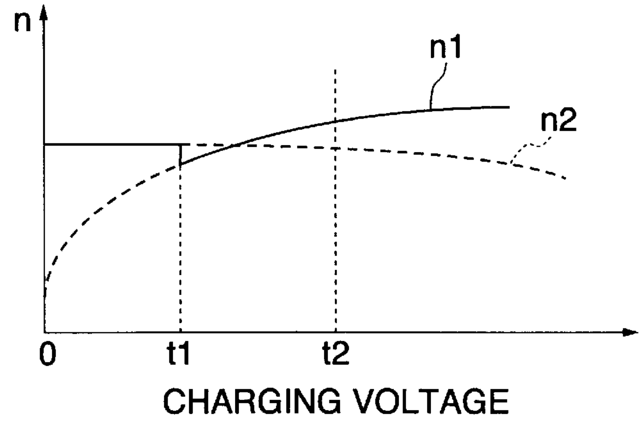
FIG. 21B is a graph showing charging efficiency curves (in real time) for the electronic flash device according to the present invention.
Figure 21C:
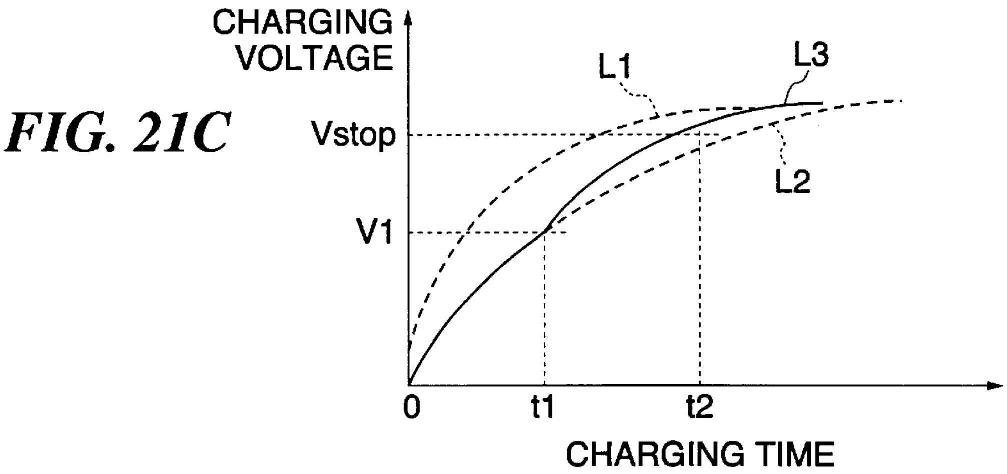
FIG. 21C is a graph showing charging time curves as in FIGS. 20 And 20B.

Next, the efficiency η of the electronic flash device will be described with reference to FIGS. 21A to 21C. FIGS. 21A and 21B show charging efficiency curves (in real time) for the electronic flash device; the ordinate indicates efficiency η, while the abscissa indicates the charged voltage. Reference numeral η1 denotes a charging efficiency curve for the case where only the forward type booster circuit is used. Reference numeral η2 denotes a charging efficiency curve for the case where only the flyback type booster circuit is used. Further, the thick curve in FIG. 21B indicates a charging efficiency curves for the present invention. FIG. 21C shows charging time curve as in FIGS. 20A and 20B, and in which the charging time on the abscissa corresponds to the charged voltage on the abscissa in FIGS. 21A and B. In FIGS. 21A to 21C, it is assumed that the charging operation is not interrupted so that comparable efficiency and charging curves can be obtained.

As shown in FIG. 21A, the forward type booster circuit provides a large amount of current during the initial period of charging, so that the efficiency η1 is not high during this period. In contrast, the flyback type booster circuit provides a substantially fixed amount of current, so that the efficiency η2 has a relatively stable flat value. As the charged voltage increases, the efficiency η1 becomes higher than the efficiency η2.

With the electronic flash device of the present invention, as shown in FIG. 21B, from the time t0 to the time t1, the charging operation progresses in accordance with the curve (thick solid line) corresponding to the efficiency η2. Then, after the switching time t1, the charging operation progresses in accordance with the curve (thick solid line) corresponding to the efficiency η1 until the charging completion voltage Vstop is reached. Since the charging operation progresses along those portions of the two efficiency curves η1 and η2 which exhibit high charging efficiency values, the electronic flash device of the present invention has a high charging efficiency.

(Ninth Embodiment)

Figure 22:
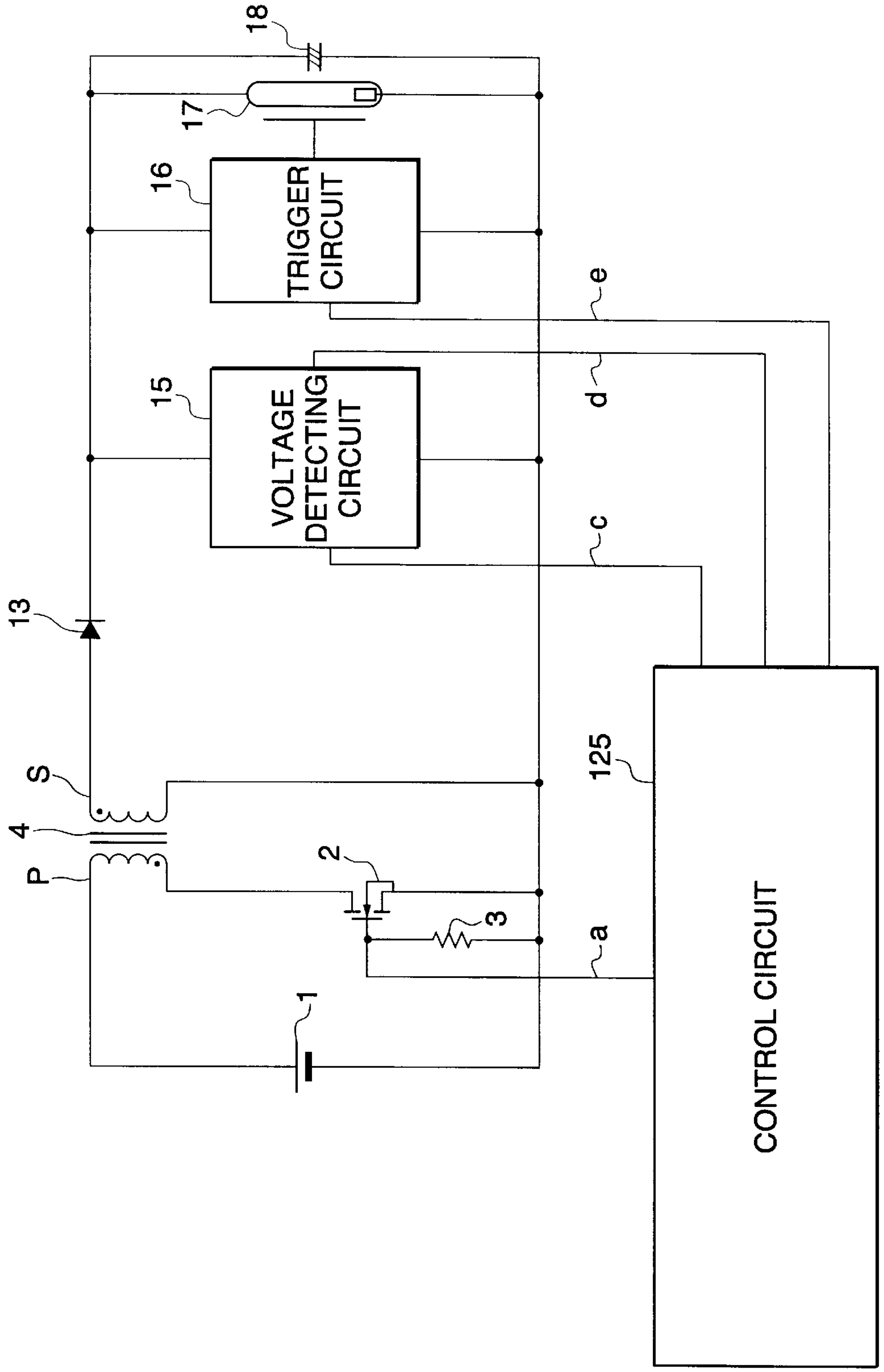
FIG. 22 is a circuit diagram showing the construction of an electronic flash device according to a ninth embodiment of the present invention.

FIG. 22 is a circuit diagram showing the construction of an electronic flash device according to a ninth embodiment of the present invention. This embodiment is different from the first embodiment in that a boosting device used in the ninth embodiment is comprised of a flyback type booster circuit alone, and a first control state is switched to a second control state by changing a fixed frequency applied to an oscillation transformer 4.

As shown in FIG. 22, the electronic flash device according to the ninth embodiment is identical in construction with the electronic flash device according to the eighth embodiment, except that the forward type booster circuit is omitted. Those components and parts of the construction of this embodiment which are the same as those in the eighth embodiment are denoted by the same reference numerals as those in the eighth embodiment.

Next, the charged voltage characteristic of the ninth embodiment will be described with reference to FIGS. 23A and 23B.

Figure 23A:
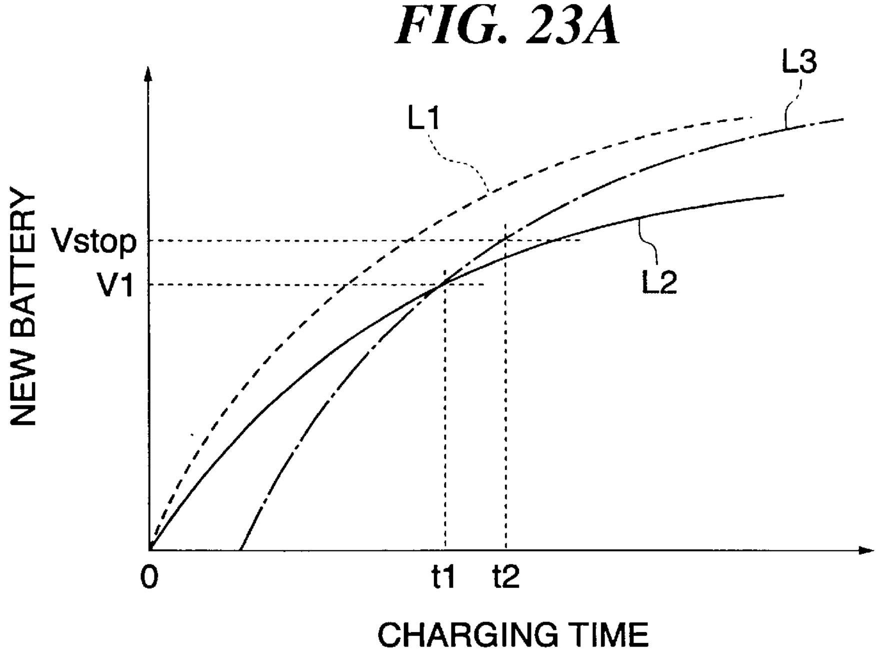
FIG. 23A is a graph showing charged voltage curves for a new battery according to the ninth embodiment.
Figure 23B:
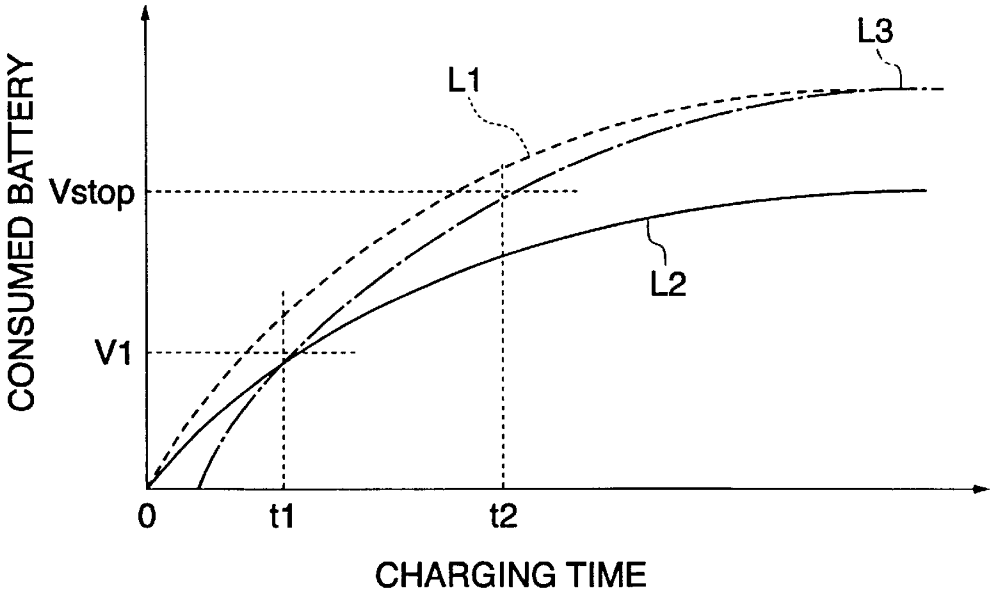
FIG. 23B is a graph showing charged voltage curves for a consumed battery according to the ninth embodiment.

FIG. 23A shows charged voltage curves for a new battery. FIG. 23B shows charged voltage curves for a consumed battery. Reference L1 denotes the case where an oscillation signal has a large on/off duty ratio. Reference numeral L1 denotes the case where the oscillation signal has a large on/off duty ratio. Reference numeral L2 denotes the case where the oscillation signal has a small on/off duty ratio. Reference numeral L3 denotes a charged voltage curve for the present invention. The ordinate indicates the charged voltage (VCM) of the main capacitor 18, while the abscissa indicates the charging time.

If the oscillation signal has a large on/off duty ratio (L1), the oscillation transformer 4 provides a large amount of primary current and thus a high charging speed. On the other hand, if the oscillation signal has a small on/off duty ratio (L2), the oscillation transformer 4 provides a small amount of primary current and thus a low charging speed.

In this ninth embodiment, between the start of charging and a switching time t1, the charging operation progresses along the curve L2 for the small on/off duty ratio of the oscillation signal. Then, between the switching time t1 and a charging completion time t2 (when a charged voltage Vstop is reached), the charging operation progresses along the curve L1 for the large on/off duty ratio of the oscillation signal. As shown in FIGS. 23A and 23B, by varying the switching time t1, the charging completion time t2 is controlled to a substantially fixed timing regardless of the consumption state of the power supply battery 1, thus allowing users to easily use the camera with this electronic flash device.

The method of setting the switching time t1 in the ninth embodiment is similar to that of the eighth embodiment, and description thereof is therefore omitted.

Figure 24A:
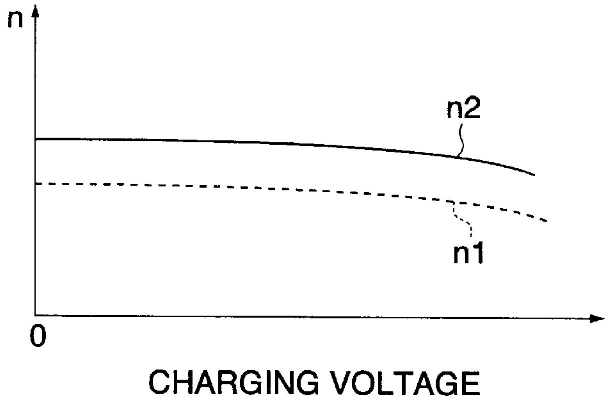
FIG. 24A is a graph showing charging efficiency curves (real time) for the electronic flash device, where the oscillation frequency is low and high.
Figure 24B:
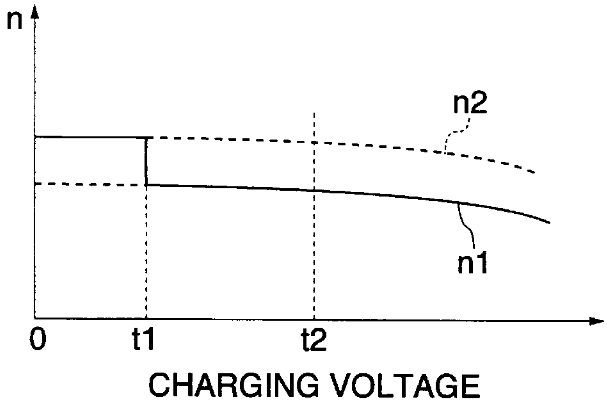
FIG. 24B is a graph showing charging efficiency curves (real time) for the electronic flash device according to the present invention.
Figure 24C:
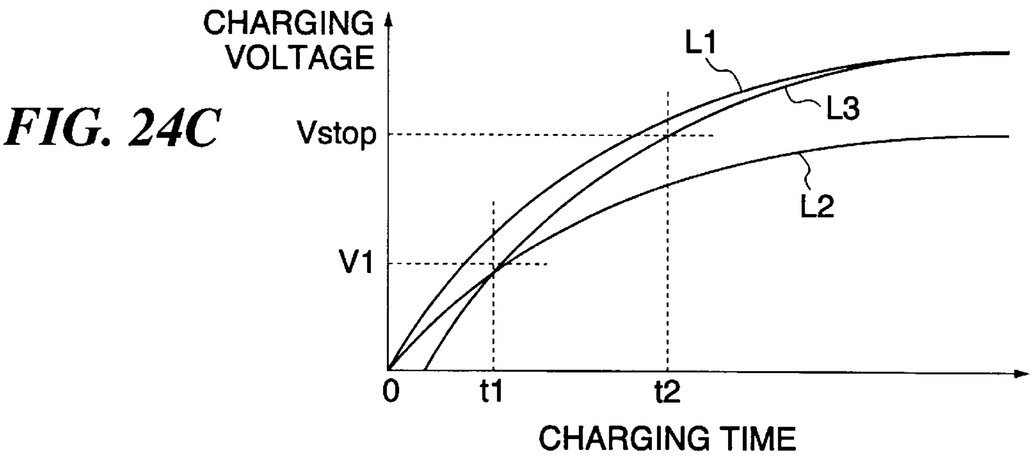
FIG. 24C shows charging time curves as in FIGS. 20 And 20B according to the ninth embodiment.

Next, the efficiency of the electronic flash device will be described with reference to FIGS. 24A to 24C. FIGS. 24A and 24B show charging efficiency curves (real time) for the electronic flash device; the ordinate indicates efficiency η, while the abscissa indicates the charged voltage. Reference numeral η1 denotes a charging efficiency curve for a reduced oscillation frequency. Reference numeral η2 denotes a charging efficiency curve for an increased oscillation frequency. Further, the thick curve in FIG. 24B is a charging efficiency curve for the present invention. FIG. 24C shows charging time curves as in FIGS. 20A and 20B, and the charging time on the abscissa corresponds to the charged voltage on the abscissa in FIGS. 24A and 24B. In FIGS. 24A to 24C, it is assumed that the charging operation is not interrupted so that comparable efficiency and charging curved can be obtained.

FIGS. 24A to 24C indicate that while the battery is new, the time required for charging along the curve η1 for the higher efficiency increases and that as the battery is consumed, the time required for charging along the curve η2 for the lower efficiency increases. Thus, according to this embodiment, while the battery is new, the charging is performed along the efficiency curve η1, thereby increasing the charging efficiency.

In the above described embodiment, the internal resistance Rbat of the battery is determined using the above Equation (1), but it may be determined using the following equation:

$$Rbat = R0 \times (1 - E0/E2) \quad (5)$$

where E2 denotes a battery voltage obtained if a known resistance R0 is temporarily connected between power lines of the battery 1.

Further, in the above described embodiment, the timing for the switching is set based on the switching time t1, but it may be set based on a switching charged voltage V1 corresponding to the switching time t1.

Furthermore, in the above described ninth embodiment, the frequency of the oscillation signal is switched using the flyback type booster circuit, but it may be switched using the forward type booster circuit.

Moreover, in the above described ninth embodiment, the open voltage E0 and the battery resistance Rbat are detected during the battery check at the step S30 shown in FIG. 19, but they may be detected during the battery check at the step S5 shown in FIGS. 18A and 18B. In this case, the step S30 may be omitted.

(Tenth Embodiment)

Figure 25:
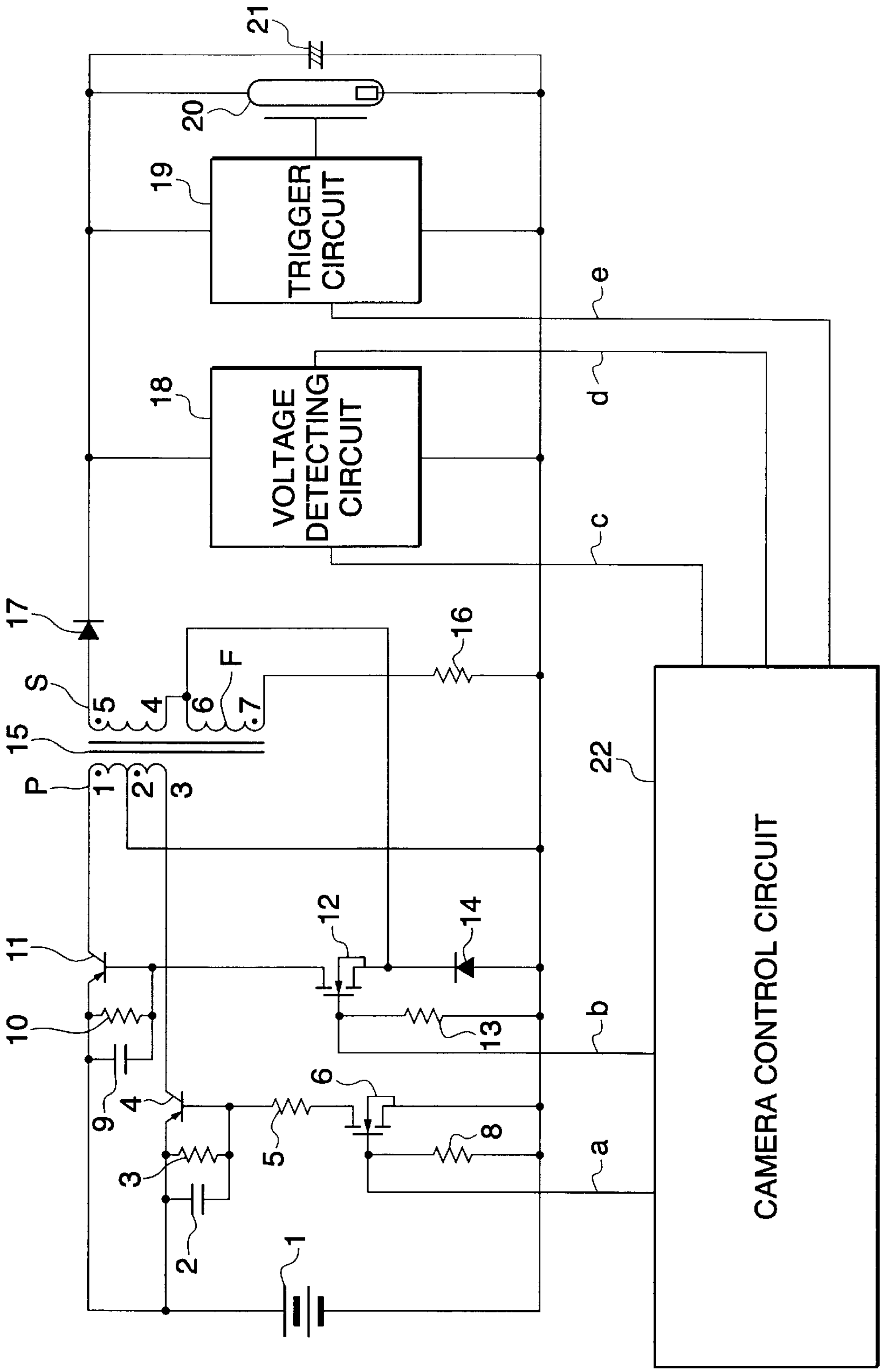
FIG. 25 is a circuit diagram showing the construction of an electronic flash device according to a tenth embodiment of the present invention.
Figure 26:
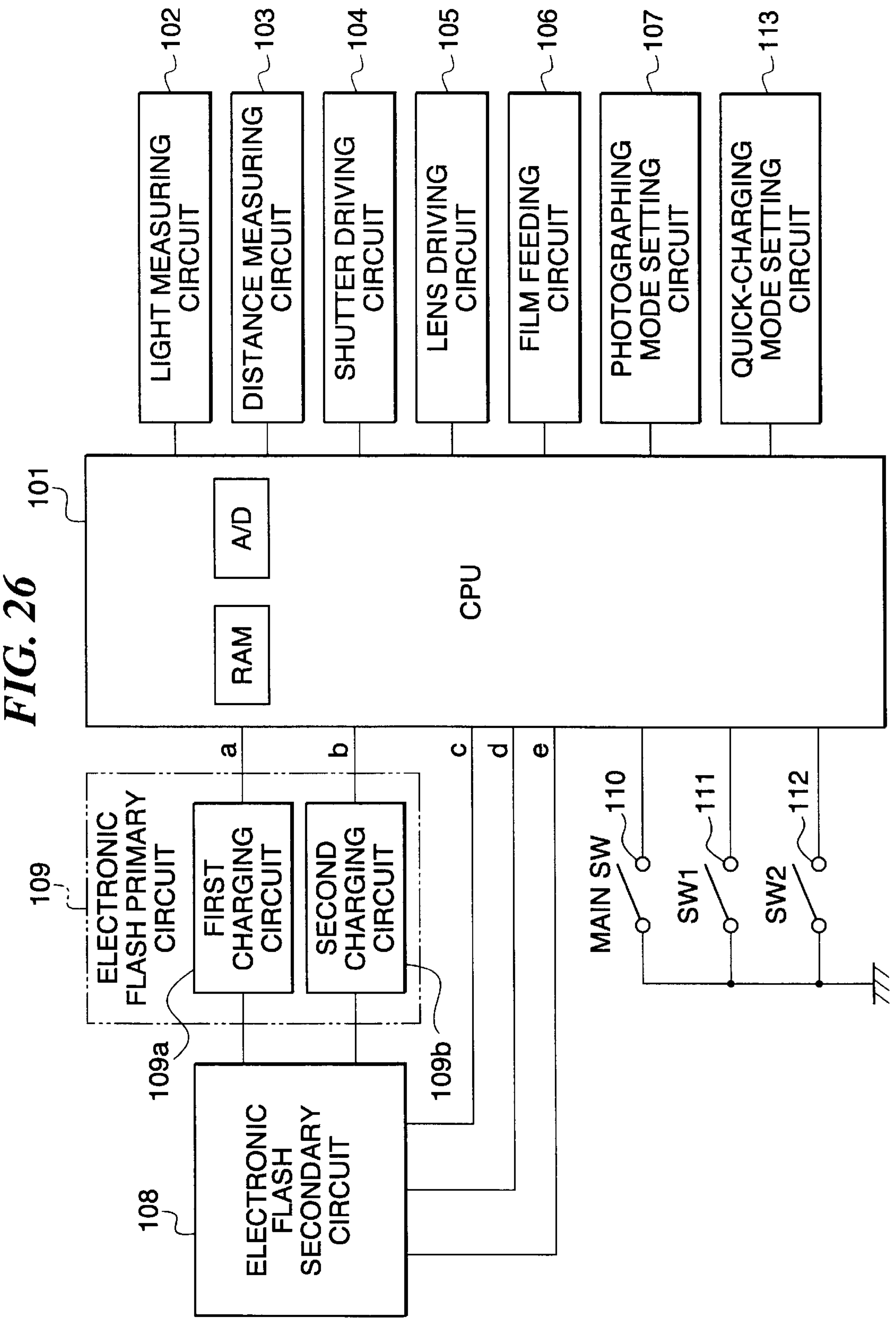
FIG. 26 is a block diagram showing the construction of a camera control device for controlling the electronic flash device according to the tenth embodiment.
Figure 27:
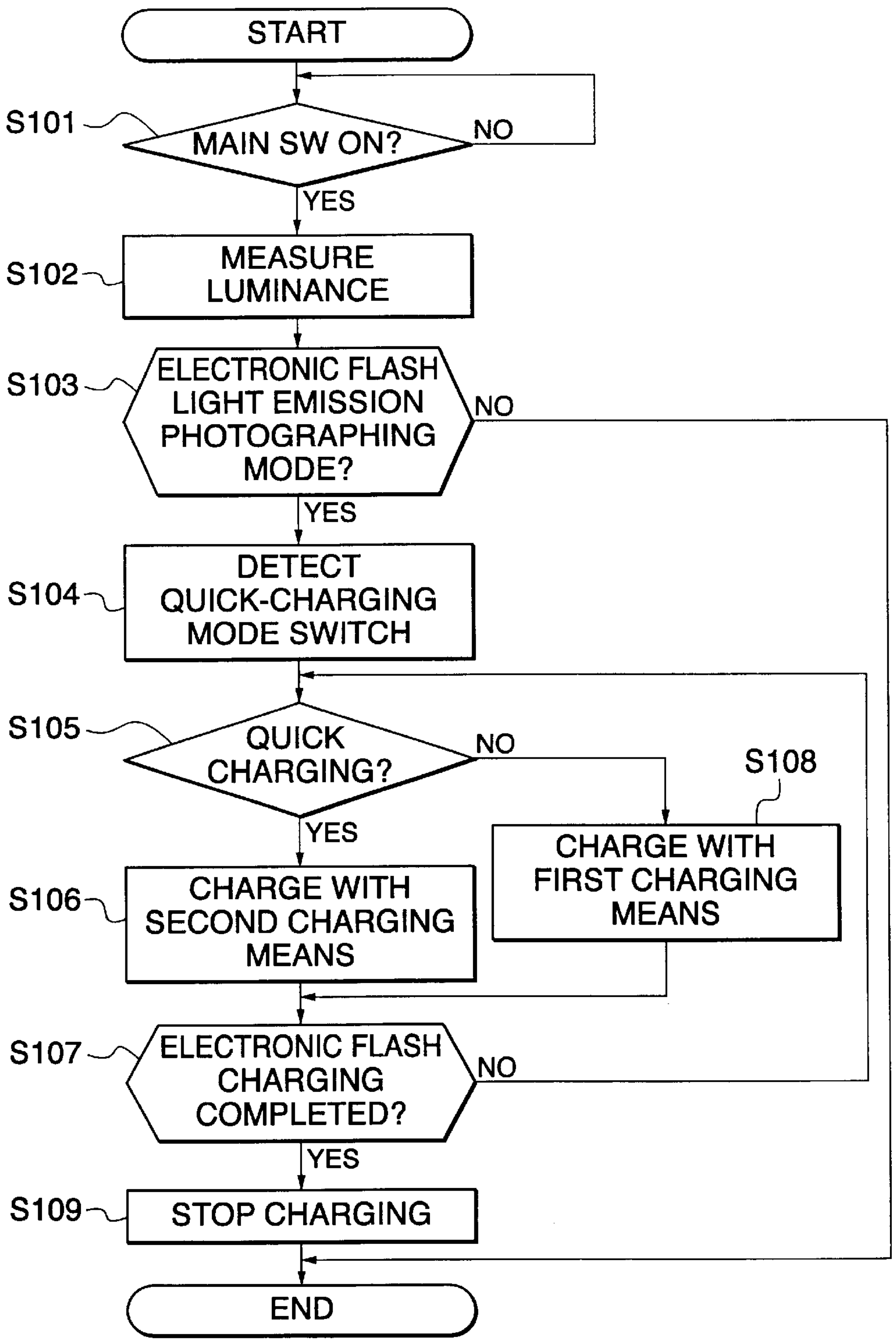
FIG. 27 is a flow chart showing a camera sequence according to the tenth embodiment.

FIGS. 25 to 28 are views useful in explaining an example of the construction of a camera having an electronic flash device according to a tenth embodiment of the present invention. FIG. 25 is a circuit diagram of the construction of the electronic flash device. FIG. 26 is a block diagram of the construction of a camera control device for controlling the electronic flash device. FIG. 27 is a flow chart showing a camera sequence (from turning-on of a main switch to turning-on of an SW1 switch). FIGS. 28A and 28B is a flow chart showing a release sequence (from turning-on of the SW1 switch to a preliminary charging operation through turning-on of a SW2 switch).

The construction of the circuit for the electronic flash device shown in FIG. 25 is the same as that in FIG. 11, which has already been described, and description thereof is therefore omitted.

The block diagram of the camera control device shown in FIG. 26 is also the same as that in FIG. 12, and description thereof is therefore omitted.

First, a CPU 101 checks whether or not a main switch 110 has been turned on (step S101). If the CPU 101 detects that the main switch 110 is off, the procedure returns to the step S101. On the other hand, if the CPU 101 detects that the main switch 110 is on, it causes a light measuring circuit 102 to execute a light measurement (step S102) and stores the result of the light measurement in a RAM thereof. Stroboscopic light emission is required if, for example, a photograph must be taken in a dark environment or against the light.

Then, based on the result of the light measurement stored in the RAM, the CPU 101 determines whether or not the luminance is so low that the stroboscopic light emission is required for photographing (step S103). Upon determining that the luminance is not so low as requires the stroboscopic light emission photographing, the CPU 101 terminates this camera sequence. Upon determining that the luminance is so low as requires the stroboscopic light emission for photographing, the CPU 101 detects the setting state of a quick charging mode circuit 113 (step S104) and determines whether or not the camera is in a quick charging mode, based on the result of the detection (step S105).

If the quick charging mode is set in the quick charging mode circuit 113, the CPU 101 outputs the above-mentioned oscillation signal to a connection line b to start charging by means of a charging speed-oriented forward circuit (second charging circuit 109*b*). If the quick charging mode is not set in the quick charging mode circuit 113, the CPU 101 outputs the oscillation signal to a connection line a to start charging by means of a charging efficiency-oriented forward circuit (first charging circuit 109*a*).

During this operation, the CPU 101 causes an A/D circuit thereof to detect a charged voltage at a step S107 and continues charging until the charged voltage becomes a predetermined charging completion voltage. If the charged voltage has not reached the charging completion voltage, the procedure returns to the step S105. Once the charged voltage has reached the charging completion voltage, the CPU 101 stops outputting the oscillation signal to stop the charging (step S109). This terminates the camera sequence.

Next, the release sequence will be described with reference to FIGS. 28A and 28B.

First, the CPU 101 checks whether or not the SW1 switch 111 has been turned on (step S201). When the CPU 101 detects that the SW1 switch 111 is off, the procedure returns to the step S201. On the other hand, when the CPU 101 detects that the SW1 switch 111 is on, it causes a distance measuring circuit 103 to detect the distance to an object (step S202) and stores the result of this distance measurement in the RAM thereof.

Figure 28A:
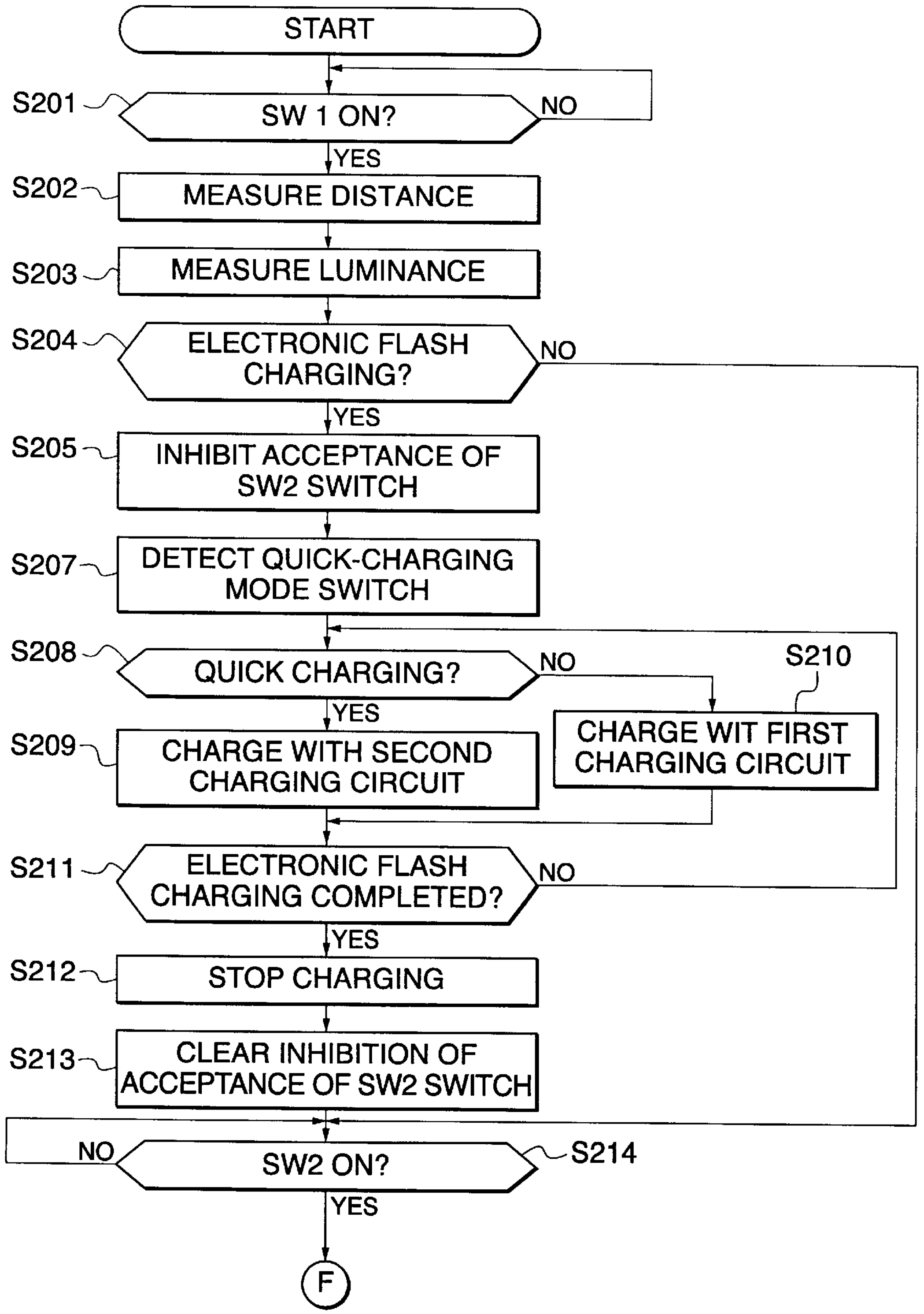
FIGS. 28A and 28B is a flow chart showing a release sequence according to the tenth embodiment.
Figure 28B:
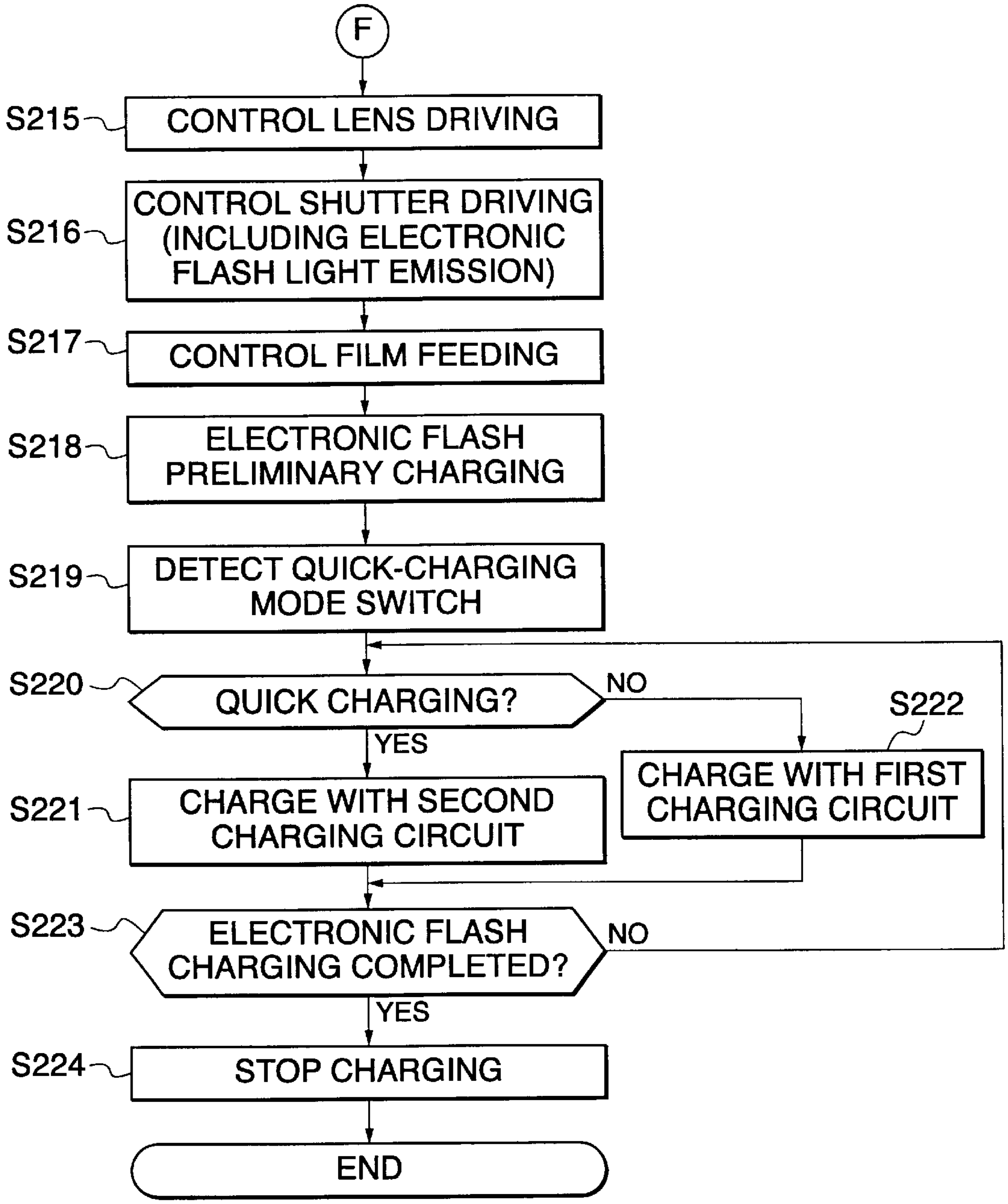

Steps S202 to S212, shown in FIGS. 28A and 28B, are the same as the steps S102 to S109 shown in FIG. 27, and description thereof is therefore omitted. The SW2 switch 112, however, is inhibited from being turned on (second stroke) between the step S203 (light measurement) and the step S205 (detection of a quick charging mode switch).

Next, the CPU 101 clears the inhibition of the acceptance of the SW2 switch as set at the step S205 (step S213) and waits for the SW2 switch 112 to be accepted (step S214). When the CPU 10 does not detect that the SW2 switch 112 is on, the procedure returns to the step S214. When the CPU 10 detects that the SW2 switch 112 is on, it causes a lens driving circuit 105 to drive a photographing lens using the measured distance data (see the step S202) stored in the RAM thereof (step S215).

Then, if the stroboscopic light emission is required, the CPU 101 uses the measured light data stored in the RAM thereof to causes a stroboscopic secondary circuit 108 to execute stroboscopic light emission, while causing a shutter driving circuit 104 to drive a shutter (step S216).

The CPU 101 then causes a film driving circuit 106 to feed a film until the next photographing frame is set (step S217). Once the film has been properly fed, the CPU 101 enters a preliminary charging sequence (steps S218 to S224). Steps S219 to S224, shown in FIGS. 28A and 28B, are the same as the steps S103 to S109 shown in FIG. 27, and description thereof is therefore omitted.

With the above described construction, if the quick charging mode is set, the main capacitor 21 is charged using the forward type booster circuit, which can charge the main capacitor 21 quickly, thus making it possible to deal with a sudden shutter chance. If the quick charging mode is not set, the flyback type booster circuit, which gives priority to the charging efficiency, is used for charging, thereby preventing the consumption of the battery 1.

(Eleventh Embodiment)

Figure 29A:
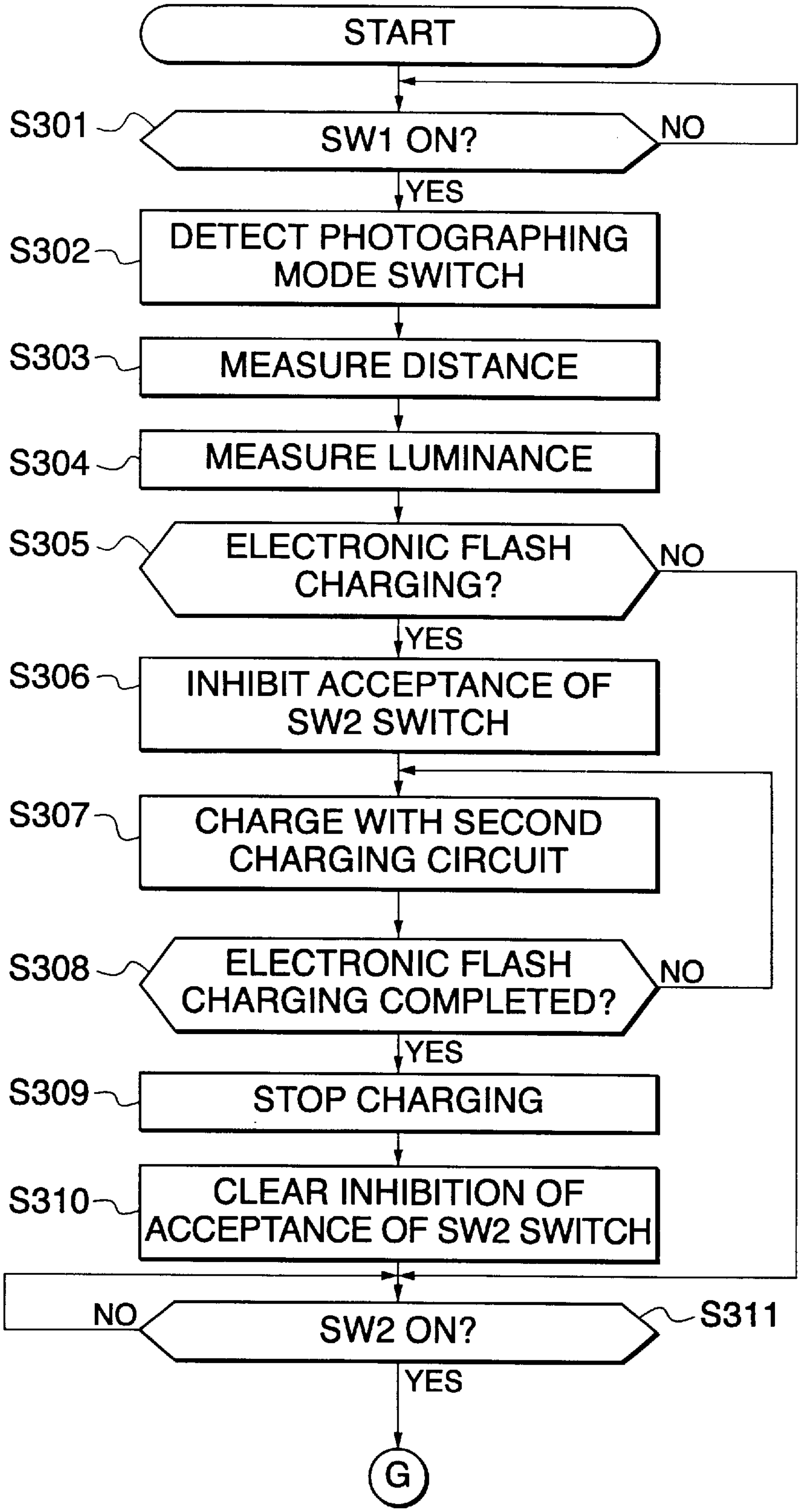
FIGS. 29A and 29B is a flow chart showing a release sequence according to an eleventh embodiment of the present invention.
Figure 29B:
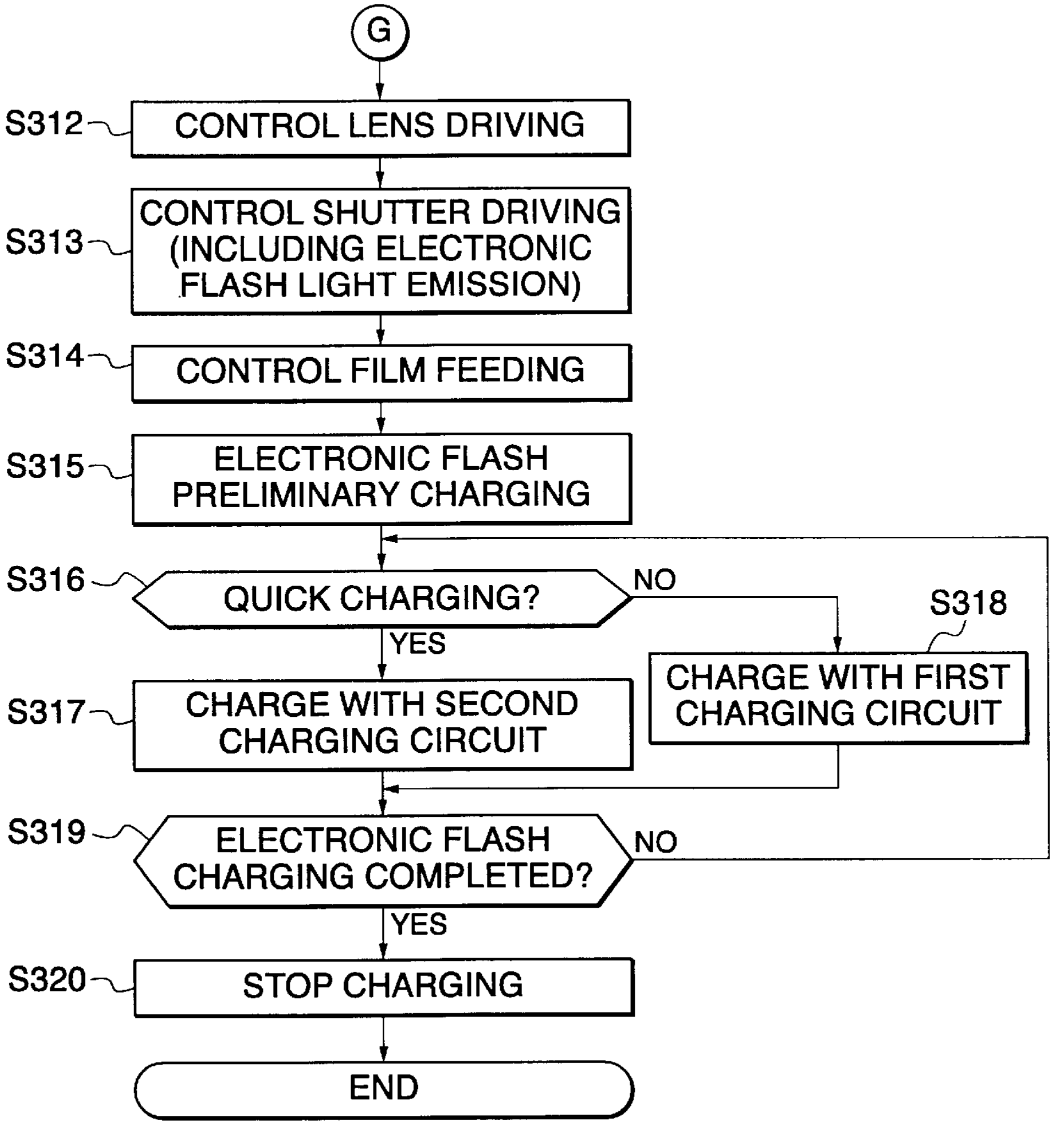

FIGS. 29A and 29B is a flow chart showing the release sequence (from turning-on of the SW1 switch to the preliminary charging operation through turning-on of the SW2 switch), similarly to FIGS. 28A and 28B.

The eleventh embodiment is different from the tenth embodiment in that while the camera is preparing for photographing (first stroke), the forward type booster circuit (second charging means 109*b*) is used for charging. However, during preliminary charging executed after the shutter has been driven, the flyback type booster circuit or the forward type booster circuit is selected depending on whether or not a photographing mode requiring quick charging is set (step S220).

Thus, only the release sequence will be described with reference to FIGS. 29A and 29B.

In the eleventh embodiment, during this selection, the quick charging mode setting circuit 113 of the tenth embodiment is not used, and therefore, FIGS. 29A and 29B does not include the steps S207 and S219 shown in FIGS. 28A and 28B. Instead, at a step S302, a CPU 101 causes photographing mode setting means 107 to detect the state of a photographing mode, and stores the result of the detection of the photographing mode in a RAM thereof. The photographing mode includes a “sequential shooting mode” which requires quick charging, a “sports mode” which includes sequential shooting, a “macro mode” which does not require quick charging, or a “portrait mode”.

First, the CPU 101 detects the result of the detection of the photographing mode (see the step S302) stored in the RAM thereof and determines whether or not a quick charging operation is required, using the result of the detection of the photographing mode (step S316).

If the “sequential shooting” mode which requires quick charging, the “sports mode” which includes sequential shooting, or the like is set, the CPU 101 receives a quick charging signal from the quick charging mode circuit 113 and outputs the above-mentioned oscillation signal to the connection line b to cause the charging speed-oriented forward circuit (second charging circuit 109*b*) to start charging (step S317). On the other hand, if the “macro mode” which does not require quick charging, the “portrait mode”, or the like is set, the CPU 101 outputs the oscillation signal to the connection line a to cause the charging efficiency-oriented flyback circuit (first charging circuit 109*a*) to start charging (step S318).

During this operation, the CPU 101 causes the A/D circuit thereof to detect the charged voltage and continues charging until the charged voltage becomes equal to a predetermined charging completion voltage (step S319). If the charged voltage has not reached the charging completion voltage, the procedure returns to the step S316. Once the charged voltage has reached the charging completion voltage, the CPU 101 stops outputting the oscillation signal to stop the charging (step S320).

Also with this construction, similarly to the tenth embodiment, if any photographing mode requiring quick charging is set, the main capacitor 21 is charged using the forward type booster circuit which can charge the main capacitor 21 quickly, thus making it possible to deal with a sudden shutter chance. If no photographing mode requiring quick charging is set, the flyback type booster circuit which gives priority to the charging efficiency is used for charging, thereby preventing the consumption of the battery 1.

In the above described embodiment, the power supply voltage is increased using a single oscillation transformer, but it may be increased using two oscillation transformers separately provided for the first and second charging circuits, respectively. Further in the above described embodiment, the quick charging signal is input to the CPU 101 by turning on the release button, but the signal may be input to the CPU 101 by operating a remote controller, for example,.

Moreover, in the above described embodiment, the speed-oriented boosting means is implemented by the charging operation performed by the forward type booster circuit, which can provide a large amount of primary current, and the efficiency-oriented boosting means is implemented by the charging operation performed by the flyback type booster circuit, which can maintain a small amount of primary current. The speed- and efficiency-oriented boosting means, however, are not limited to those implemented by the forward and flyback type booster circuits, but the flyback type booster circuit may act as the speed-oriented boosting means when the amount of primary current thereof is set large and as the efficiency-oriented boosting means when the amount of primary current thereof is set small.

Further, as proposed in Japanese Laid-Open Patent Publication (Kokai) No. 06-089794, in a charging circuit formed by a combination of transformers of different boosting characteristics (the turn ratio of the primary coil to the secondary coil) in a forward type booster circuit, the efficiency-oriented boosting means as first boosting means may be implemented by a booster circuit having a predetermined turn ratio between the primary and secondary coils of the transformer, and the speed-oriented boosting means as second boosting means may be implemented by a booster circuit having a larger turn ratio (a larger amount of primary current) than the efficiency-oriented booster circuit.

(Twelfth Embodiment)

Figure 30:
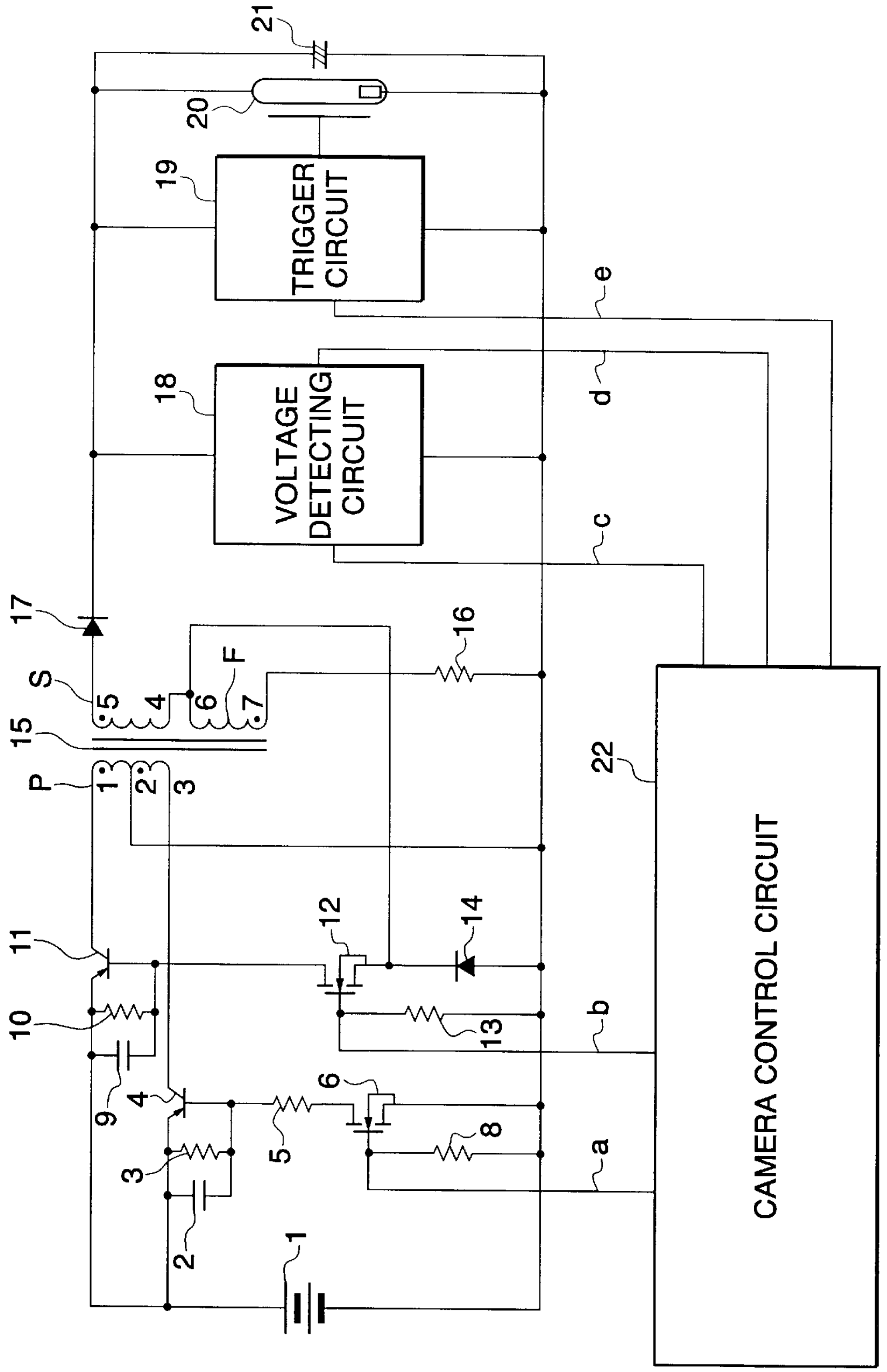
FIG. 30 is a circuit diagram showing an example of the construction of an electronic flash device according to a twelfth embodiment of the present invention.
Figure 31:
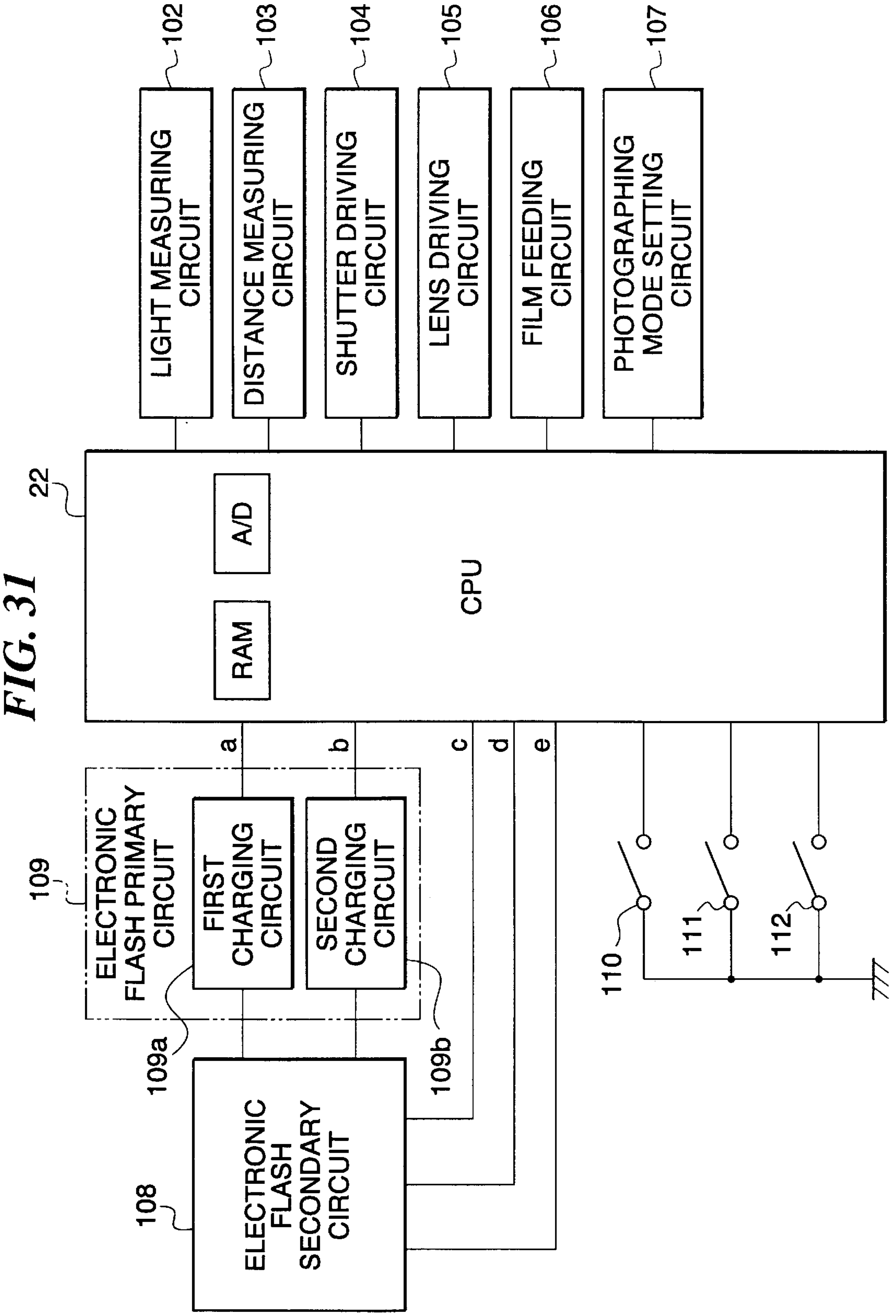
FIG. 31 is a circuit diagram showing the construction of a camera having the electronic flash device according to the twelfth embodiment.

FIGS. 30 and 31 are block diagrams of the constructions of an electronic flash device and a camera control device according to a twelfth embodiment of the present invention. The electronic flash device in FIG. 30 is the same as that in FIG. 11, and description thereof is therefore omitted.

Further, the block diagram of FIG. 31 is the same as that of FIG. 12, and description of the same components is therefore omitted.

In FIG. 31, reference numeral 107 denotes finder eye contact detecting means. The finder eye contact detecting means 107 checks, using a grip detecting section (not shown) thereof, whether or not the photographer is holding a grip portion of the camera, and checks, using a finder detecting section (not shown) thereof, whether or not a reflector such as the photographer's face is present near the finder of the camera. When these are simultaneously detected, the finder eye contact detecting means determines that the photographer is viewing an object through the finder, that is, detects an eye contact.

Figure 32:
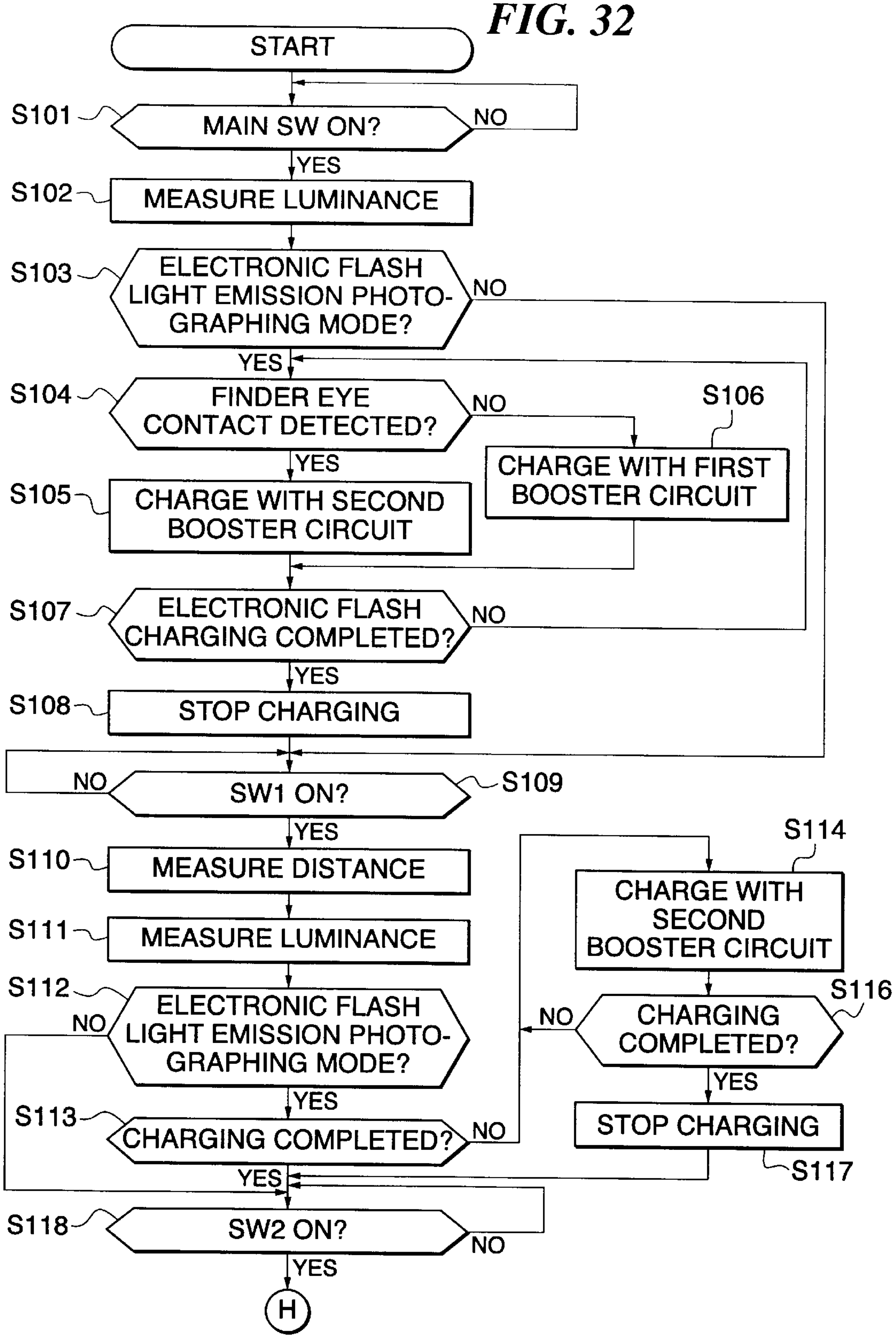
FIG. 32 is a flow chart (1) showing the flow of an operation of the camera according to the twelfth embodiment.
Figure 33:
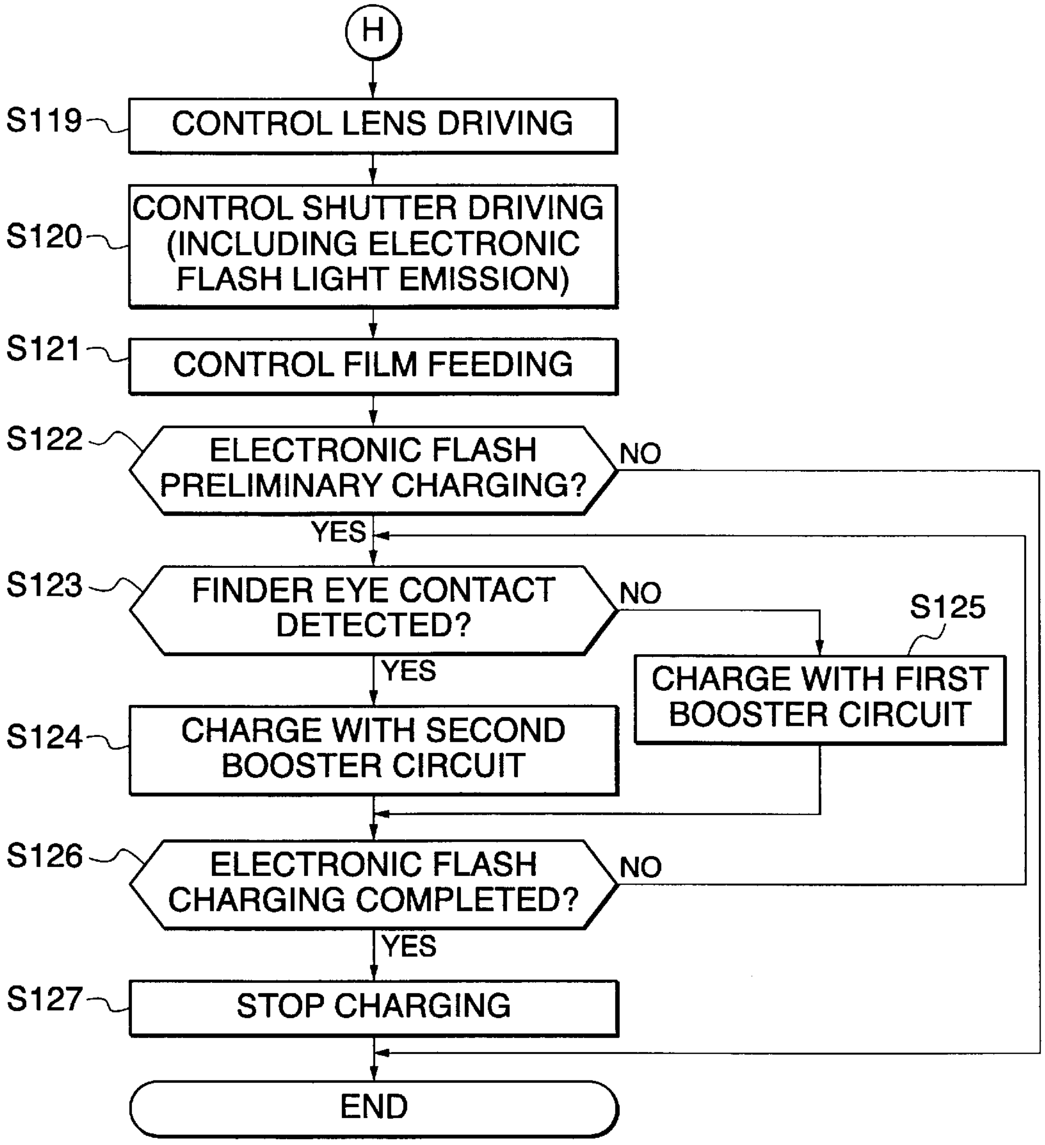
FIG. 33 is a flow chart (2) showing the flow of the operation of the camera according to the twelfth embodiment.

Next, the flow of the operation of the camera will be described with reference to the flow charts of FIGS. 32 and 33.

First, a camera control circuit 22 checks whether or not a main switch 110 has been turned on (step S101). If the camera control circuit 22 detects that the main switch 110 is on, it causes a light measuring circuit 102 to execute a light measurement (step S102) and stores the result of the light measurement in a RAM thereof.

Then, based on the result of the light measurement stored in the RAM, the camera control circuit 22 determines whether or not stroboscopic light emission is required for photographing (step S103). If the camera control circuit 22 determines that the luminance is not so low as requires stroboscopic light emission and hence no stroboscopic preliminary operation is required, the procedure proceeds to a step S109, described later. Upon determining that the luminance is so low as requires the stroboscopic light emission and hence the stroboscopic preliminary charging operation is required, the camera control circuit 22 checks whether or not the photographer has his eye in contact with the finder, using the finder eye contact detecting means 107 including the grip detecting section and the finder detecting section (step S104).

If the finder eye contact detecting means 107 does not detect the contact of the photographer's eye with the finder, the camera control circuit 22 is responsive to this result, for outputting the oscillation signal to the connection line a to cause the flyback type booster circuit to charge the main capacitor 21, as described above (step S106). On the other hand, if the finder eye contact detecting means 107 detects the contact of the photographer's eye with the finder, the camera control circuit 22 is responsive to this result, for outputting the oscillation signal to the connection line b to cause the forward type booster circuit to charge the main capacitor 21, as described above (step S105).

As described above, the time required by the second booster circuit to complete charging the main capacitor is smaller than that required by the first booster circuit to perform the same operation. Further, the first booster circuit can charge the main capacitor more efficiently than the second booster circuit.

Thus, when the finder eye contact detecting means 107 detects the contact of the photographer's eye with the finder, the camera control circuit 22 charges the main capacitor 21 by selecting the forward type booster circuit (second booster circuit), which can charge the main capacitor more quickly than the flyback type booster circuit (first booster circuit), thus making it possible to deal with urgent stroboscopic photographing. On the other hand, if the finder eye contact detecting means 107 does not detect the contact of the photographer's eye with the finder, the camera control circuit 22 charges the main capacitor 21 by selecting the flyback type booster circuit, which can charge the main capacitor more efficiently than the forward type booster circuit, thereby preventing the consumption of the battery. In this manner, the main capacitor 21 is charged depending on whether or not the photographer's eye is in contact with the finder, thereby allowing the user to use the camera with ease, while saving energy.

During this charging, the camera control circuit 22 detects the charged voltage of the main capacitor 21 output by the voltage detecting circuit 18 as described above, and continues charging until the charge completion voltage required for stroboscopic light emission is reached. Upon detecting the charging completion voltage (step S110), the camera control circuit 22 stops the oscillation signal so far output via the connection line a or b, thus stopping charging the main capacitor 21 (step S108).

In this embodiment, while the flyback type booster circuit is charging the main capacitor and when the finder eye contact detecting means detects the contact of the photographer's eye with the finder, the control circuit switches the flyback type booster circuit to the forward type booster circuit and causes the latter to charge the main capacitor. On the other hand, while the forward type booster circuit is charging the main capacitor and when the finder eye contact detecting means does not detect the contact of the photographer's eye with the finder, the control circuit switches the forward type booster circuit to the flyback type booster circuit and causes the latter to charge the main capacitor.

This enables the user to deal with urgent stroboscopic photographing more easily or prevent the consumption of the battery more positively.

Next, the CPU 101 checks whether or not the SW1 switch 111, which is indicative of the first stroke of the release switch, has been turned on (step S109). When the camera control circuit 22 does not detect turning-on of the SW1 switch 111, the procedure returns to the step S109. On the other hand, when the camera control circuit 22 detects turning-on of the SW1 switch 111, it causes the distance measuring circuit 103 to detect the distance to the object (step S110) and stores the result of this distance measurement in the RAM thereof.

Then, the camera control circuit 22 causes the light measuring means 102 to execute a light measurement for the object, and stores the result of this light measurement (luminance of the object) in the RAM (step S111). The camera control circuit 22 then determines whether or not a stroboscopic charging operation is required, based on the measured light data (see the step S111) stored in the RAM (step S112). Stroboscopic light emission is required if, for example, a photograph must be taken in a dark environment or against the light.

When the camera control circuit 22 determines that the stroboscopic charging operation is not required, the procedure proceeds to a step S118, described later. Upon determining that the stroboscopic charging operation is required, the camera control circuit 22 determines whether or not the charged voltage of the main capacitor 21 has reached the charging completion voltage (step S113).

When the camera control circuit 22 determines that the charged voltage of the main capacitor 21 has reached the charging completion voltage, the procedure proceeds to the step S118 described later. Upon determining that the charged voltage of the main capacitor 21 has not reached the charging completion voltage, the camera control circuit 22 outputs the oscillation signal to the connection line b to cause the forward circuit to charge the main capacitor 21, as described above (step S114).

Then, the camera control circuit 22 causes the A/D circuit to detect the charged voltage of the main capacitor 21 and determines whether or not the charged voltage has reached the charging completion voltage, as in the above described step S107 (step S116). When the camera control circuit determines that the charged voltage has not reached the charging completion voltage, the procedure returns to the step S114. Upon determining that the charged voltage has reached the charging completion voltage, the camera control circuit 22 stops outputting the oscillation signal so far output via the connection line b, to stop charging the main capacitor 21 (step S117).

The camera control circuit 22 then determines whether or not the SW2 switch is on (step S118). When the camera control circuit 22 determines that the SW2 switch is not on, the procedure returns to the step S118. Upon determining that the SW2 switch is on, the camera control circuit 22 causes the lens driving means 105 to control driving of the photographing lens in accordance with the result of the distance measurement stored in the RAM (see the step S110).

The camera control circuit 22 causes the shutter driving means 104 to control driving of the shutter (step S120). At this time, if stroboscopic light emission is required, the camera control circuit 22 outputs a light emission signal via the connection line e to cause the stroboscopic secondary circuit 108 to execute stroboscopic light emission, in accordance with the result of the light measurement stored in the RAM (see the step S111).

Then, the camera control circuit 22 causes the film feeding means 106 to feed the film until the next photographing frame is set (step S121). The camera control circuit 22 then determines whether or not to perform a stroboscopic preliminary charging operation. Upon determining that the stroboscopic preliminary charging operation need not be performed, the camera control circuit 22 terminates the camera sequence. Upon determining that the stroboscopic preliminary charging operation must be performed, the camera control circuit 22 executes steps S123 to S127. The steps S123 to S127 are similar to the above described steps S104 to S108, and description thereof is therefore omitted. The camera control circuit 22 thus terminates the camera sequence.

With the above described construction, when the finder eye contact detecting means 107 detects the contact of the photographer's eye with the finder, the camera control circuit 22 charges the main capacitor 21 by selecting the forward type booster circuit (second booster circuit), which can charge the main capacitor more quickly than the flyback type booster circuit (first booster circuit), thus making it possible to deal with urgent stroboscopic photographing. On the other hand, if the finder eye contact detecting means 107 does not detect the contact of the photographer's eye with the finder, the camera control circuit 22 charges the main capacitor 21 by selecting the flyback type booster circuit, which can charge the main capacitor more efficiently than the forward type booster circuit, thereby preventing the consumption of the battery. In this manner, the main capacitor 21 is charged depending on whether or not the photographer's eye is in contact with the finer, thereby allowing the user to use the camera with ease, while saving energy.

What is claimed is:

1. An electronic flash device comprising:

a power supply;

a main capacitor;

a booster circuit for performing a boosting operation for increasing voltage from said power supply to thereby charge said main capacitor, said booster circuit having a forward type boosting section, and a flyback type boosting section; and a switching circuit for switching the boosting operation performed by said booster circuit from one performed by said forward type boosting section to one performed by said flyback type boosting section, during charging of said capacitor.

2. An electronic flash device according to claim 1, wherein said switching circuit switches the boosting operation performed by said forward type boosting section to the one performed by said flyback type boosting section after a charged voltage of said main capacitor has reached a predetermined value.

3. An electronic flash device according to claim 1, wherein said switching circuit switches the boosting operation performed by said forward type boosting section to the one performed by said flyback type boosting section when a predetermined period of time has elapsed since charging of said capacitor was started.

4. An electronic flash device according to claim 1, wherein said forward type boosting section and said flyback type boosting section share an oscillation transformer connected in parallel to said main capacitor.

5. An electronic flash device according to claim 4, wherein said oscillation transformer has a primary coil and a secondary coil, and wherein said forward type boosting section causes a current to flow through the primary coil of said oscillation transformer in a first direction to generate a current flowing from the secondary coil in a predetermined charging direction to thereby charge said main capacitor, and said flyback type boosting section causes a current to flow through said primary coil in a second direction opposite to the first direction to generate a current flowing from said secondary coil in said charging direction to thereby charge said main capacitor.

6. An electronic flash device according to claim 5, wherein said primary coil comprises a first coil, a second coil, and an intermediate terminal connecting between the first and second coils, said power supply having electrodes, said first and second coils being connected to one of the electrodes of said power supply, said intermediate terminal being connected to another one of the electrode of said power supply, and said forward type boosting section causing a current to flow through said first coil in said first direction to generate a current flowing from said secondary coil in said predetermined charging direction to thereby charge said main capacitor, while said flyback type boosting section causing a current to flow through said second coil in said second direction opposite to said first direction to generate a current flowing from said secondary coil in said charging direction to thereby charge said main capacitor.

7. An electronic flash device according to claim 1, wherein said forward type boosting section and said flyback type boosting section each have an oscillation transformer connected in parallel to said main capacitor.

8. An electronic flash device incorporated in or mounted on a camera, comprising:

a power supply;

a main capacitor;

a booster circuit for performing a boosting operation for increasing voltage from said power supply to thereby charge said main capacitor, said booster circuit having a forward type boosting section, and a flyback type boosting section; and a selecting circuit for selecting said forward type boosting section or said flyback type boosting section depending on an operating status or an operative state of the camera.

9. An electronic flash device according to claim 8, wherein said selecting circuit selects said forward type boosting section when the camera is in an operative state for preparing for photographing, and selects said flyback type boosting section before the camera is set in the operative state for preparing for photographing.

10. An electronic flash device according to claim 9, wherein the camera is set into the operative state for preparing for photographing by a remote control operation.

11. An electronic flash device according to claim 8, wherein said selecting circuit selects said forward type boosting section or said flyback type boosting section depending on an operating state of a release operating member of the camera.

12. An electronic flash device incorporated in or mounted on a body of a camera, comprising:

a main capacitor;

a flyback type booster circuit for charging said main capacitor with a driving current which can be variably set; and a control circuit for causing said flyback type booster circuit to charge said main capacitor by setting the driving current from said flyback type booster circuit to a predetermined first value, when the camera is in an operative state for preparing for photographing, and by setting the driving current from said flyback type booster circuit to a predetermined second value which is smaller than said first predetermined value, before the camera is in the operative state for preparing for photographing.

13. An electronic flash device according to claim 12, wherein the operative state for preparing for photographing is a state in which a release operating member of the camera is operated for a first stroke.

14. An electronic flash device according to claim 12, wherein the camera is set into the operative state for preparing for photographing by a remote control operation.

15. An electronic flash device incorporated in or mounted on a body of a camera, comprising:

a main capacitor;

a forward type booster circuit for charging said main capacitor, said forward type booster circuit having a first transformer, and a second transformer having a smaller turn ratio than said first transformer; and a control circuit for using said first transformer to charge said main capacitor when the camera is in an operative state for preparing for photographing, and for using said second transformer to charge said main capacitor before the camera is in the operative state for preparing for photographing.

16. An electronic flash device according to claim 15, wherein the operative state for preparing for photographing is a state in which a release operating member of the camera is operated for a first stroke.

17. An electronic flash device according to claim 15, wherein the camera is set into the operative state for preparing for photographing by a remote control operation.

18. An electronic flash device comprising:

a power supply battery;

a main capacitor;

a booster circuit for performing an oscillating operation for increasing voltage from said power supply battery to thereby charge said main capacitor, said booster circuit having a first boosting section, and a second boosting section using a charging method different from that of the first boosting section; and a control circuit for switching the first boosting section to the second boosting section to charge said main capacitor;

said control circuit setting timing for said switching depending on a state of said power supply battery.

19. An electronic flash device according to claim 18, wherein said first boosting section comprises a flyback type boosting section, and said second boosting section comprises a forward type boosting section.

20. An electronic flash device according to claim 18, wherein said control circuit sets the timing for said switching depending on a state of internal resistance of said power supply battery.

21. An electronic flash device according to claim 18, wherein said control circuit sets the timing for said switching based on a time required for charging said main capacitor which is obtained by the state of said power supply battery.

22. An electronic flash device according to claim 18, wherein said control circuit sets the timing for said switching such that a time required for a charged voltage of said main capacitor to increase up to a predetermined charge completion voltage is substantially constant.

23. An electronic flash device incorporated in or mounted on a body of a camera, comprising:

a main capacitor;

a flyback type booster circuit for charging said main capacitor with a driving current which can be variably set; and a control circuit for causing said flyback type booster circuit to charge said main capacitor by setting the driving current from said flyback type booster circuit to a predetermined value when a quick charging mode is set, and by setting the driving current from said flyback type booster circuit to a value smaller than said predetermined value when said quick charging mode is not set.

24. An electronic flash device incorporated in or mounted on a body of a camera, comprising:

a main capacitor;

a forward type booster circuit for charging said main capacitor, said forward type booster circuit having a first coil, and a second coil having a smaller turn ratio than said first coil; and a control circuit for causing said forward type booster circuit to charge said main capacitor using said first coil thereof when a quick charging mode is set, and using said second coil thereof when the quick charging mode is not set.

25. An electronic flash device incorporated in or mounted on a body of a camera, comprising:

a main capacitor;

a booster circuit having a forward type boosting section, and a flyback type boosting section to be selectively used for charging said main capacitor; and a selecting circuit for selecting said forward type boosting section or said flyback type boosting section depending on a photographing mode of the camera.

26. An electronic flash device incorporated in or mounted on a body of a camera, comprising:

a main capacitor;

a flyback type booster circuit for charging said main capacitor with a driving current which can be variably set; and a setting circuit for setting the driving current from said flyback type boosting circuit depending on a photographing mode of said camera.

27. An electronic flash device incorporated in or mounted on a body of a camera, comprising:

a main capacitor;

a forward type booster circuit for charging said main capacitor, said forward type booster circuit having a first coil, and a second coil having a smaller turn ratio than said first coil; and a determining circuit for determining whether to charge said main capacitor using said first coil of said forward type booster circuit or said second coil thereof depending on a photographing mode of said camera.

28. An electronic flash device incorporated in or mounted on a body of a camera having a finder eye contact detecting circuit for detecting an eye contact with a finder, comprising:

a power supply;

a booster circuit for increasing voltage from said power supply to thereby charge said main capacitor, said booster circuit having a first boosting section, and a second boosting section, said second boosting section requiring a shorter charging completion time to complete charging said main capacitor, than sad first boosting section, and said first boosting section having a higher charging efficiency than said second boosting section; and a selecting circuit for selecting said second boosting section when said finder eye contact detecting circuit detects the eye contact with said finder, and selecting said first boosting section when said finder eye contact detecting circuit does not detect the eye contact with said finder.

29. An electronic flash device according to claim 28, wherein said first boosting section comprises a flyback type boosting section, and said second boosting section comprises a forward type boosting section.

30. An electronic flash device according to claim 28, wherein when said finder eye contact detecting circuit detects the eye contact with said finder during charging of said main capacitor using said first boosting section, said selecting circuit switches said first boosting section to said second boosting section.

31. An electronic flash device incorporated in or mounted on a body of a camera having a finder eye contact detecting circuit for detecting an eye contact with a finder, comprising:

a power supply; and a control circuit for charging said main capacitor by selecting a first driving operation or a second driving operation;

said second driving operation section requiring a shorter charging completion time to complete charging said main capacitor, than said first driving operation, and said first driving operation providing a higher charging efficiency than said second driving operation;

said control circuit selecting said second driving operation when said finder eye contact detecting circuit detects athe eye contact with said finder, and selecting said first driving operation when said finder eye contact detecting circuit does not detect the eye contact with said finder.

* * * * *